(12) United States Patent
Yazaki

(10) Patent No.: US 11,467,372 B2
(45) Date of Patent: Oct. 11, 2022

(54) LENS SYSTEM AND IMAGE PICKUP APPARATUS

(71) Applicant: NITTOH INC., Suwa (JP)

(72) Inventor: Takuya Yazaki, Suwa (JP)

(73) Assignee: NITTOH INC., Suwa (JP)

( * ) Notice: Subject to any disclaimer, the term of this patent is extended or adjusted under 35 U.S.C. 154(b) by 200 days.

(21) Appl. No.: 16/956,791

(22) PCT Filed: Dec. 26, 2018

(86) PCT No.: PCT/JP2018/047819
§ 371 (c)(1),
(2) Date: Jun. 22, 2020

(87) PCT Pub. No.: WO2019/131751
PCT Pub. Date: Jul. 4, 2019

(65) Prior Publication Data
US 2020/0319427 A1 Oct. 8, 2020

(30) Foreign Application Priority Data

Dec. 28, 2017 (JP) .............................. JP2017-254496
Dec. 28, 2017 (JP) .............................. JP2017-254497
Dec. 28, 2017 (JP) .............................. JP2017-254498

(51) Int. Cl.
*G02B 9/12* (2006.01)
*G02B 13/24* (2006.01)
(Continued)

(52) U.S. Cl.
CPC ................. *G02B 9/12* (2013.01); *G02B 9/64* (2013.01); *G02B 13/24* (2013.01); *G02B 13/02* (2013.01)

(58) Field of Classification Search
CPC .......... G02B 13/24; G02B 9/64; G02B 13/02; G02B 9/12–32; G02B 13/04;
(Continued)

(56) References Cited

U.S. PATENT DOCUMENTS 5,623,371 A  4/1997  Hankawa
5,946,136 A  8/1999  Suzuki
(Continued)

FOREIGN PATENT DOCUMENTS

JP    07-152001 A    6/1995
JP    2010-204621 A  9/2010
(Continued)

OTHER PUBLICATIONS

PCT, Japanese Patent Office (ISA/JP), International Search Report, International Application No. PCT/JP2018/047819, 6 pages (dated Apr. 2, 2019).
(Continued)

*Primary Examiner* — Marin Pichler
(74) *Attorney, Agent, or Firm* — Thompson Hine LLP

(57) ABSTRACT

A lens system (10) for image pickup includes, in order from an object side (11), a first lens group (G1) with positive refractive power that moves during focusing, a second lens group (G2) with positive refractive power that is disposed on an opposite side of a stop (St) to the first lens group and moves during focusing, and a third lens group (G3) with positive refractive power that is disposed closest to an image plane side (12) and is fixed. The third lens group includes, in order from the object side, a cemented lens (B31) composed of a lens with positive refractive power and a lens with negative refractive power. A combined focal length (f3) of the third lens group and a combined focal length (f12) of the first lens group and the second lens group satisfy a following condition: $2 \leq f3/f12 \leq 200$.

20 Claims, 40 Drawing Sheets

(51) Int. Cl.
*G02B 9/64* (2006.01)
*G02B 13/02* (2006.01)

(58) Field of Classification Search
CPC ........... G02B 15/143–143507; G02B 9/34–58; G02B 15/144–144515; G02B 9/60; G02B 9/62
USPC ........ 359/682, 689–690, 748, 753, 784–792, 359/686–688, 747, 771–783
See application file for complete search history.

(56) References Cited

U.S. PATENT DOCUMENTS

| | | |
|---|---|---|
| 2013/0135514 A1 | 5/2013 | Maetaki |
| 2015/0168678 A1 | 6/2015 | Baba |
| 2017/0242219 A1* | 8/2017 | Kondo ................... G02B 13/16 |
| 2018/0149838 A1* | 5/2018 | Takakubo .......... G02B 13/0045 |

FOREIGN PATENT DOCUMENTS

| | | |
|---|---|---|
| JP | 2013-109025 A | 6/2013 |
| JP | 2013-114133 A | 6/2013 |
| JP | 2014-52412 A | 3/2014 |
| JP | 2014-126652 A | 7/2014 |
| JP | 2017-146478 A | 8/2017 |

OTHER PUBLICATIONS

PCT, Japanese Patent Office (ISA/JP), International Preliminary Report on Patentability and Written Opinion (with English translation), International Application No. PCT/JP2018/047819, 9 pages (dated Jun. 30, 2020).

* cited by examiner

Fig. 2

| LENS SURFACE NUMBER (S) | RADIUS OF CURVATURE (Ri) | DISTANCE (di) | REFRACTIVE INDEX (nd) | ABBE NUMBER (νd) | EFFECTIVE DIAMETER (Di) | LENS NAME | |
|---|---|---|---|---|---|---|---|
| [1] | 38.557 | 1.70 | 1.63980 | 34.47 | 32.2 | L11 | B11 |
| [2] | 26.205 | 5.20 | 1.83481 | 42.74 | 29.8 | L12 | |
| [3] | 77.6 | 1.28 | | | 28.0 | | |
| [4] | 23.972 | 6.30 | 1.58913 | 61.13 | 23.3 | L13 | B12 |
| [5] | 129 | 1.30 | 1.60342 | 38.03 | 19.7 | L14 | |
| [6] | 15.62 | 8.75 | | | 16.7 | | |
| [7] (STOP) | INFINITY | 8.45 | | | 15.1 | St | |
| [8] | -17.672 | 1.40 | 1.59551 | 39.24 | 18.2 | L21 | B21 |
| [9] | -42.478 | 3.30 | 1.49700 | 81.54 | 21.5 | L22* | |
| [10] | -24.498 | 0.20 | | | 23.7 | | |
| [11] | 271.932 | 6.80 | 1.53775 | 74.7 | 29.2 | L23* | |
| [12] | -29.703 | (VARIABLE) | | | 30.9 | | |
| [13] | -579.519 | 12.37 | 1.89190 | 37.13 | 37.5 | L31 | B31 |
| [14] | -31.09 | 4.60 | 1.69895 | 30.13 | 39.1 | L32 | |
| [15] | -88.755 | 4.35 | | | 40.4 | | |
| [16] | -35.501 | 2.20 | 1.48749 | 70.24 | 40.4 | L33 | |
| [17] | -1023.357 | 20.73 | | | 43.6 | | |
| [18] | INFINITY | 0.80 | 1.53741 | 61.81 | 55.2 | COVER | |
| [19] | INFINITY | 1.00 | 1.52312 | 54.36 | 55.5 | COVER | |
| [20] | INFINITY | | | | 55.9 | | |

Fig. 3

| OBJECT DISTANCE | INFINITY | 2400mm | 400mm |
|---|---|---|---|
| FOCAL LENGTH | 65.02 | 65.03 | 65.09 |
| F No. | 2.80 | 2.88 | 3.36 |
| ANGLE OF VIEW | 46.8 | 45.6 | 39.6 |
| d12 | 1.00 | 3.02 | 14.46 |

| LENS SURFACE NUMBER (S) | RADIUS OF CURVATURE (Ri) | DISTANCE (di) | REFRACTIVE INDEX (nd) | ABBE NUMBER ($\nu$d) | EFFECTIVE DIAMETER (Di) | LENS NAME | |
|---|---|---|---|---|---|---|---|
| [1] | 34.240 | 1.70 | 1.63980 | 34.47 | 30.9 | L11 | B11 |
| [2] | 22.700 | 5.50 | 1.83481 | 42.74 | 28.2 | L12 | |
| [3] | 62.100 | 0.20 | | | 26.3 | | |
| [4] | 23.170 | 5.16 | 1.58913 | 61.13 | 23.2 | L13 | B12 |
| [5] | 588.000 | 1.30 | 1.57501 | 41.5 | 20.2 | L14 | |
| [6] | 15.010 | 8.46 | | | 15.4 | | |
| [7] (STOP) | INFINITY | 9.15 | | | 13.3 | St | |
| [8] | -17.210 | 1.40 | 1.59551 | 39.24 | 17.5 | L21 | B21 |
| [9] | -73.580 | 4.20 | 1.49700 | 81.54 | 21.3 | L22* | |
| [10] | -23.380 | 0.20 | | | 23.7 | | |
| [11] | 198.920 | 7.30 | 1.51633 | 64.14 | 29.6 | L23 | |
| [12] | -31.510 | (VARIABLE) | | | 31.5 | | |
| [13] | -841.431 | 12.50 | 1.89190 | 37.13 | 37.7 | L31 | B31 |
| [14] | -34.450 | 4.60 | 1.69895 | 30.13 | 39.5 | L32 | |
| [15] | -97.390 | 4.30 | | | 40.9 | | |
| [16] | -37.920 | 2.20 | 1.48749 | 70.24 | 40.9 | L33 | |
| [17] | -835.500 | 18.00 | | | 43.9 | | |
| [18] | INFINITY | 0.80 | 1.53741 | 61.81 | 54.1 | COVER | |
| [19] | INFINITY | 1.00 | 1.52312 | 54.36 | 54.3 | COVER | |
| [20] | INFINITY | | | | 54.7 | | |

Fig. 9

| OBJECT DISTANCE | INFINITY | 2400mm | 410mm |
|---|---|---|---|
| FOCAL LENGTH | 65.00 | 65.02 | 65.10 |
| F No. | 3.24 | 3.33 | 3.84 |
| ANGLE OF VIEW | 46.8 | 45.6 | 40.0 |
| d12 | 1.00 | 3.02 | 14.00 |

| LENS SURFACE NUMBER (S) | RADIUS OF CURVATURE (Ri) | DISTANCE (di) | REFRACTIVE INDEX (nd) | ABBE NUMBER ($\nu$d) | EFFECTIVE DIAMETER (Di) | LENS NAME | |
|---|---|---|---|---|---|---|---|
| [1] | 37.86 | 2.10 | 1.51742 | 52.43 | 40.5 | L11 | B11 |
| [2] | 26.96 | 8.10 | 1.80400 | 46.53 | 36.9 | L12 | |
| [3] | 99 | 0.20 | | | 34.3 | | |
| [4] | 22.742 | 6.30 | 1.64000 | 60.08 | 27.4 | L13 | B12 |
| [5] | 172.8 | 1.40 | 1.80100 | 34.97 | 23.4 | L14 | |
| [6] | 15.8342 | 9.05 | | | 17.5 | | |
| [7] (STOP) | INFINITY | 8.55 | | | 14.0 | St | |
| [8] | −19.24 | 1.45 | 1.62004 | 36.26 | 18.8 | L21 | B21 |
| [9] | −222.9737 | 3.90 | 1.53775 | 74.7 | 23.9 | L22* | |
| [10] | −35.39 | 0.20 | | | 26.4 | | |
| [11] | −722.5 | 6.40 | 1.88300 | 40.76 | 31.8 | L23 | |
| [12] | −34.8 | (VARIABLE) | | | 33.7 | | |
| [13] | 591 | 12.20 | 1.81600 | 46.62 | 40.0 | L31 | B31 |
| [14] | −27.34 | 2.15 | 1.85026 | 32.27 | 40.8 | L32 | |
| [15] | −69.07 | 2.03 | | | 43.1 | | |
| [16] | −52.46 | 2.20 | 1.48749 | 70.24 | 43.1 | L33 | |
| [17] | −1000 | 24.00 | | | 45.1 | | |
| [18] | INFINITY | 0.80 | 1.53741 | 61.81 | 55.4 | COVER | |
| [19] | INFINITY | 1.00 | 1.52312 | 54.36 | 55.6 | COVER | |
| [20] | INFINITY | | | | 55.9 | | |

Fig. 15

| OBJECT DISTANCE | INFINITY | 2400 mm | 545mm |
|---|---|---|---|
| FOCAL LENGTH | 64.97 | 65.49 | 67.50 |
| F No. | 2.80 | 2.90 | 3.25 |
| ANGLE OF VIEW | 47.6 | 46.2 | 41.4 |
| d12 | 1.00 | 3.40 | 12.33 |

Fig. 20

| LENS SURFACE NUMBER (S) | RADIUS OF CURVATURE (Ri) | DISTANCE (di) | REFRACTIVE INDEX (nd) | ABBE NUMBER (νd) | EFFECTIVE DIAMETER (Di) | LENS NAME | |
|---|---|---|---|---|---|---|---|
| [1] | 33.253 | 6.30 | 1.80400 | 46.53 | 38.9 | L11 | |
| [2] | 92.290 | 0.20 | | | 36.8 | | |
| [3] | 23.300 | 6.60 | 1.48749 | 70.24 | 29.6 | L13 | B12 |
| [4] | 98.870 | 1.60 | 1.62004 | 36.26 | 25.6 | L14 | |
| [5] | 15.860 | 10.34 | | | 19.1 | | |
| [6] (STOP) | INFINITY | 8.30 | | | 14.7 | St | |
| [7] | −20.180 | 1.40 | 1.62004 | 36.26 | 18.1 | L21 | B21 |
| [8] | −23150.497 | 5.35 | 1.53775 | 74.70 | 22.6 | L22* | |
| [9] | −25.370 | 0.20 | | | 25.3 | | |
| [10] | 218.000 | 8.00 | 1.89190 | 37.13 | 31.7 | L23a | B22 |
| [11] | −28.690 | 1.75 | 1.59551 | 39.24 | 33.0 | L23b | |
| [12] | −326.000 | (VARIABLE) | | | 35.9 | | |
| [13] | 516.200 | 11.65 | 1.85150 | 40.78 | 40.4 | L31 | B31 |
| [14] | −28.750 | 2.20 | 1.91650 | 31.60 | 41.1 | L32 | |
| [15] | −54.820 | 1.61 | | | 43.2 | | |
| [16] | −47.400 | 2.20 | 1.61293 | 37.00 | 43.0 | L33 | |
| [17] | −1000.000 | 24.50 | | | 45.0 | | |
| [18] | INFINITY | 0.80 | 1.53741 | 61.81 | 55.5 | COVER | |
| [19] | INFINITY | 1.00 | 1.52312 | 54.36 | 55.7 | COVER | |
| [20] | INFINITY | | | | 56.0 | | |

Fig. 21

| OBJECT DISTANCE | INFINITY | 2500mm | 555mm |
|---|---|---|---|
| FOCAL LENGTH | 65.01 | 65.57 | 67.72 |
| F No. | 2.80 | 2.90 | 3.25 |
| ANGLE OF VIEW | 47.6 | 46.2 | 41.4 |
| d12 | 1.00 | 3.47 | 12.45 |

| LENS SURFACE NUMBER (S) | RADIUS OF CURVATURE (Ri) | DISTANCE (di) | REFRACTIVE INDEX (nd) | ABBE NUMBER ($\nu$d) | EFFECTIVE DIAMETER (Di) | LENS NAME | |
|---|---|---|---|---|---|---|---|
| [1] | 34.68 | 2.20 | 1.48749 | 70.24 | 38.6 | L11 | B11 |
| [2] | 24.73 | 8.10 | 1.83481 | 42.74 | 35.0 | L12 | |
| [3] | 87.1 | 0.20 | | | 32.2 | | |
| [4] | 24.4 | 5.50 | 1.58313 | 59.37 | 26.2 | L13 | B12 |
| [5] | 207.0256 | 1.50 | 1.80000 | 29.84 | 22.5 | L14 | |
| [6] | 16.2733 | 8.32 | | | 17.0 | | |
| [7] (STOP) | INFINITY | 8.63 | | | 14.3 | St | |
| [8] | −16.4 | 1.40 | 1.59551 | 39.24 | 18.2 | L21 | B21 |
| [9] | −161.24 | 4.60 | 1.51633 | 64.14 | 23.8 | L22 | |
| [10] | −29 | 0.20 | | | 26.7 | | |
| [11] | −235.5 | 6.45 | 1.88300 | 40.76 | 32.4 | L23 | |
| [12] | −33.17 | (VARIABLE) | | | 34.4 | | |
| [13] | 302.8 | 11.10 | 1.69680 | 55.53 | 40.0 | L31 | B31 |
| [14] | −30.1 | 2.00 | 1.80000 | 29.84 | 40.7 | L32 | |
| [15] | −54.8 | 0.77 | | | 42.8 | | |
| [16] | −56.37 | 2.10 | 1.48749 | 70.24 | 42.8 | L33 | |
| [17] | −1000 | 29.00 | | | 44.4 | | |
| [18] | INFINITY | 0.80 | 1.53741 | 61.81 | 55.5 | COVER | |
| [19] | INFINITY | 1.00 | 1.52312 | 54.36 | 55.7 | COVER | |
| [20] | INFINITY | | | | 55.9 | | |

Fig. 27

| OBJECT DISTANCE | INFINITY | 2400 mm | 540 mm |
|---|---|---|---|
| FOCAL LENGTH | 65.00 | 65.78 | 68.92 |
| F No. | 2.80 | 2.90 | 3.27 |
| ANGLE OF VIEW | 47.8 | 46.4 | 41.2 |
| d12 | 1.00 | 3.76 | 14.20 |

| LENS SURFACE NUMBER (S) | RADIUS OF CURVATURE (Ri) | DISTANCE (di) | REFRACTIVE INDEX (nd) | ABBE NUMBER (νd) | EFFECTIVE DIAMETER (Di) | LENS NAME | |
|---|---|---|---|---|---|---|---|
| [1] | 34.8 | 2.20 | 1.48749 | 70.24 | 38.6 | L11 | B11 |
| [2] | 24.78 | 8.00 | 1.83481 | 42.74 | 34.9 | L12 | |
| [3] | 86.17 | 0.20 | | | 32.2 | | |
| [4] | 24.1855 | 5.50 | 1.58313 | 59.37 | 26.3 | L13 | B12 |
| [5] | 180.8 | 1.50 | 1.80000 | 29.84 | 22.5 | L14 | |
| [6] | 16.18 | 8.41 | | | 17.0 | | |
| [7] (STOP) | INFINITY | 8.70 | | | 14.3 | St | |
| [8] | -16.32 | 1.40 | 1.59551 | 39.24 | 18.3 | L21 | B21 |
| [9] | -134.8208 | 4.65 | 1.51633 | 64.14 | 23.8 | L22 | |
| [10] | -28.37 | 0.20 | | | 26.7 | | |
| [11] | -233 | 6.46 | 1.88300 | 40.76 | 32.5 | L23 | |
| [12] | -33.1619 | (VARIABLE) | | | 34.4 | | |
| [13] | 327.2557 | 11.10 | 1.69680 | 55.53 | 40.0 | L31 | B31 |
| [14] | -29.96 | 2.00 | 1.80000 | 29.84 | 40.7 | L32 | |
| [15] | -55.91 | 0.68 | | | 42.8 | | |
| [16] | -58.03 | 2.10 | 1.48749 | 70.24 | 42.8 | L33 | |
| [17] | -1000 | 29.00 | | | 44.4 | | |
| [18] | INFINITY | 0.80 | 1.53741 | 61.81 | 55.4 | COVER | |
| [19] | INFINITY | 1.00 | 1.52312 | 54.36 | 55.6 | COVER | |
| [20] | INFINITY | | | | 55.8 | | |

Fig. 33

| OBJECT DISTANCE | INFINITY | 2500 mm | 600 mm |
|---|---|---|---|
| FOCAL LENGTH | 65.02 | 65.73 | 68.32 |
| F No. | 2.80 | 2.89 | 3.21 |
| ANGLE OF VIEW | 47.8 | 46.4 | 42.0 |
| d12 | 1.00 | 3.59 | 12.61 |

| LENS SURFACE NUMBER (S) | RADIUS OF CURVATURE (Ri) | DISTANCE (di) | REFRACTIVE INDEX (nd) | ABBE NUMBER ($\nu$d) | EFFECTIVE DIAMETER (Di) | LENS NAME | |
|---|---|---|---|---|---|---|---|
| [1] | 43.241 | 2.20 | 1.48749 | 70.45 | 37.9 | L11 | B11 |
| [2] | 29.422 | 5.70 | 1.88100 | 40.15 | 34.7 | L12 | |
| [3] | 71.635 | 0.20 | | | 32.7 | | |
| [4] | 22.082 | 6.00 | 1.65160 | 58.54 | 27.5 | L13 | |
| [5] | 65.881 | 0.20 | | | 23.8 | | |
| [6] | 61.265 | 1.60 | 1.72825 | 28.31 | 23.0 | L14 | |
| [7] | 15.361 | 12.35 | | | 17.8 | | |
| [8] (STOP) | INFINITY | 7.41 | | | 14.4 | St | |
| [9] | -19.314 | 1.40 | 1.59270 | 35.45 | 20.8 | L21 | B21 |
| [10] | -115.330 | 3.40 | 1.60311 | 60.74 | 25.9 | L22 | |
| [11] | -39.341 | 0.20 | | | 28.0 | | |
| [12] | -174.719 | 6.40 | 1.88300 | 40.8 | 31.8 | L23 | |
| [13] | -32.474 | (VARIABLE) | | | 33.9 | | |
| [14] | -2291.766 | 9.67 | 1.83481 | 42.72 | 41.0 | L31 | B31 |
| [15] | -32.690 | 2.00 | 2.00069 | 25.46 | 41.6 | L32 | |
| [16] | -60.218 | 1.17 | | | 43.8 | | |
| [17] | -56.729 | 2.2 | 1.48749 | 70.45 | 43.8 | L33 | |
| [18] | -202.663 | 27 | | | 45.4 | | |
| [19] | INFINITY | 0.8 | 1.53740 | 61.71 | 54.6 | COVER | |
| [20] | INFINITY | 1.0 | 1.52310 | 54.49 | 54.8 | COVER | |
| [21] | INFINITY | | | | 55.0 | | |

Fig. 39

| OBJECT DISTANCE | INFINITY | 3000 mm | 590 mm |
|---|---|---|---|
| FOCAL LENGTH | 64.99 | 65.57 | 68.30 |
| F No. | 2.80 | 2.88 | 3.25 |
| ANGLE OF VIEW | 47.6 | 46.4 | 42.0 |
| d13 | 1.00 | 3.08 | 12.36 |

| LENS SURFACE NUMBER (S) | RADIUS OF CURVATURE (Ri) | DISTANCE (di) | REFRACTIVE INDEX (nd) | ABBE NUMBER ($\nu$d) | EFFECTIVE DIAMETER (Di) | LENS NAME | |
|---|---|---|---|---|---|---|---|
| [1] | 39.686 | 5.56 | 1.7725 | 49.6 | 38.7 | L11 | |
| [2] | 84.177 | 0.20 | | | 36.2 | | |
| [3] | 26.548 | 8.33 | 1.6968 | 55.53 | 31.3 | L13 | B12 |
| [4] | -147.037 | 2.00 | 1.65412 | 39.68 | 27.4 | L14 | |
| [5] | 16.446 | 8.86 | | | 18.9 | | |
| [6](STOP) | INFINITY | 9.20 | | | 15.2 | St | |
| [7] | -17.167 | 3.00 | 1.6727 | 32.1 | 17.0 | L21 | B21 |
| [8] | -73.498 | 4.62 | 1.7725 | 49.6 | 21.8 | L22 | |
| [9] | -27.782 | 0.20 | | | 24.9 | | |
| [10] | -236.603 | 5.51 | 1.7725 | 49.6 | 28.6 | L23 | |
| [11] | -35.494 | (VARIABLE) | | | 30.5 | | |
| [12] | 164.932 | 1.50 | 1.7432 | 49.34 | 35.2 | L31 | B31 |
| [13] | 39.778 | 6.88 | 1.59522 | 67.74 | 36.3 | L32* | |
| [14] | -343.626 | 34.37 | | | 37.0 | | |
| [15] | INFINITY | 0.80 | 1.5374 | 61.71 | 54.9 | COVER | |
| [16] | INFINITY | 1.00 | 1.5231 | 54.49 | 55.2 | COVER | |
| [17] | INFINITY | | | | 55.5 | | |

Fig. 45

| OBJECT DISTANCE | INFINITY | 2400 mm | 500 mm |
|---|---|---|---|
| FOCAL LENGTH | 65.00 | 65.33 | 66.74 |
| F No. | 2.80 | 2.88 | 3.19 |
| ANGLE OF VIEW | 46.8 | 45.6 | 41.0 |
| d11 | 2.00 | 4.21 | 13.48 |

(a)

(b)

(a)

(b)

LENS SYSTEM AND IMAGE PICKUP APPARATUS

TECHNICAL FIELD

The present invention relates to a lens system and an image pickup apparatus.

BACKGROUND ART

Japanese Laid-open Patent Publication No. 2014-126652 discloses a configuration composed, in order from the object side, of a first lens group that includes an aperture stop and has positive refractive power and a second lens group that has negative refractive power. When focusing from infinity to a near distance, the first lens group moves toward the object side. The first lens group is composed of a former first lens sub-group that has positive refractive power and is disposed on the object side of the aperture stop and a rear first lens sub-group that has positive refractive power and is disposed on the image side of the aperture stop. The former first lens sub-group includes a positive lens and, on the image side of the positive lens, a cemented lens composed of a positive lens with a convex surface facing the object side and a negative lens with a concave surface facing the image side.

SUMMARY OF THE INVENTION

In the field of medium telephoto or normal type (standard type) lenses, there is demand for a high-performance lens system.

One aspect of the present invention is a lens system for image pickup including, in order from an object side: a first lens group with positive refractive power that moves during focusing; a second lens group with positive refractive power that is disposed on an opposite side of a stop to the first lens group and moves during focusing; and a third lens group with positive refractive power that is fixed and is disposed closest to an image plane side (the most of image plane side). The third lens group includes a cemented lens composed, in order from the object side, of a lens with positive refractive power and a lens with negative refractive power, and a combined focal length f3 of the third lens group and a combined focal length f12 of the first lens group and the second lens group satisfy a following condition.

$$2 \leq f3/f12 \leq 200$$

This lens system has a positive-positive-positive three-group configuration. Among systems where positive refractive power is disposed on the object side, telephoto types where negative power is disposed on the image plane side are typical and are capable of providing compact normal-type to telephoto-type lens systems. On the other hand, when negative refractive power provided to the rear is used to diffuse light flux that has been narrowed by lenses with positive refractive power on the object side so as to enable the flux to reach the image plane, the amount of refraction of light rays at each lens becomes large, and in particular the amount of refraction at the lenses on the object side where the positive refractive power is concentrated increases, which makes aberration correction difficult. In order to favorably perform aberration correction, many lens surfaces are required, resulting in a tendency for the number of lenses to increase. When the number of lenses increases, differences between individual lenses and tolerances have a greater effect. In addition, when the number of lenses increases, the MTF (Modulation Transfer Function) tends to fall. Even if a design that improves the MTF is used, there is high probability that the actual MTF will fall or deteriorate unless the large number of lenses are disposed at predetermined positions with predetermined accuracy.

With the lens system according to the present aspect, the positive refractive power in a telephoto-type positive-negative arrangement is provided as a positive-positive-positive three-group configuration, so that the positive refractive power is distributed among the three lens groups. By doing so, concentration of the positive refractive power in any of the lens groups, and in particular the lens group on the object side, is avoided, which suppresses the occurrence of aberration and enables aberration to be corrected with a small number of lenses. In addition, by making the positive refractive power of the third lens group that is closest to the image plane side lower than the power of the other lens groups on the object side, a configuration suited to a medium telephoto is produced. For this reason, the combined focal length f3 of the third lens group and the combined focal length f12 of the first lens group and the second lens group satisfies the above condition.

In addition, the third lens group uses a cemented lens including a combination of a cemented surface with a certain amount of curvature and surfaces that have large curvature provided at a distance from the cemented surface, and by using a cemented lens where the distances (gaps) between surfaces do not need to be adjusted, various aberrations including chromatic aberration are corrected. Accordingly, the cemented lens occupies an extremely large proportion of the third lens group. On the other hand, if the distance (length) of the cemented lens becomes too large, the total length of the lens system becomes too long and the curvature of the cemented surface also becomes too large, which increases the manufacturing cost. For this reason, the cemented lens of the third lens group is made of glass with a high refractive index, so that a cemented lens with a predetermined aberration correction performance can be compactly provided.

For the reasons given above, the distance G3L on the optical axis of the third lens group G3 (that is, the total length of the third lens group) and the distance B31L on the optical axis of the cemented lens (that is, the length of the cemented lens) may satisfy the following condition, and additionally the refractive index nB31ab of at least one out of the lens with positive refractive power and the lens with negative refractive power in the cemented lens may satisfy the following condition.

$$0.6 \leq B31L/G3L \leq 1$$

$$1.8 \leq nB31ab \leq 2.0$$

The refractive index nB31a of the lens with positive refractive power in the cemented lens may satisfy the following condition.

$$1.65 \leq nB31a \leq 2.0$$

In this lens system, the third lens group uses a cemented lens that has a cemented surface with a certain amount of curvature, which is suited to correcting various aberrations, including chromatic aberration. Accordingly, the cemented lens occupies an extremely large proportion of the third lens group. On the other hand, if the distance (length) of the cemented lens becomes too large, the total length of the lens system becomes too long and the curvature of the cemented surface also becomes too large, which increases the manufacturing cost. For this reason, a lens with positive refractive power and a refractive index nB31a that satisfies the above condition is used in the cemented lens, so that a cemented lens with a predetermined aberration correction performance can be compactly provided.

Another aspect of the present invention is a lens system for image pickup composed, in order from the object side: a first lens group with positive refractive power; a second lens group with positive refractive power that is disposed on an opposite side of a stop to the first lens group; and a third lens group with positive refractive power that is disposed closest to an image plane side (the most of image plane side). The first lens group includes, in order from the object side, a first cemented lens composed of a lens with negative refractive power and a lens with positive refractive power and a second cemented lens composed of a lens with positive refractive power and a lens with negative refractive power, the second lens group includes, a third cemented lens, which in order from the object side is composed of a lens with negative refractive power and a lens with positive refractive power, and a rear lens with positive refractive power, the third lens group includes a fourth cemented lens composed, in order from the object side, of a lens with positive refractive power and a lens with negative refractive power, and a refractive index nB11b of the lens with positive refractive power in the first cemented lens and a refractive index nB31a of the lens with positive refractive power in the fourth cemented lens satisfy following conditions.

$$1.75 \leq nB11b \leq 2.0$$

$$1.75 \leq nB31a \leq 2.0$$

With the lens system according to the present aspect, the positive refractive power in a telephoto-type positive-negative arrangement is provided as a positive-positive-positive three-group configuration, so that the positive refractive power is distributed among the three lens groups. By doing so, concentration of the positive refractive power in any of the lens groups, and in particular the lens group on the object side, is avoided, which suppresses the occurrence of aberration and enables aberration to be corrected with a small number of lenses.

By disposing the first cemented lens, which is made up of a combination of a negative lens and a positive lens, closest to the object side (the most of object side) of the first lens group and disposing the fourth cemented lens with a symmetrical combination of refractive powers at a symmetrical position to the first cemented lens, the symmetry of the lens system can be improved, which is also effective in reducing the Petzval sum. In the first and fourth cemented lenses, it is preferable for the refractive power nB11b and the refractive power nB31a of the lenses with positive refractive power where the distance (thickness) along the optical axis increases to be large, and by satisfying the conditions above, it is possible to further improve the symmetry and provide a lens system capable of favorably correcting aberration.

Another aspect of the present invention is an image pickup apparatus (imaging device) including: the lens system described above; and an image pickup element disposed on an image plane side of the lens system.

BRIEF DESCRIPTION OF DRAWINGS

FIG. 2 depicts data on the respective lenses that construct the lens system according to Example 1.

FIG. 3 depicts various numerical values of the lens system according to Example 1.

FIG. 8 depicts data on the respective lenses that construct the lens system according to Example 2.

FIG. 9 depicts various numerical values of the lens system according to Example 2.

FIG. 14 depicts data on the respective lenses that construct the lens system according to Example 3.

FIG. 15 depicts various numerical values of the lens system according to Example 3.

FIG. 20 depicts data on the respective lenses that construct the lens system according to Example 4.

FIG. 21 depicts various numerical values of the lens system according to Example 4.

FIG. 26 depicts data on the respective lenses that construct the lens system according to Example 5.

FIG. 27 depicts various numerical values of the lens system according to Example 5.

FIG. 32 depicts data on the respective lenses that construct the lens system according to Example 6.

FIG. 33 depicts various numerical values of the lens system according to Example 6.

FIG. 38 depicts data on the respective lenses that construct the lens system according to Example 7.

FIG. 39 depicts various numerical values of the lens system according to Example 7.

FIG. 44 depicts data on the respective lenses that construct the lens system according to Example 8.

FIG. 45 depicts various numerical values of the lens system according to Example 8.

DESCRIPTION OF EMBODIMENTS

Figure 1:
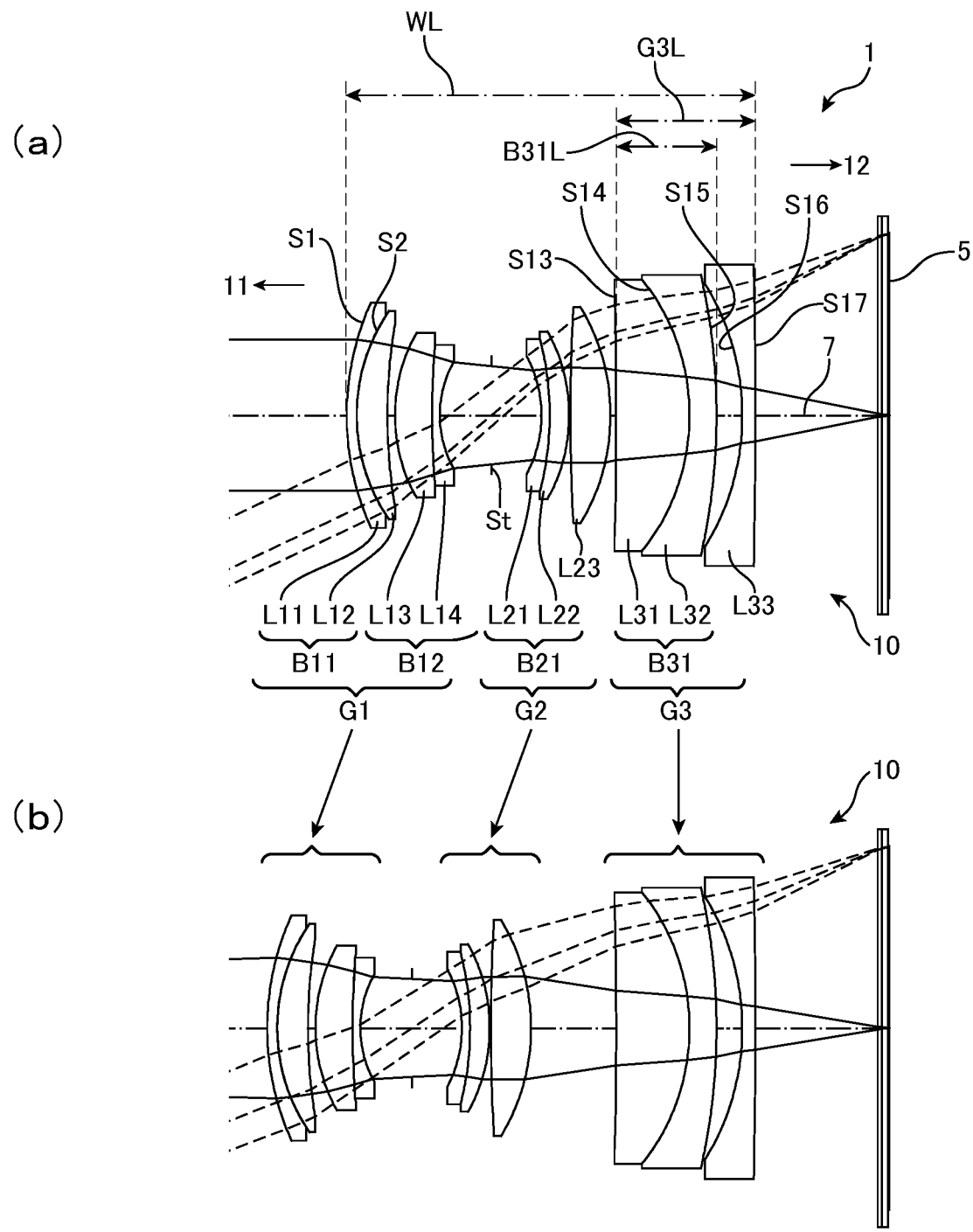
FIG. 1 depicts the configuration of a lens system of Example 1, with FIG. 1(a) depicting the lens arrangement when the focus position is infinity and FIG. 1(b) depicting the lens arrangement when the focus position is a nearest distance (shortest distance).

FIG. 1 depicts one example of an image pickup apparatus (imaging device, camera or camera apparatus) including an optical system for image pickup. FIG. 1(a) depicts a state where the system is focused at infinity, and FIG. 1(b) depicts a state where the system is focused at a nearest distance. The camera (image pickup apparatus) 1 includes a lens system (optical system, image pickup optical system or image forming optical system) 10 and an image pickup element (image pickup device, image plane, or image forming plane) 5 disposed on the image plane side (image side, image pickup side, or image forming side) 12 of the lens system 10. This lens system 10 for image pickup is composed, in order from the object side (subject side) 11, of a first lens group G1 with positive refractive power, a second lens group G2 with positive refractive power disposed on an opposite side of a stop St to the first lens group G1, and a third lens group G3 with positive refractive power. The first lens group G1, the stop St, and the second lens group G2 integrally move during focusing, and the third lens group G3 is fixed during focusing. That is, the distance between the third lens group G3 and the image plane 5 does not fluctuate due to focusing.

The lens system 10 has a positive-positive-positive three-group configuration and is a normal-type (standard-type) lens system with a 35 mm equivalent focal length of 55 mm, where the first lens group G1 and the second lens group G2 move along the optical axis 7 during focusing. Among systems where positive refractive power is disposed on the object side 11, telephoto types where negative power is disposed on the image plane side 12 are typical and are capable of providing normal-type to telephoto-type compact lens systems. But in an optical system, when negative refractive power provided to the rear is used to diffuse light flux that has been narrowed by lenses with positive refractive power on the object side 11 so as to enable the flux to reach the image plane, the amount of refraction of light rays at each lens becomes large, and in particular the amount of refraction at the lenses on the object side where the positive refractive power is concentrated increases, which makes aberration correction difficult. In order to favorably perform aberration correction, many lens surfaces are required, resulting in a tendency for the number of lenses to increase. When the number of lenses increases, differences between individual lenses and tolerances have a greater effect. In addition, when the number of lenses increases, the MTF (Modulation Transfer Function) tends to fall. Even if a design that improves the MTF is used, there is high probability that the actual MTF will fall or deteriorate unless the large number of lenses are disposed at predetermined positions with predetermined accuracy.

In the lens system 10 according to the present embodiment, the positive refractive power in a telephoto-type positive-negative arrangement is provided as a positive-positive-positive three-group configuration, so that the positive refractive power is distributed among the lens groups G1 to G3. By doing so, concentration of the positive refractive power in any of the lens groups, and in particular the lens group on the object side 11, is avoided, which suppresses the occurrence of aberration and enables aberration to be corrected with a small number of lenses. In addition, by making the positive refractive power of the third lens group G3 that is closest to the image plane side 12 (the most of image plane side) lower than the power of the other lens groups on the object side 11, a configuration suited to a medium telephoto is produced. In addition, by using combinations of lenses with negative refractive power as necessary, a configuration more suited for aberration correction is produced.

Accordingly, the combined focal length f3 of the third lens group G3 and the combined focal length f12 of the first lens group G1 and the second lens group G2 may satisfy the following Condition (1).

$$2 \leq f3/f12 \leq 200 \tag{1}$$

The lower limit of Condition (1) may be 3, or may be 100, and the upper limit may be 170. Accordingly, Condition (1) may be the following Condition (1a).

$$3 \leq f3/f12 \leq 200 \tag{1a}$$

In particular, the range of the following Condition (1b) can suppress the occurrence of aberration in the third lens group G3, and is suited to improving the MTF. The lower limit of Condition (1b) may be 110. As described above, the upper limit may be 200.

$$100 \leq f3/f12 \leq 170 \tag{1b}$$

Also, the range of the following Condition (1c) makes it possible for the third lens group G3 to be relatively compact, so that a lens system 10 that is compact as a whole can be provided. The upper limit of Condition (1c) may be 6.

$$2 \leq f3/f12 \leq 10 \tag{1c}$$

In addition, in the lens system 10 according to the present embodiment, the third lens group G3 includes a cemented lens B31 that has a cemented surface S14 with a certain amount of curvature and surfaces S13 and S15 that have large curvature provided at certain distances from the cemented surface S14, and by using a cemented lens where the distances (gaps, intervals) between surfaces do not need to be adjusted, various aberrations including chromatic aberration are corrected. In this configuration, the cemented lens B31 may occupy an extremely large area (length, proportion) of third lens group G3. But, if the distance (length) B31L of the cemented lens B31 becomes too large, the total length WL of the lens system 10 becomes too long and the curvature of the cemented surface S14 also becomes too large, which increases the manufacturing cost. For this reason, the cemented lens B31 of the third lens group G3 may be made of glass with a high refractive index, so that a cemented lens B31 with a predetermined aberration correction performance can be compactly provided.

For the reasons given above, the distance G3L on the optical axis 7 from the surface S13 that is closest to the object side 11 of the third lens group G3 to the surface S17 that is closest to the image plane side 12 (that is, the total length of the third lens group G3) and the distance B31L on the optical axis 7 of the cemented lens B31 (that is, the distance between the surface S13 and the surface S15, which is the length of the cemented lens B31) may satisfy the following Condition (2).

$$0.6 \leq B31L/G3L \leq 1 \tag{2}$$

The lower limit of Condition (2) may be 0.65 and the upper limit may be 0.80. The range of Condition (2a) below in particular is suited to improving the MTF.

$$0.65 \leq B31L/G3L \leq 0.8 \tag{2a}$$

The refractive index nB31ab of at least one out of the lens L31 with positive refractive power and the lens L32 with negative refractive power in the cemented lens B31 may satisfy the following Condition (3).

$$1.8 \leq nB31ab \leq 2.0 \tag{3}$$

The distance (total length) G3L of the third lens group and the total length WL of the lens system 10 (that is, the distance on the optical axis 7 between the surface S1 closest to the object side 11 to the surface S17 closest to the image plane side 12) may satisfy Condition (4).

$$0.1 \leq G3L/WL \leq 0.5 \tag{4}$$

The lower limit of Condition (4) may be 0.2, or may be 0.25 or 0.28. The upper limit of Condition (4) may be 0.4.

Since the positive power of the third lens group G3 can be further reduced, disposing the lens L33 with negative refractive power on the image plane side 12 of the cemented lens B31 is effective in correcting various aberrations, including chromatic aberration. It is effective for the third lens group G3 to include, from the object side 11, the cemented lens B31 and a rear lens L33 that has negative refractive power and is concave on the object side 11. By disposing the lens L33 with negative refractive power and a concave surface on the object side 11 closest to the image plane side 12 (the most image plane side), a telephoto configuration or a configuration close to telephoto can be realized in combination with the lens groups G1 and G2 with positive refractive power disposed to the front (object side). This makes it easy to shorten the total length WL of the lens system. In addition, the lens L33 with negative refractive power closest to the image plane side 12 makes it possible to widen the light flux toward the image plane 5, which can produce a large image circle, as one example, a size of around 55 mm in diameter.

By constructing the third lens group G3 of the cemented lens B31 and the lens L33 with negative refractive power, it is possible to provide each lens with refractive power without increasing the power of the third lens group G3. Accordingly, aberration can be corrected more favorably without a large increase in the number of lenses, which is suited to improving the MTF.

The combined focal length f31ab of the lens L31 with positive refractive power and the lens L32 with negative refractive power in the cemented lens B31 and the focal length f3GL of the rear lens L33 may satisfy the following Condition (5).

$$0.5 \leq |f31ab/f3GL| \leq 1.1 \tag{5}$$

The lower limit of Condition (5) may be 0.7, or may be 1.0. In particular, in the range of the following Condition (5a), the power of the negative lens L33 to the rear is slightly higher than the power of the cemented lens B31, which results in favorable correction of aberration.

$$1.0 < |f31ab/f3GL| \leq 1.1 \tag{5a}$$

The combined focal length f31ab of the lens L31 with positive refractive power and the lens L32 with negative refractive power in the cemented lens B31, the focal length f3GL of the rear lens L33, and the combined focal length f3 of the third lens group G3 may satisfy the following Condition (6).

$$0 < (|f31ab|+|f3GL|)/|f3| \leq 1.3 \tag{6}$$

It is possible to set the total of the positive refractive power and the negative refractive power that construct the third lens group G3 the same or larger than the refractive power of the third lens group G3, and to provide a configuration suited to aberration correction without increasing the power of the third lens group G3. The upper limit of Condition (6) may be 1.0, or may be 0.7 or 0.1. In particular, in the range that satisfies the following Condition (6a), the positive refractive power of the cemented lens B31 and the negative refractive power of the rear negative lens L33 can be made substantially equal and sufficiently large relative to the refractive power of the third lens group G3, and since the total power of the third lens group G3 can be set at a weak power, this is suited to aberration correction.

$$0 < (|f31ab| + |f3GL|)/|f3| \leq 0.1 \tag{6a}$$

The cemented lens B31 of the third lens group G3 is preferably a combination, from the object side 11, of the lens L31 with positive refractive power and the lens L32 with negative refractive power. In the positive-positive-positive lens system 10, a cemented lens B11 composed of a combination of the lens L11 with negative refractive power and the lens L12 with positive refractive power is disposed closest to the object side 11 of the first lens group G1. The cemented lens B31 is a symmetrical combination of refractive powers at a symmetrical position to the cemented lens B11, which improves symmetry and is effective in reducing the Petzval sum. In the cemented lens B31, the refractive index nB31a of the lens L31 with positive refractive power with a large distance (i.e., thickness) along the optical axis 7 is preferably large and may satisfy the following Condition (7).

$$1.65 \leq nB31a \leq 2.0 \tag{7}$$

This refractive index nB31a and the refractive index nB11b of the lens L12 with positive refractive power that constructs the cemented lens B11 at the symmetrical position to the cemented lens B31 may satisfy the following Conditions (7a) and (11).

$$1.75 \leq nB31a \leq 2.0 \tag{7a}$$

$$1.75 \leq nB11b \leq 2.0 \tag{11}$$

In this cemented lens B31, as indicated in Condition (3), at least one refractive index out of the refractive index nB31a of the lens L31 with positive refractive power and the refractive index nB31b of the lens L32 of the negative refractive power is preferably 1.8 or higher. Accordingly, the refractive index nB31a of the lens L31 with positive refractive power is preferably large and may satisfy the following Condition (7b).

$$1.8 \leq nB31a \leq 2.0 \tag{7b}$$

Since it is possible to make the cemented lens B31 thin while maintaining a sufficient distance between the surfaces, together with Condition (2a), this is suited to disposing the lens L33 with negative refractive power to the rear of (that is, on the image plane side 12) of the cemented lens B31.

In addition, the refractive index nB31a of the lens L31 with positive refractive power in the cemented lens B31 may satisfy the following Condition (7c) or may satisfy the Condition (7d).

$$1.85 \leq nB31a \leq 2.0 \tag{7c}$$

$$1.88 \leq nB31a \leq 2.0 \tag{7d}$$

It is easy to provide refractive power at the cemented surface S14 of the cemented lens B31 that is concave on the object side 11, and possible to improve the aberration correction performance of the cemented lens B31. This means that it is possible to reduce the number of high-refractive-index lenses that construct the lens system 10, which is economical.

In particular, the refractive index nB31a of the lens L31 with positive refractive power in the cemented lens B31 is larger than the refractive index nB31b of the lens L32 with negative refractive power, and may satisfy the following Condition (8).

$$0.5 < nB31b/nB31a \leq 1 \tag{8}$$

This makes it easy to provide refractive power at the cemented surface S14 of the cemented lens B31 that is concave on the object side 11, and thereby possible to improve the aberration correction performance of the cemented lens B31. This means that it is possible to reduce the number of high-refractive-index lenses that construct the lens system 10, which is economical.

When focusing on the refractive index nB31b of the lens L32 with negative refractive power in the cemented lens B31, the following Condition (9) may be satisfied.

$$1.60 \leq nB31b < 1.87 \tag{9}$$

The relationship between the refractive index nB31b of the lens L32 with negative refractive power in the cemented lens B31 and the refractive index n3GL of the lens L33 with negative refractive power to the rear of the third lens group G3 may satisfy the following Condition (10).

$$0.5 < n3GL/nB31b < 1 \tag{10}$$

By making the refractive index n3GL of the rear negative lens L33, which is adjacent to the rear (image plane side) 12 of the cemented lens B31 and is concave on the object side 11, relatively small, it is possible to increase the curvature of the surface S16 on the object side 11 of the negative lens L33 (that is, to make the radius of curvature smaller). This means that the distance between the surfaces S15 and S16 can be set so that a peripheral part (edge part) of the surface S16 of the negative lens L33 that is concave on the object side 11 can be placed adjacent to or touching the surface S15 on the image plane side 12 of the cemented lens B31. This facilitates assembly of the lens system 10, and means a lens system 10 that has a stable and favorable MTF can be provided.

The first lens group G1 may include, in order from the object side 11, the first cemented lens B11 composed of the lens L11 with negative refractive power and the lens L12 with positive refractive power and a second cemented lens B12 composed of a lens L13 with positive refractive power and a lens L14 with negative refractive power. The second lens group G2 may include, in order from the object side 11, a third cemented lens B21 composed of a lens L21 with negative refractive power and a lens L22 with positive refractive power, and a rear lens L23 with positive refractive power. The third lens group G3 may include, in order from the object side 11, the fourth cemented lens B31 made up of the lens L31 with positive refractive power and the lens L32 with negative refractive power.

This lens system 10 has a substantially symmetrical arrangement of powers with, from the object side 11, negative-positive-positive-negative lenses and negative-positive-positive-positive-negative lenses on respective sides of the stop St. In addition, the negative-positive and positive-negative cemented lenses B11 and B12 are disposed on the object side 11 of the stop St, and the negative-positive and positive-negative cemented lenses B21 and B31 are disposed on the image plane side 12 to produce an arrangement that is also symmetrical in units of cemented lenses. The two cemented lenses B11 and B12 on the object side 11 are both combinations of a positive meniscus lens that is convex on the object side 11 and a negative meniscus lens that is convex on the object side 11, and the two cemented lenses B21 and B31 on the image plane side 12 are both combinations of a negative meniscus lens that is concave on the object side 11 and a positive meniscus lens that is concave on the object side 11, so that the orientations of the surfaces are also disposed so as to be symmetrical across the stop St. Accordingly, the arrangement as a whole is highly symmetrical, which makes aberration easy to correct, and is suited to reducing the Petzval sum. This means that the lens system 10 can obtain sharp and bright images and it is easy to improve the MTF.

Also, by disposing the negative meniscus-type cemented lenses B12 and B21 facing each other across the stop St, it is possible for light flux that has been collimated with respect to the optical axis 7 to pass through the stop St. As a result, a lens system 10 that is brighter and has a small F number can be provided.

In addition, although the configuration has ten lenses including the negative lens L33 closest to the image plane side 12, by including the four cemented lenses B11, B12, B21 and B31, the number of lens elements at the time of assembly is six. This means that the lens system 10 is easy to assemble, and the positions of the 10 lenses (L11 to L14, L21 to L23, and L31 to L33) can be set with high precision, which makes it possible to prevent deterioration or a fall in the MTF due to poor assembly and possible to provide the lens system 10 that has little fluctuation in tolerance due to assembly and has a low assembly sensitivity (that is, whose performance hardly fluctuates due to quality of assembly).

In addition, the refractive index nB11b of the lens L12 with positive refractive power in the first cemented lens B11 and the refractive index nB31a of the lens L31 with positive refractive power in the fourth cemented lens B31 may satisfy the conditions (7a) and (11) described above. The cemented surface S2 that is convex on the object side 11 and the cemented surface S14 that is concave on the object side 11 of the cemented lenses B11 and B31 positioned closest to the object side 11 and on the image plane side 12 of the lens system 10 can be provided with a certain refractive power. This means that aberration correction can be favorably performed, the number of lenses with a high refractive index included in the lens system 10 can be reduced, and a high-performance lens system 10 can be provided at low cost.

The refractive index nB31a of the lens L31 with positive refractive power in the cemented lens (fourth cemented lens) B31 of the third lens group G3 and the refractive index nB31b of the lens L32 with negative refractive power in the fourth cemented lens B31 may satisfy the above Condition (8), and the Abbe number vB11a of the lens L11 with negative refractive power and the Abbe number vB11b of the lens L12 with positive refractive power in the cemented lens (first cemented lens) B11 on the object side 11 of the first lens group G1 may satisfy the following Condition (12).

$$0.5 < vB11a/vB11b < 1 \tag{12}$$

By making the negative-positive cemented lens B11 disposed closest to the object side 11 (the most object side) of this lens system 10 and the positive-negative cemented lens B31 disposed closest to the image plane side 12 combinations of a high-refractive index, for example, 1.8 or higher, low dispersion (high Abbe number) positive lens, and a low-refractive index, for example, 1.7 or lower, and high dispersion (low Abbe number) negative lens, it is possible to provide the cemented surface S2 that is convex on the object side 11 and closest to the object side 11 and the cemented surface S14 that is concave on the object side 11 and closest to the image plane side 12 with optically symmetrical performance. Accordingly, aberration correction can be favorably performed, the number of lenses with a high refractive index included in the lens system 10 can be reduced, and a high-performance lens system 10 can be provided at low cost.

This lens system 10 has a positive-positive-positive three-group configuration, and the combined focal length f1 of the first lens group, the combined focal length f2 of the second lens group, and the combined focal length of the third lens group f3 may satisfy the following Condition (13).

$$f2 < f1 < f3 \tag{13}$$

By suppressing the refractive power of the first lens group G1 disposed closest to the object side 11 (the most of object side), it is possible to suppress the occurrence of aberration in the lens group on the object side 11 where the angle of light rays is most likely to be large. Also, using a lens made of anomalous dispersion glass in the second lens group G2 that has the highest refractive power is effective in improving the performance (MTF) of the lens system 10, and also effective in correcting chromatic aberration. Accordingly, the lenses L21 to L23 that compose the second lens group G2 may include at least one lens made of anomalous low dispersion glass. In addition, the second lens group G2 may include at least two lenses made of anomalous low dispersion glass. In more detail, the lens L22 with positive refractive power in the cemented lens (third cemented lens) B21 of the second lens group G2 may be anomalous low dispersion glass. The lens L23 with positive refractive power to the rear of the cemented lens B21 of the second lens group G2 may also be anomalous low dispersion glass.

Example 1

A more detailed description will now be given with reference to the drawings. FIG. 1 depicts the lens arrangement of the lens system 10 in different states. FIG. 1(a) depicts the lens arrangement when the focus position is at infinity, and FIG. 1(b) depicts the lens arrangement when the focus position is the nearest distance (near distance, 400 mm).

The lens system 10 is a normal-type (standard-type) lens with a focal length of around 65 mm at infinity (a 35 mm equivalent focal length of 55 mm), and has a suitable configuration for an interchangeable lens of the camera 1 used for shooting or recording (image pickup of) photographs, movies, or video. The lens system 10 has a three-group configuration composed, from the object side 11, of the first lens group G1 with overall positive refractive power and, on the other side of the stop St, the second lens group G2 with positive refractive power and the third lens group G3 with positive refractive power. The third lens group G3 is a fixed lens group that does not move, so that the distance from the image plane 5 does not change during focusing. When the focus position moves from infinity to the near distance during focusing, the first lens group G1 and the second lens group G2 disposed on opposite sides of the stop St integrally and monotonously move toward the object side 11.

FIG. 2 depicts data on the respective lenses that construct the lens system 10. The radius of curvature (Ri) is the radius of curvature (mm) of each surface of each lens disposed in order from the object side 11, the distance di is the distance (mm) between the respective lens surfaces, the effective diameter (Di) is the effective diameter of each lens surface (diameter, mm), the refractive index nd is the refractive index (d-line) of each lens, and the Abbe number vd is the Abbe number (d-line) of each lens. In FIG. 2, the lenses whose lens names have been marked with an asterisk are lenses that use anomalous dispersion glass. The same applies to the embodiments described later.

FIG. 3 depicts the values of the focal length f, the F number (F No.), the angle of view, and the variable distance d12 in the lens system 10 when the focal length of the lens system 10 is at infinity, at an intermediate position (2400 mm), and at the shortest distance (nearest distance, 400 mm).

FIG. 4(a) depicts spherical aberration, astigmatism, and distortion for when the focal length of the lens system 10 is at infinity. Spherical aberration is depicted for the wavelengths of 435.8400 nm (dashed line), 486.1300 nm (dotted line, short dashed line), 546.0700 nm (dot-dot-dash line), 587.5600 nm (short dot-dash line), and 656.2800 nm (solid line). Astigmatism is depicted for tangential (meridional) rays T and sagittal rays S. The same applies to the aberration diagrams described later.

FIG. 4(b) depicts the MTF of the lens system 10 with respect to image height. The solid line indicates RAD (the MTF on the sagittal plane) and the broken line indicates TAD (the MTF on the tangential (meridional) plane), and from the top, the MTF is depicted for 10 line pairs/mm (10 lp/mm), 20 line pairs/mm (20 lp/mm), and 30 line pairs/mm (30 lp/mm). The same applies to the following embodiments.

Figure 5:
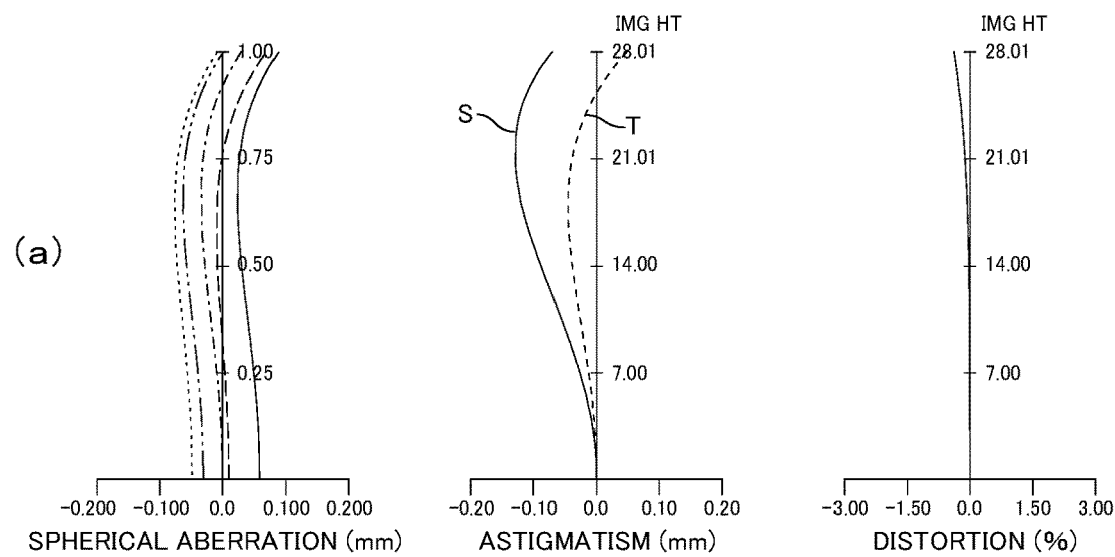
FIG. 5 is a diagram depicting various aberrations and the MTF of the lens system according to Example 1 when the focus is at an intermediate position.
Figure 5:
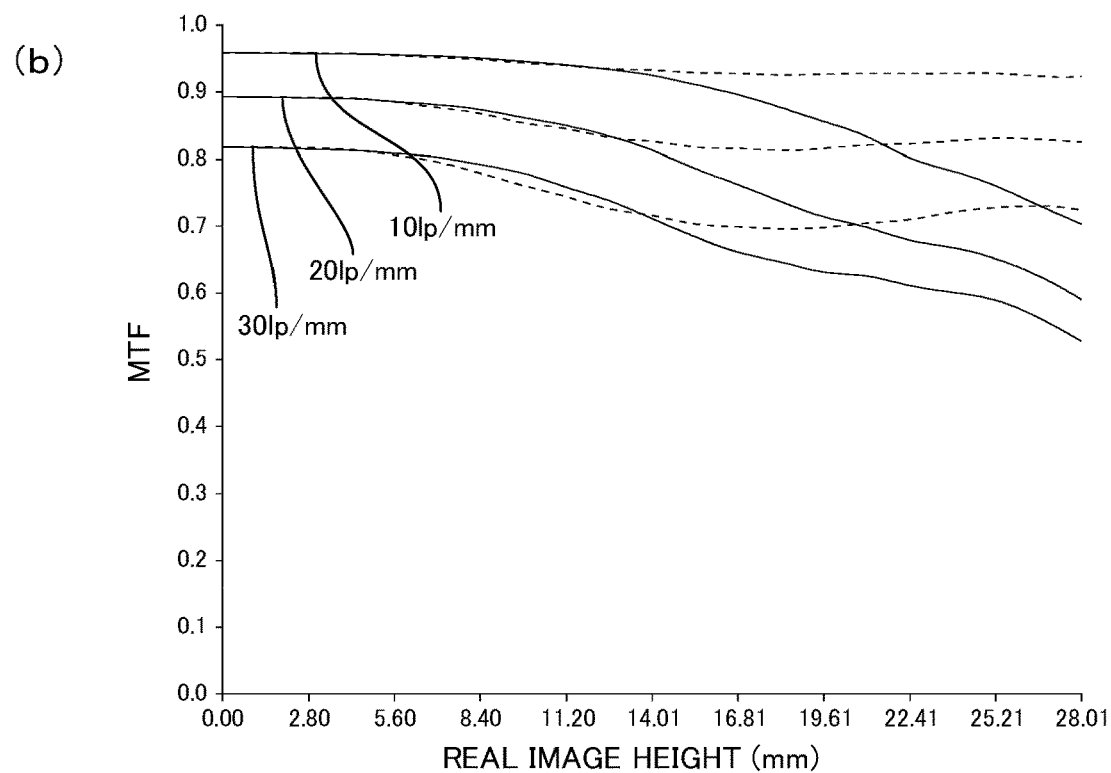
Figure 6:
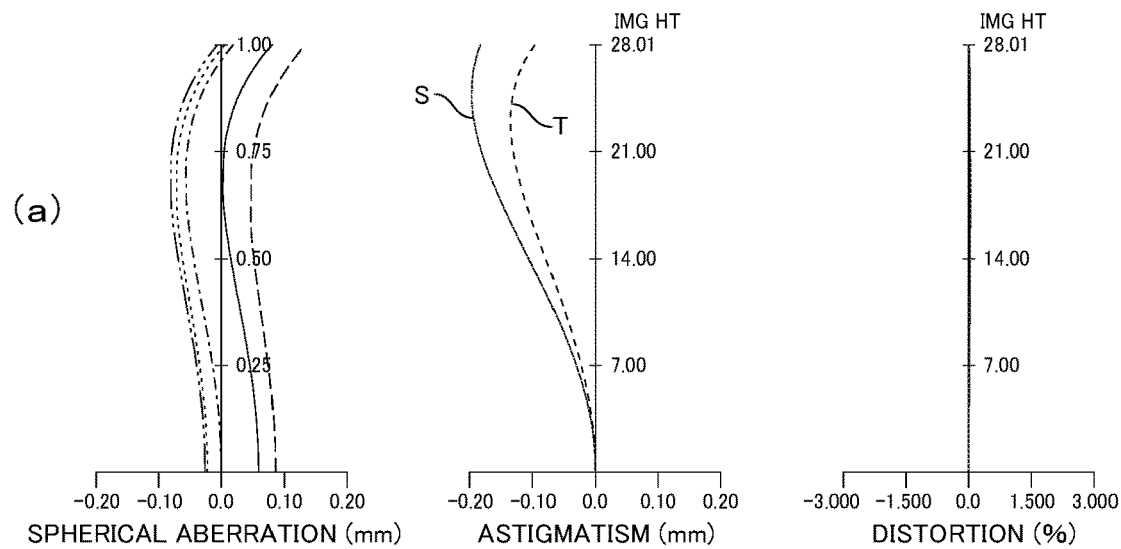
FIG. 6 is a diagram depicting various aberrations and the MTF of the lens system according to Example 1 when the focus is at a nearest distance.
Figure 6:
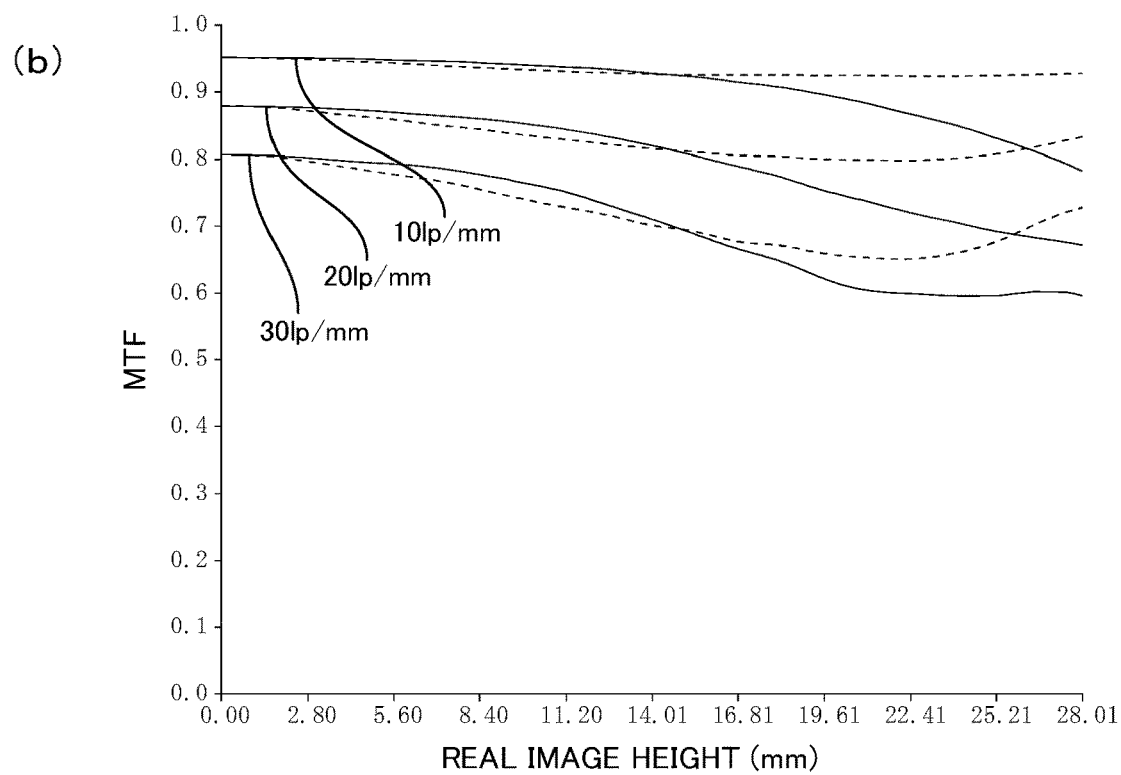

FIG. 5 depicts an aberration diagram (FIG. 5 (a)) and the MTF (FIG. 5(b)) at an intermediate position (2400 mm) and FIG. 6 depicts an aberration diagram (FIG. 6(a)) and the MTF (FIG. 6(b)) at the shortest distance (nearest distance, 400 mm).

The lens system 10 depicted in the drawings is composed of a total of 10 lenses (L11 to L14, L21 to L23, and L31 to L33). The first lens group G1 disposed closest to the object side 11 has a four-lens configuration including, from the object side 11, a meniscus lens L11 with negative refractive power that is convex on the object side 11, the meniscus lens L12 with positive refractive power that is convex on the object side 11, the meniscus lens L13 with positive refractive power that is convex on the object side 11, and the meniscus lens L14 with negative refractive power that is convex on the object side 11. The lenses L11 and L12 construct the positive meniscus-type cemented lens (balsam or first cemented lens) B11 that is convex on the object side 11, and the lenses L13 and L14 construct the negative meniscus-type cemented lens (balsam or second cemented lens) B12 that is convex on the object side 11.

The second lens group G2, which is opposite the first lens group G1 on the other side of the stop St, has a three-lens configuration including the negative meniscus lens L21 that is concave on the object side 11, the positive meniscus lens L22 that is concave on the object side 11, and the biconvex positive lens L23. The lenses L21 and L22 construct the negative meniscus-type cemented lens (balsam or third cemented lens) B21 that is concave on the object side 11.

The third lens group G3 has a three-lens configuration including, in order from the object side 11, the positive meniscus lens L31 that is concave on the object side 11, the negative meniscus lens L32 that is concave on the object side 11, and the negative meniscus lens L33 that is concave on the object side 11. The lenses L31 and L32 construct the positive meniscus-type cemented lens (balsam or fourth cemented lens) B31 that is concave on the object side 11.

Accordingly, the lens system 10 is composed of a total of ten lenses, but in terms of optical elements, is composed of six lenses made up of the four cemented lenses B11, B12, B21, and B31 and the two lenses L23 and L33. By using many cemented lenses, the lens system has a simple configuration and is easy to assemble.

Various numerical values and values of the respective conditions for the lens system 10 depicted in FIG. 1 are as follows. The unit of the focal length and the total length is mm. The same applies to the following embodiments.
Focal length of first lens group G1 (f1): 121.92
Focal length of second lens group G2 (f2): 73.40
Focal length of third lens group G3 (f3): 11124.26
Combined focal length of first and second lens groups (f12): 69.09
Focal length of cemented lens B31 (f31ab): 79.47
Focal length of the rear lens L33 of the third lens group G3 (f3GL): −75.50
Total length of lens system (WL): 69.2
Total length of third lens group G3 (G3L): 23.52
Total length of cemented lens B31 (B31L): 16.97
Condition (1) (f3/f12): 161.0
Condition (2) (B31L/G3L): 0.72
Condition (3) (nB31ab(max(nL31,nL32))): 1.89
Condition (4) (G3L/WL): 0.34
Condition (5) (|f31ab/f3GL|): 1.05
Condition (6) (|f31ab|+|f3GL|)/|f3|): 0.01
Condition (7) (nB31a(nL31)): 1.89
Condition (8) (nB31b/nB31a(nL32/nL31)): 0.90
Condition (9) (nB31b(nL32)): 1.70
Condition (10) (n3GL/nB31b(nL33/nL32)): 0.88
Condition (11) (nB11b(nL12)): 1.83
Condition (12) (vB11a/vB11b(vL11/vL12)): 0.81

The lens system 10 depicted in FIG. 1 includes all of the configurations described above, and also satisfies Conditions (1) to (13). The lens system 10 also satisfies all the conditions including Conditions (1a), (1b), (2a), (5a), (6a), and (7a) to (7d). Also, although anomalous dispersion lenses are used for the lenses L22 and L23 in the second lens group G2, there are only two high-refractive index lenses with a refractive index of 1.8 or higher, the lenses L12 and L31, which makes it possible to provide a lens system 10 that can favorably correct various aberrations at low cost.

Figure 4:
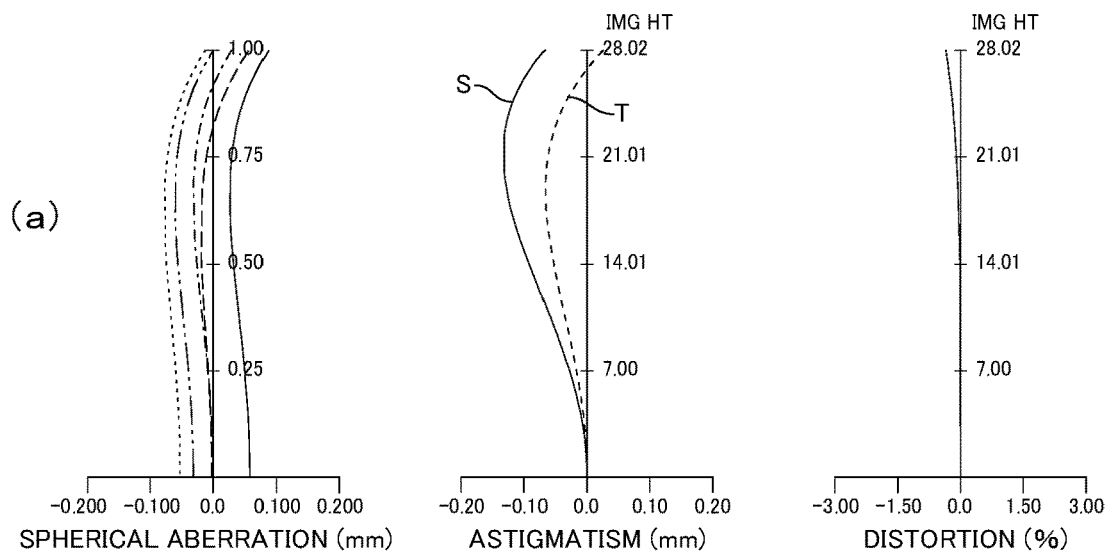
FIG. 4 is a diagram depicting various aberrations and the MTF of the lens system according to Example 1 when the focus is at infinity.
Figure 4:
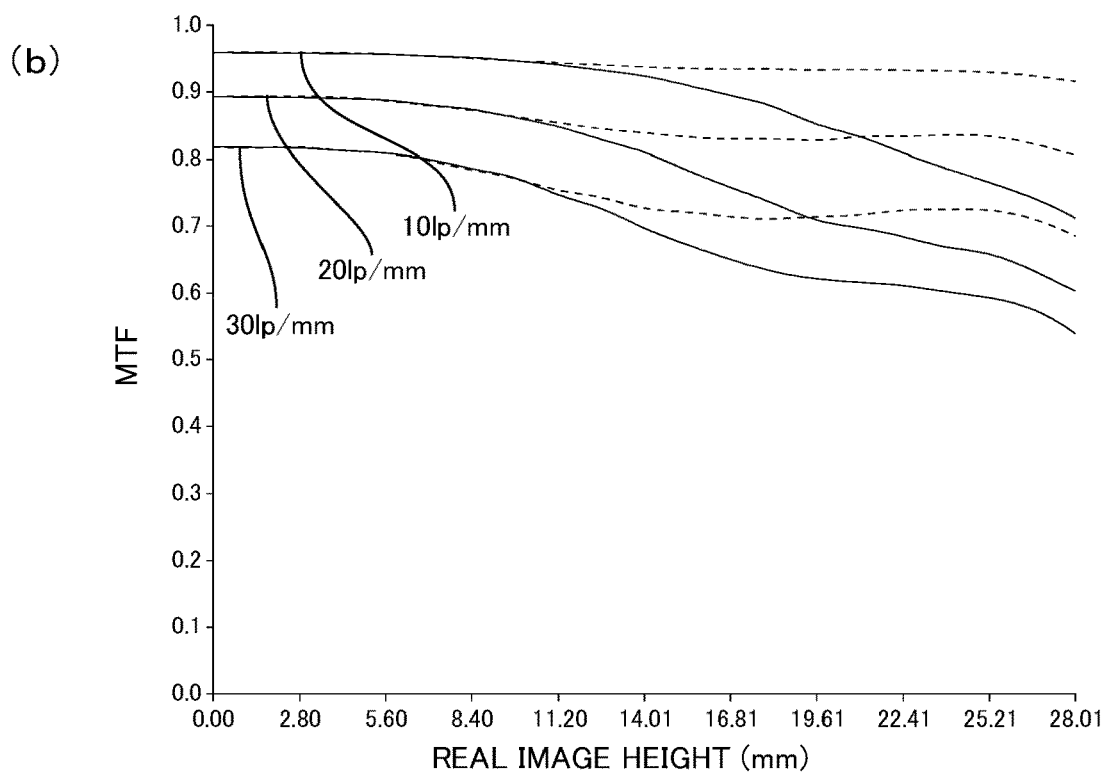

This lens system 10 has the performance of a medium-telephoto or normal type interchangeable lens with a focal length of around 65 mm when focused on infinity, and makes it possible to provide an image pickup lens that is bright with an F number of 2.80 and has a large angle of view of 46.8 degrees. Also, as depicted in FIGS. 4 to 6, it is possible to acquire images in which various aberrations have been favorably corrected across the entire focusing range from infinity to the near distance (short distance). In the MTF curves, no extreme drop in MTF was observed across the entire focusing range from infinity to the near distance, there is little separation between sagittal and tangential, and it can be understood that coma aberration, astigmatism, and the like are favorably corrected.

Example 2

Figure 7:
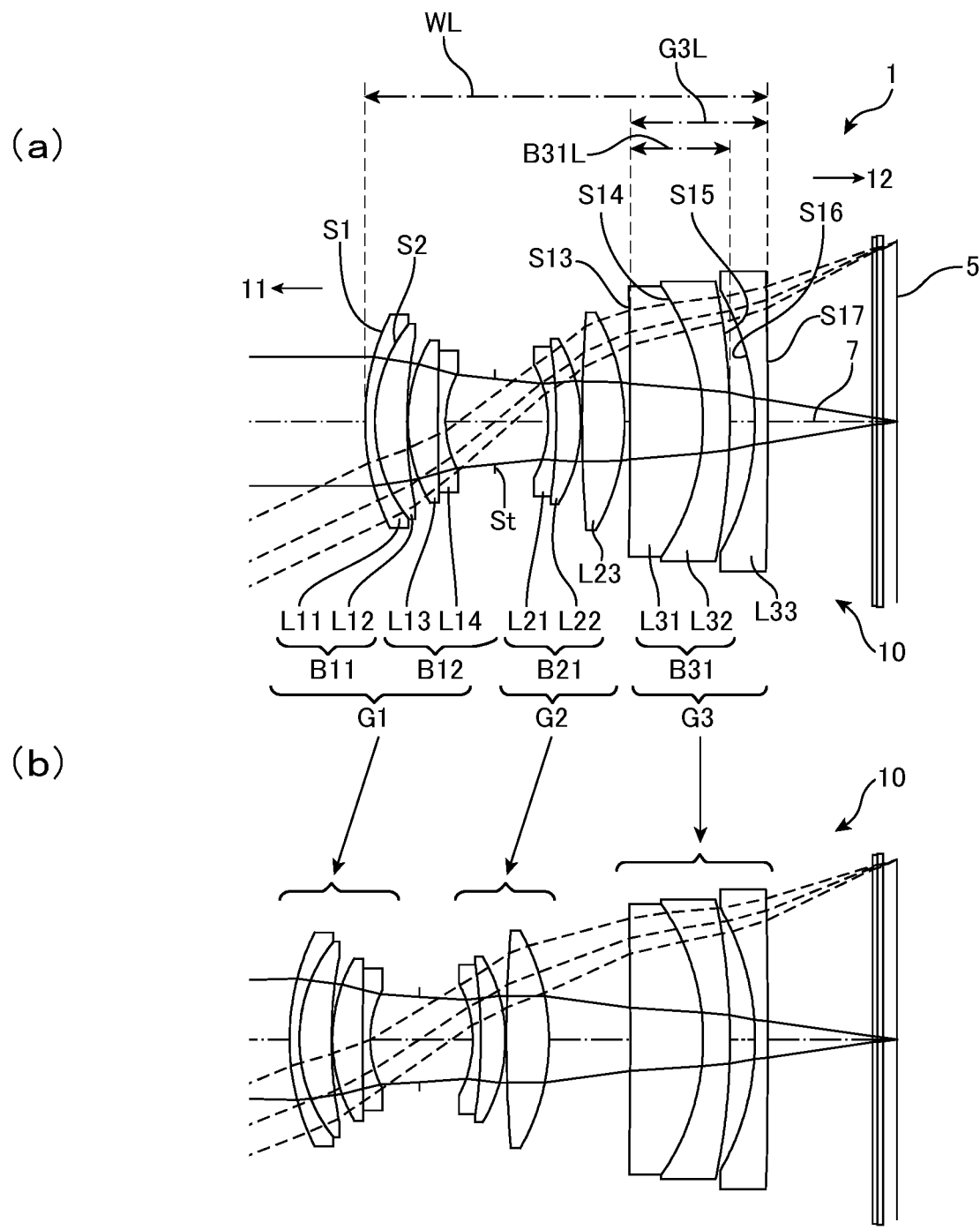
FIG. 7 depicts the configuration of a lens system according to Example 2, with FIG. 7(a) depicting the lens arrangement when the focus position is infinity and FIG. 7(b) depicting the lens arrangement when the focus position is a nearest (shortest) distance.

FIG. 7 depicts a different example of the lens system 10. FIG. 7(a) depicts the lens arrangement when the focus position is at infinity, and FIG. 7(b) depicts the lens arrangement when the focus position is the nearest distance (near distance, 410 mm).

This lens system 10 also has a three-group configuration with a positive-positive-positive arrangement of refractive powers and is composed, from the object side 11, of the first lens group G1 with overall positive refractive power and, on the other side of the stop St, the second lens group G2 with overall positive refractive power and the third lens group G3 with overall positive refractive power. The third lens group G3 is a fixed lens group that does not move, so that the distance from the image plane 5 does not change during focusing. When the focus position moves from infinity to the near distance during focusing, the first lens group G1 and the second lens group G2 disposed on opposite sides of the stop St integrally as one unit and monotonously move toward the object side 11.

Figure 10:
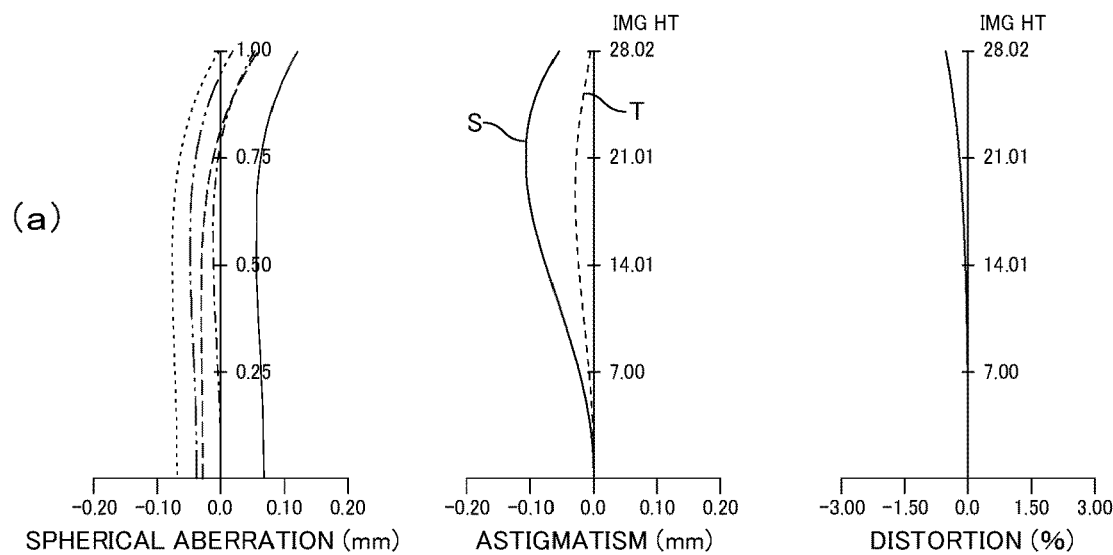
FIG. 10 is a diagram depicting various aberrations and the MTF of the lens system according to Example 2 when the focus is at infinity.
Figure 10:
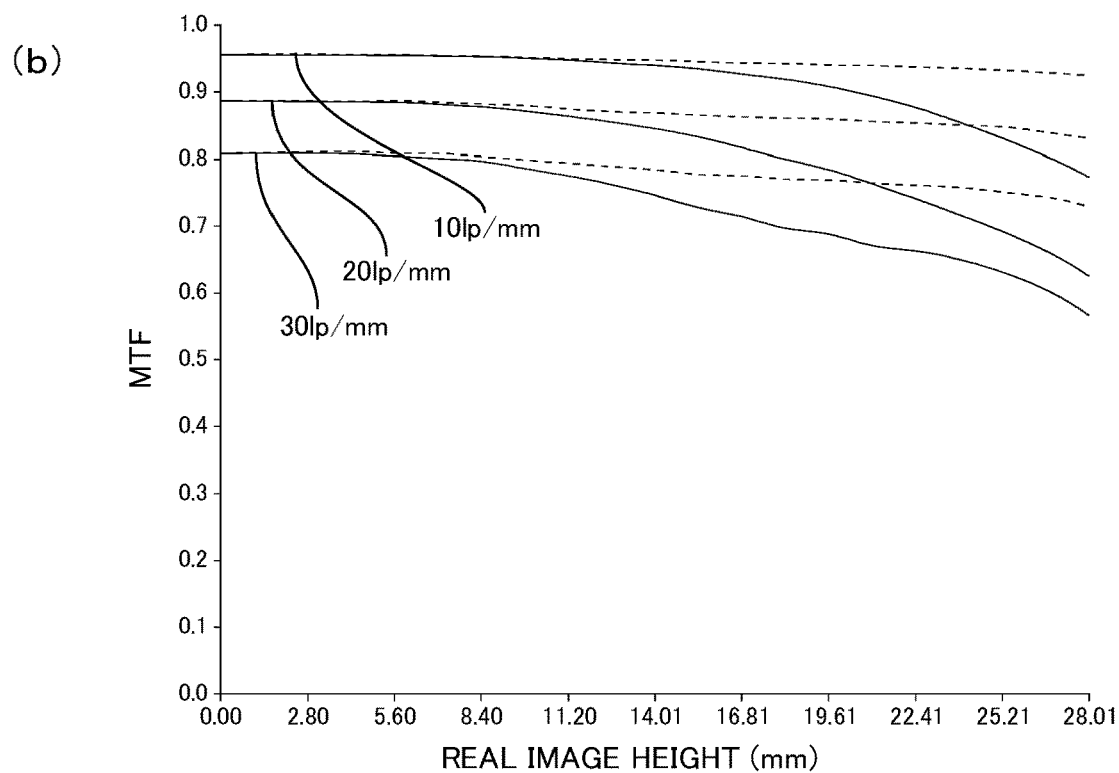
Figure 11:
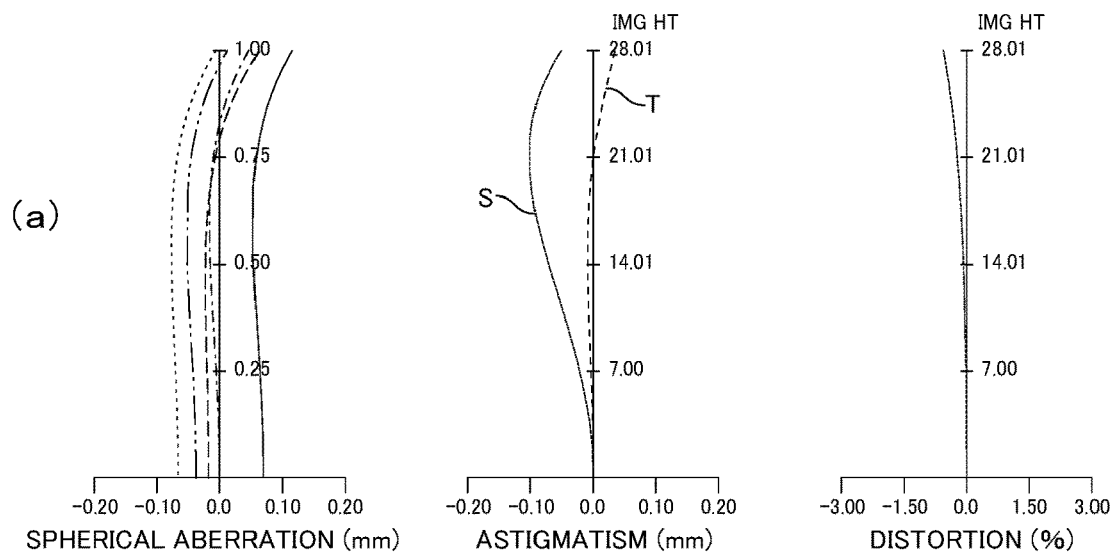
FIG. 11 is a diagram depicting various aberrations and the MTF of the lens system according to Example 2 when the focus is at an intermediate position.
Figure 11:
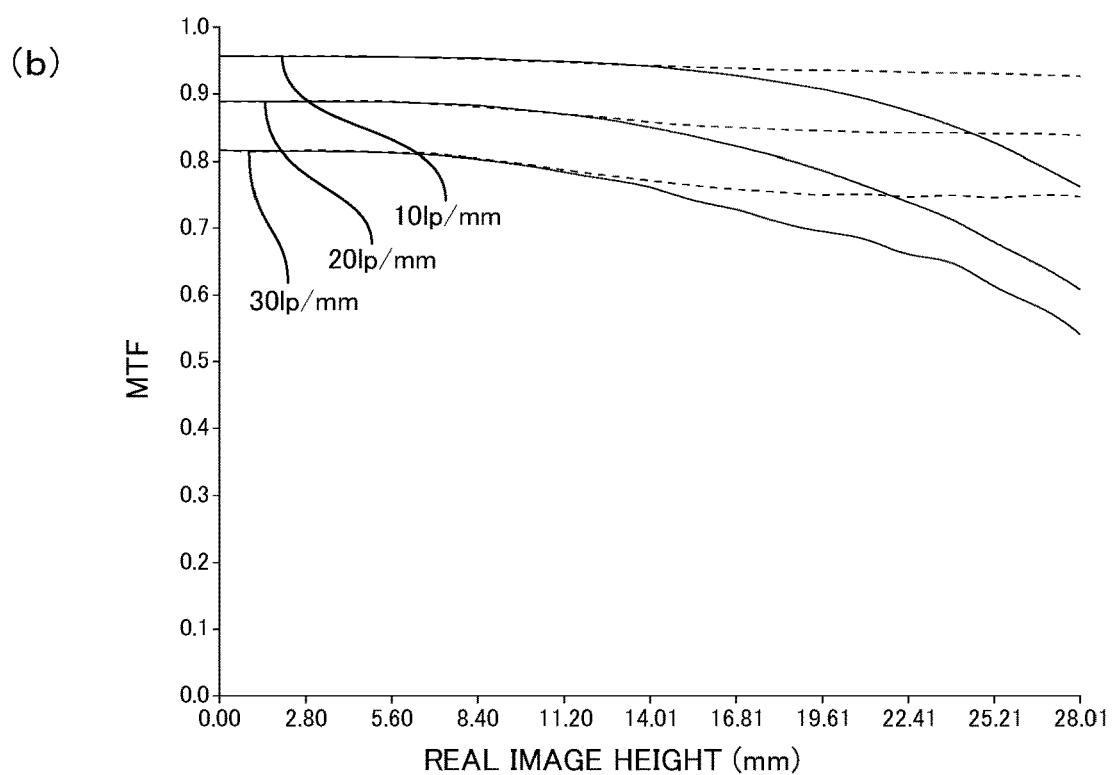
Figure 12:
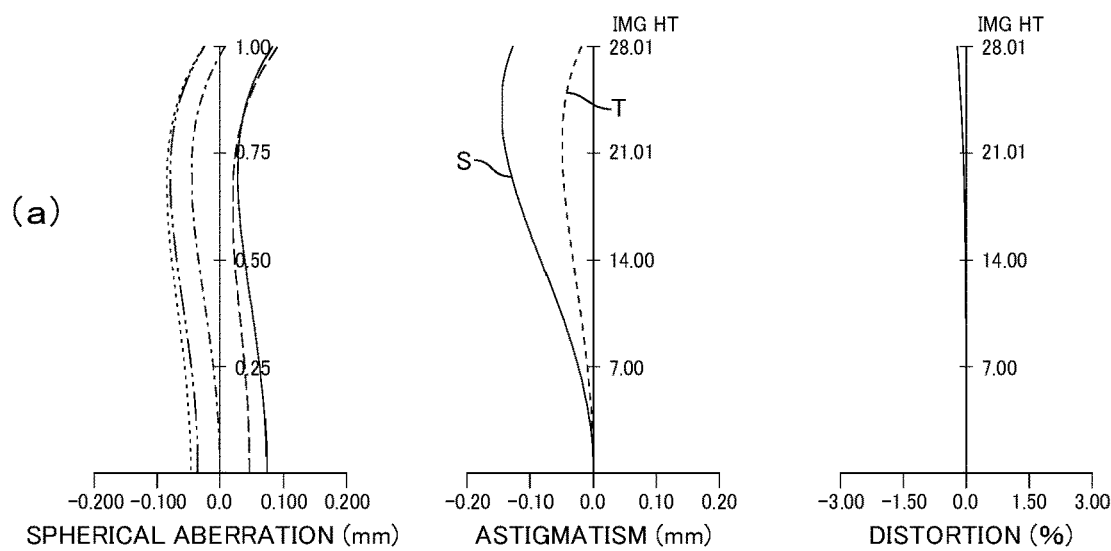
FIG. 12 is a diagram depicting various aberrations and the MTF of the lens system according to Example 2 when the focus is at a nearest distance.
Figure 12:
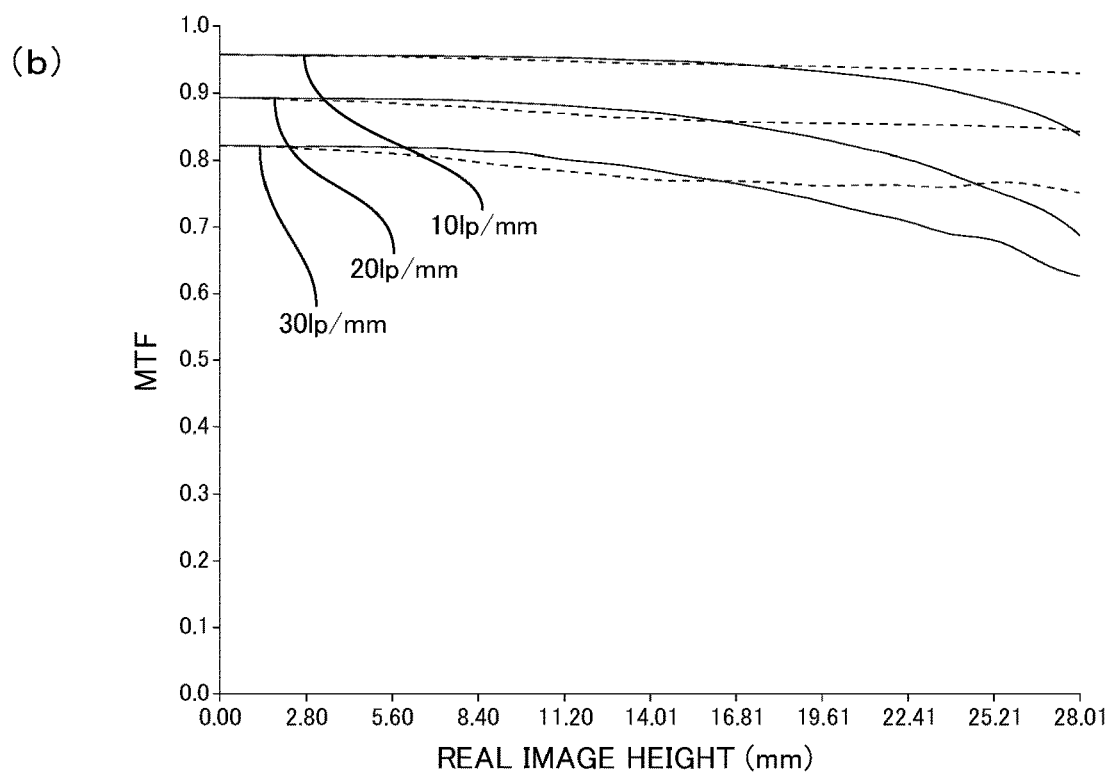

FIG. 8 depicts data on the respective lenses that construct the lens system 10. FIG. 9 depicts the values of the focal length f, the F number (F No.), the angle of view, and the variable distance d12 in the lens system 10 when the focal length of the lens system 10 is at infinity, at an intermediate position (2400 mm), and at the shortest distance (nearest distance, 410 mm). FIGS. 10 to 12 respectively depict various aberrations (FIGS. 10(*a*), 11(*a*), 12(*a*)) and the MTF (FIGS. 10(*b*), 11(*b*), 12(*b*)) when the focal distance of the lens system 10 is at infinity, at the intermediate position, and at the nearest distance.

The lens system 10 depicted in these drawings is composed of a total of 10 lenses (L11 to L14, L21 to L23, and L31 to L33), and the fundamental configuration of the individual groups and individual lenses are the same as Example 1 depicted in FIG. 1. Accordingly, this lens system 10 is also composed of a total of ten lenses, but in terms of optical elements, is composed of six lenses made up of the four cemented lenses B11, B12, B21, and B31 and the two lenses L23 and L33. By using many cemented lenses, the lens system has a simple configuration and is easy to assemble.

Various numerical values and values of the respective conditions for the lens system 10 depicted in FIG. 7 are as follows.
Focal length of first lens group G1 (f1): 106.87
Focal length of second lens group G2 (f2): 79.81
Focal length of third lens group G3 (f3): 7636.74
Combined focal length of first and second lens groups (f12): 69.00
Focal length of cemented lens B31 (f31ab): 85.34
Focal length of the rear lens L33 of the third lens group G3 (f3GL): −81.56
Total length of lens system (WL): 69.2
Total length of third lens group G3 (G3L): 23.60
Total length of cemented lens B31 (B31L): 17.10
Condition (1) (f3/f12): 110.7
Condition (2) (B31L/G3L): 0.72
Condition (3) (nB31ab (max (nL31, nL32))): 1.89
Condition (4) (G3L/WL): 0.34
Condition (5) (|f31ab/f3GL|): 1.05
Condition (6) (|f31ab|+|f3GL|)/|f3|): 0.02
Condition (7) (nB31a(nL31)): 1.89
Condition (8) (nB31b/nB31a (nL32/nL31)): 0.90
Condition (9) (nB31b(nL32)): 1.70
Condition (10) (n3GL/nB31b (nL33/nL32)): 0.88
Condition (11) (nB11b (nL12)): 1.83
Condition (12) (vB11a/vB11b (vL11/vL12)): 0.81

The lens system 10 depicted in FIG. 7 includes all of the configurations described above, and also satisfies Conditions (1) to (13). The lens system 10 also satisfies all the conditions including Conditions (1a), (1b), (2a), (5a), (6a), and (7a) to (7d). Also, although an anomalous dispersion lens is used for the lens L22 in the second lens group G2, there are only two high-refractive index lenses with a refractive index of 1.8 or higher, the lenses L12 and L31, which makes it possible to provide a lens system 10 that can favorably correct various aberrations at low cost.

This lens system 10 has the performance of a medium-telephoto or normal-type interchangeable lens with a focal length of around 65 mm when focused on infinity, and makes it possible to provide an image pickup lens that is bright with an F number of 3.24 and has a large angle of view of 46.8 degrees. Also, as depicted in FIGS. 10 to 12, it is possible to acquire images in which various aberrations have been favorably corrected across the entire focusing range from infinity to the near distance (short distance). In the MTF curves, no extreme drop in MTF was observed across the entire focusing range from infinity to the near distance, there is little separation between sagittal and tangential, and coma aberration, astigmatism, and the like are favorably corrected. In particular, it can be understood that the MTF at infinity is favorable compared to the MTF at the near distance.

Example 3

Figure 13:
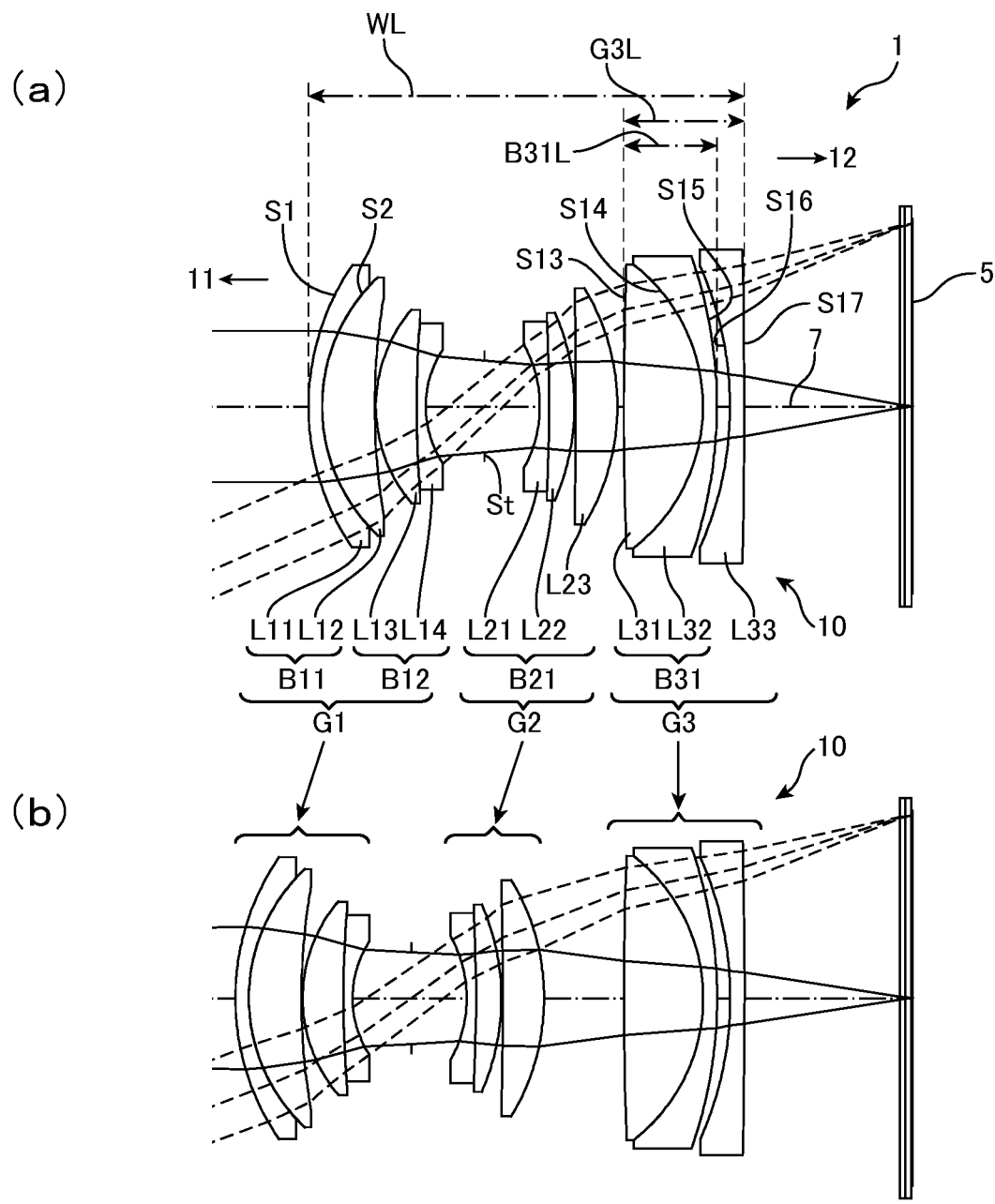
FIG. 13 depicts the configuration of a lens system according to Example 3, with FIG. 13(a) depicting the lens arrangement when the focus position is infinity and FIG. 13(b) depicting the lens arrangement when the focus position is a nearest (shortest) distance.

FIG. 13 depicts a different example of the lens system 10. FIG. 13(*a*) depicts the lens arrangement when the focus position is at infinity, and FIG. 13(*b*) depicts the lens arrangement when the focus position is the nearest distance (near distance, 545 mm).

This lens system 10 also has a three-group configuration with a positive-positive-positive arrangement of refractive powers and is composed, from the object side 11, of the first lens group G1 with combined positive refractive power and, on the other side of the stop St, the second lens group G2 with positive refractive power and the third lens group G3 with positive refractive power. The third lens group G3 is a fixed lens group that does not move, so that the distance from the image plane 5 does not change during focusing. When the focus position moves from infinity to the near distance during focusing, the first lens group G1 and the second lens group G2 disposed on opposite sides of the stop St monotonously move as a unit toward the object side 11.

Figure 16:
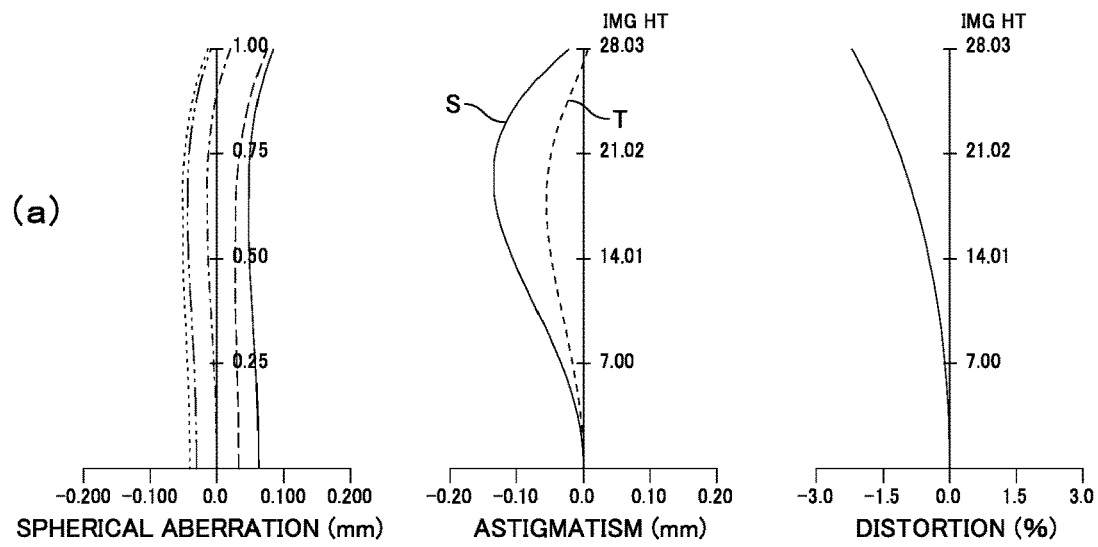
FIG. 16 is a diagram depicting various aberrations and the MTF of the lens system according to Example 3 when the focus is at infinity.
Figure 16:
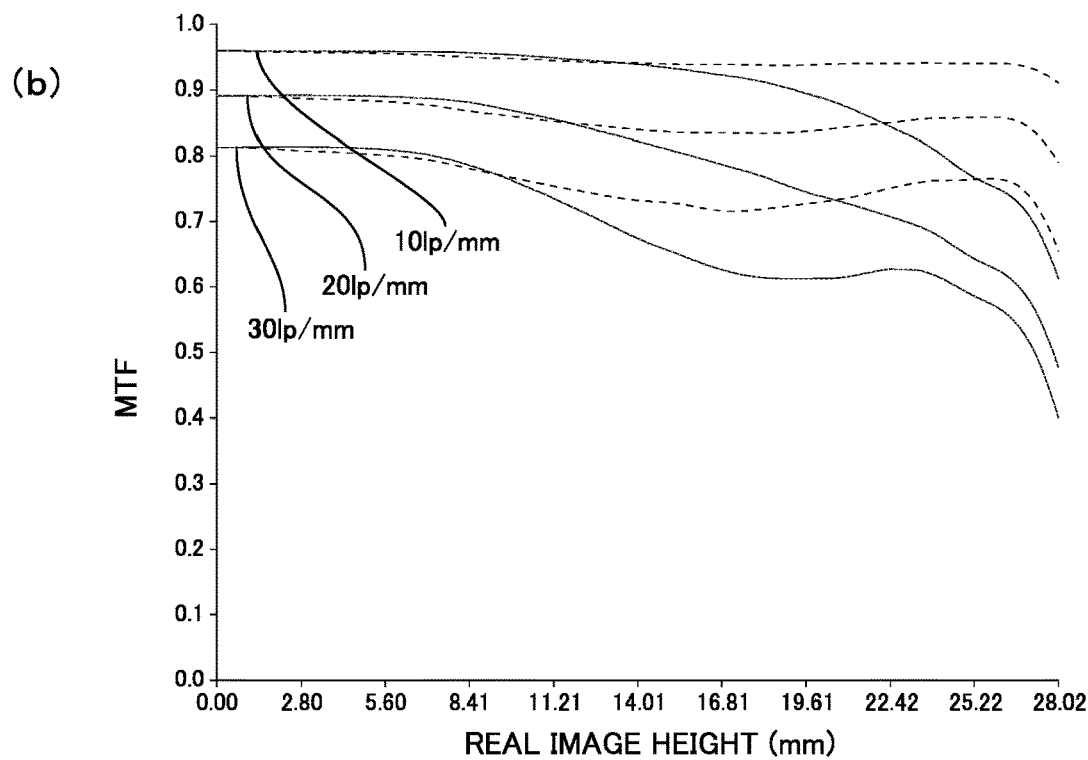
Figure 17:
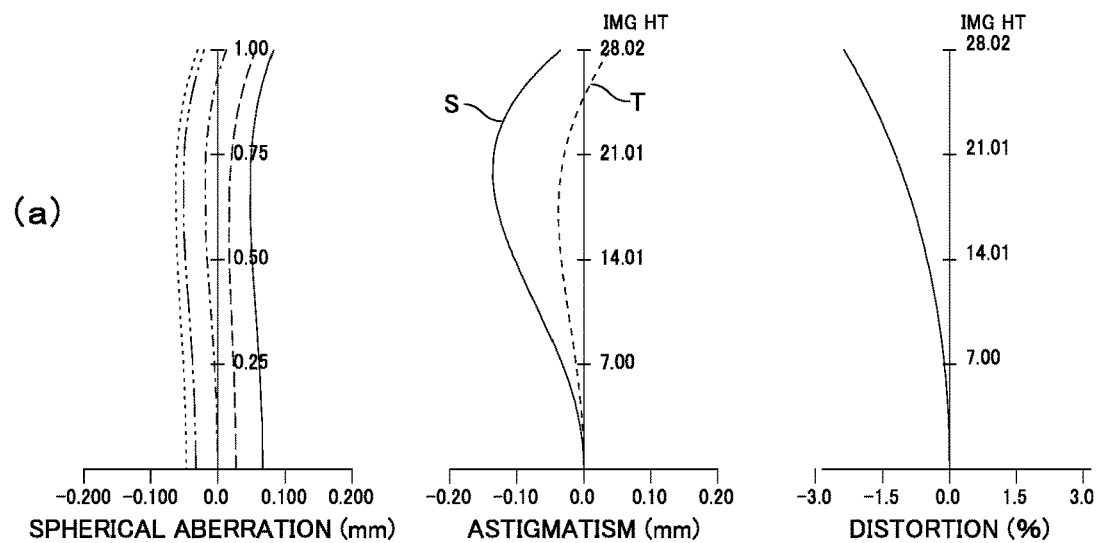
FIG. 17 is a diagram depicting various aberrations and the MTF of the lens system according to Example 3 when the focus is at an intermediate position.
Figure 17:
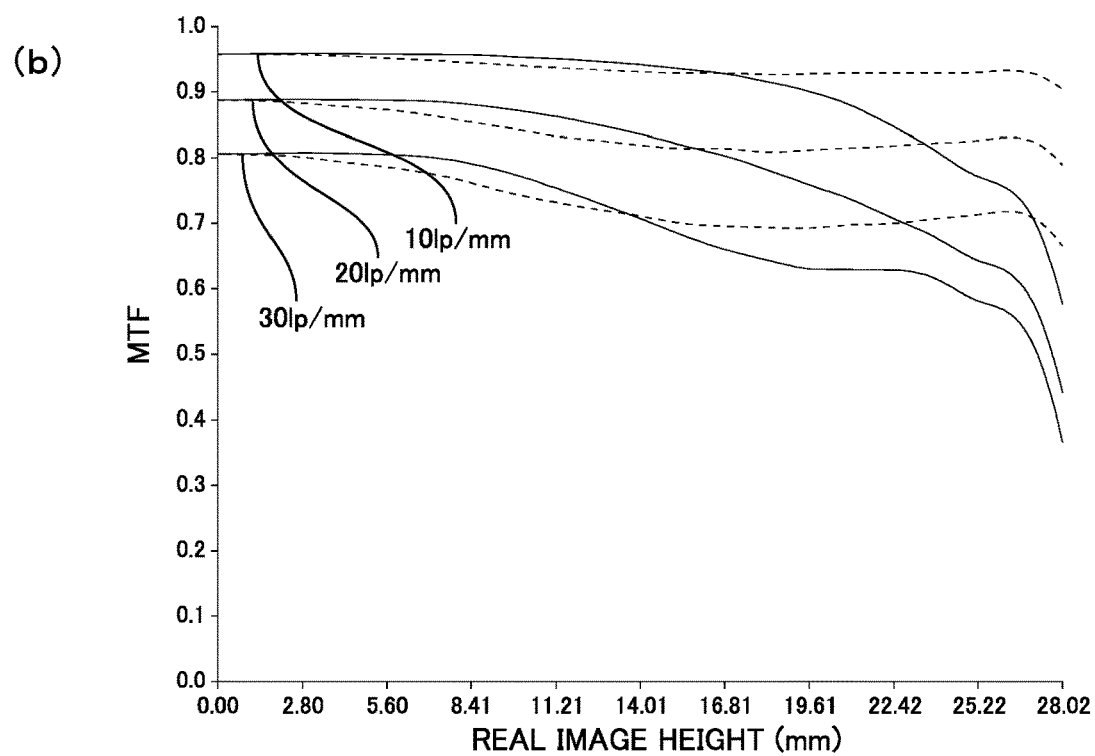
Figure 18:
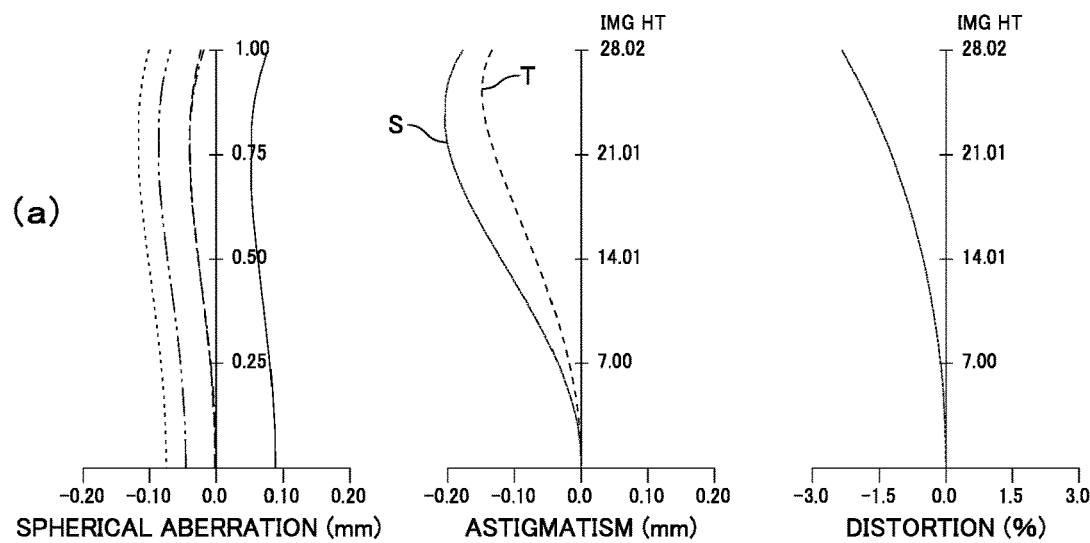
FIG. 18 is a diagram depicting various aberrations and the MTF of the lens system according to Example 3 when the focus is at a nearest distance.
Figure 18:
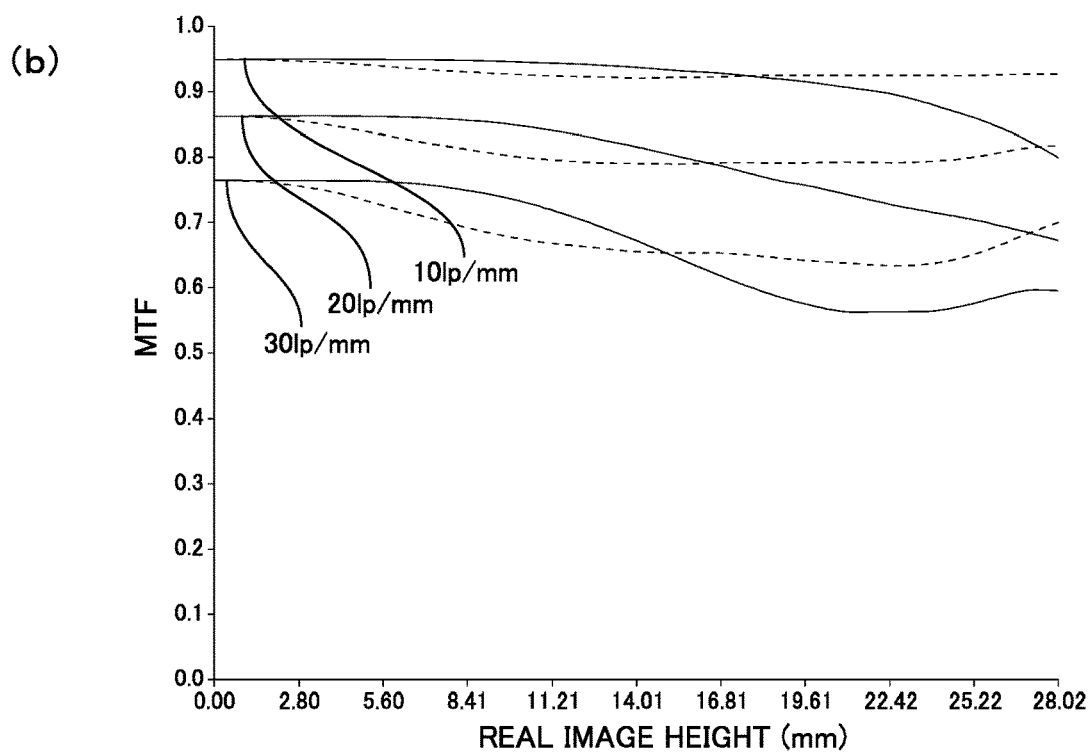

FIG. 14 depicts data on the respective lenses that construct the lens system 10. FIG. 15 depicts the values of the focal length f, the F number (F No.), the angle of view, and the variable interval d12 in the lens system 10 when the focal length of the lens system 10 is at infinity, at an intermediate position (2400 mm), and at the shortest distance (nearest distance, 545 mm). FIGS. 16 to 18 respectively depict various aberrations (FIGS. 16(*a*), 17(*a*), 18(*a*)) and the MTF (FIGS. 16(*b*), 17(*b*), 18(*b*)) when the focal distance of the lens system 10 is at infinity, at the intermediate position, and at the nearest distance.

The lens system 10 depicted in these drawings is composed of a total of 10 lenses (L11 to L14, L21 to L23, and L31 to L33), and aside from the lens L31 with positive refractive power that is closest to the object side 11 of the third lens group G3 being a biconvex positive lens and the cemented lens B31 also being a biconvex positive lens, the fundamental configuration of the individual groups and individual lenses are the same as Example 1 depicted in FIG. 1. Accordingly, this lens system 10 is also composed of a total of ten lenses, but in terms of optical elements, is composed of six lenses made up of the four cemented lenses B11, B12, B21, and B31 and the two lenses L23 and L33. By using many cemented lenses, the lens system has a simple structure and is easy to assemble.

Various numerical values and values of the respective conditions for the lens system 10 depicted in FIG. 13 are as follows.
Focal length of first lens group G1 (f1): 127.08
Focal length of second lens group G2 (f2): 75.22
Focal length of third lens group G3 (f3): 261.12
Combined focal length of first and second lens groups (f12): 75.26
Focal length of cemented lens B31 (f31ab): 81.08
Focal length of the rear lens L33 of the third lens group G3 (f3GL): −113.66
Total length of lens system (WL): 67.23
Total length of third lens group G3 (G3L): 18.58
Total length of cemented lens B31 (B31L): 14.35
Condition (1) (f3/f12): 3.47
Condition (2) (B31L/G3L): 0.77
Condition (3) (nB31ab (max (nL31, nL32))): 1.85
Condition (4) (G3L/WL): 0.28
Condition (5) (|f31ab/f3GL|): 0.71
Condition (6) (|f31ab|+|f3GL|)/|f3|): 0.75
Condition (7) (nB31a (nL31)): 1.82
Condition (8) (nB31b/nB31a (nL32/nL31)): 1.02
Condition (9) (nB31b (nL32)): 1.85
Condition (10) (n3GL/nB31b (nL33/nL32)): 0.80
Condition (11) (nB11b (nL12)): 1.80
Condition (12) (vB11a/vB11b (vL11/vL12)): 1.13

The lens system 10 depicted in FIG. 13 satisfies Conditions (1) to (7), (9) to (11), and (13). Conditions (1a), (1c), (2a), and (7a) to (7b) are also satisfied. An anomalous dispersion lens is used as the lens L22 of the second lens group G2. In this lens system 10, there are five high refractive index lenses with a refractive index of 1.8 or more, the lenses L12, L14, L23, L31, and L32, so that a relatively high number of high refractive index lenses are used and various aberrations are favorably corrected.

This lens system 10 has the performance of a medium-telephoto or normal-type interchangeable lens with a focal length of about 65 mm when focused at infinity, and makes it possible to provide an image pickup lens that is bright with an F number of 2.8 and has a large angle of view of 47.6°. Also, as depicted in FIGS. 16 to 18, it is possible to acquire images in which various aberrations have been favorably corrected across the entire focusing range from infinity to the near distance (short distance). In the MTF curves, no extreme drop in MTF was observed across the entire focusing range from infinity to the near distance aside from the region where the image height is large, and there is little separation between sagittal and tangential.

Example 4

Figure 19:
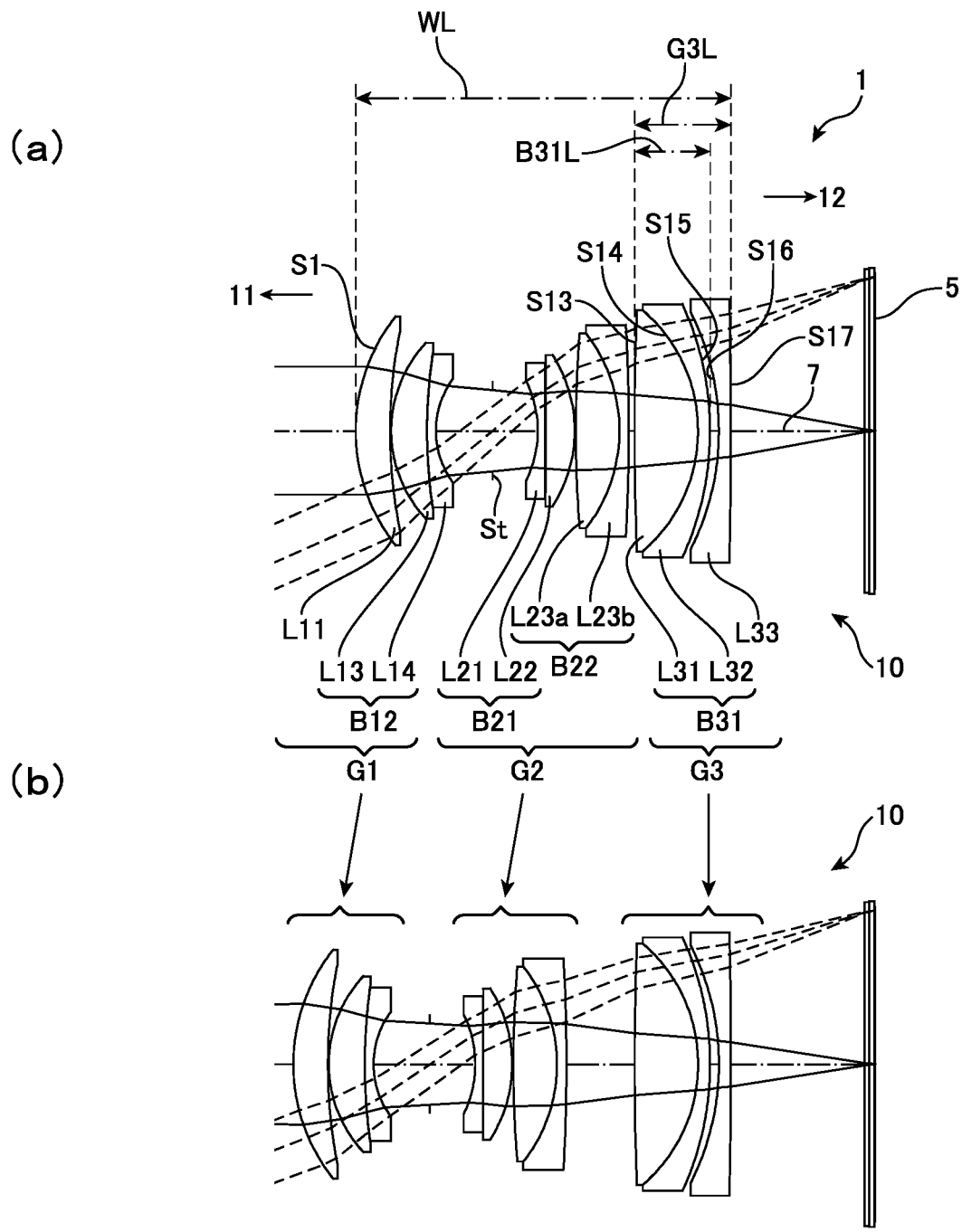
FIG. 19 depicts the configuration of a lens system according to Example 4, with FIG. 19(a) depicting the lens arrangement when the focus position is infinity and FIG. 19(b) depicting the lens arrangement when the focus position is a nearest (shortest) distance.

FIG. 19 depicts a different example of the lens system 10. FIG. 19(a) depicts the lens arrangement when the focus position is at infinity, and FIG. 19(b) depicts the lens arrangement when the focus position is the nearest distance (near distance, 555 mm).

This lens system 10 also has a three-group configuration with a positive-positive-positive arrangement of refractive powers and is composed, from the object side 11, of the first lens group G1 with overall positive refractive power and, on the other side of the stop St, the second lens group G2 with overall positive refractive power and the third lens group G3 with overall positive refractive power. The third lens group G3 is a fixed lens group that does not move, so that the distance from the image plane 5 does not change during focusing. When the focus position moves from infinity to the near distance during focusing, the first lens group G1 and the second lens group G2 disposed on opposite sides of the stop St synchronously and monotonously move toward the object side 11.

Figure 22:
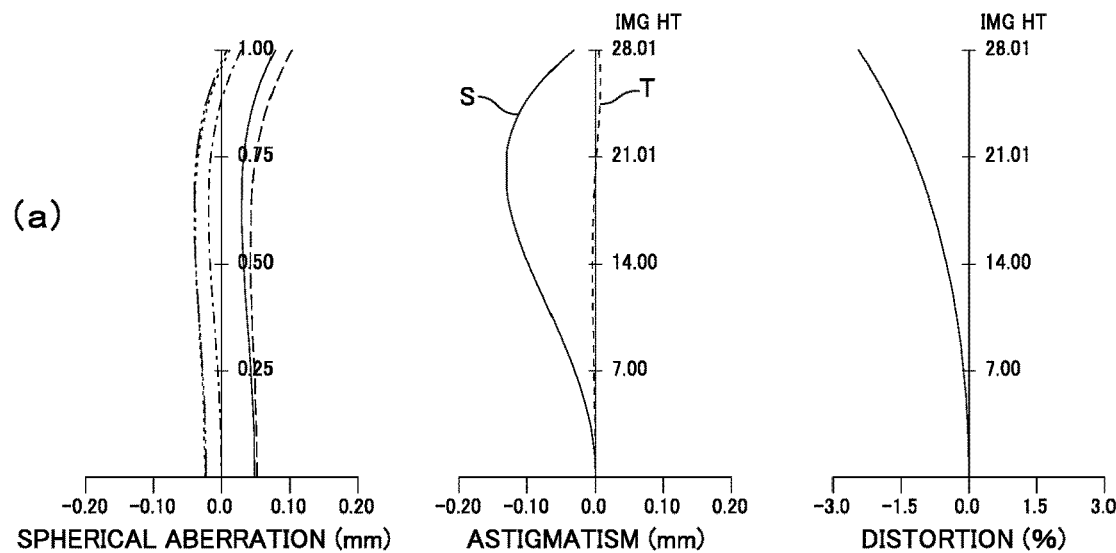
FIG. 22 is a diagram depicting various aberrations and the MTF of the lens system according to Example 4 when the focus is at infinity.
Figure 22:
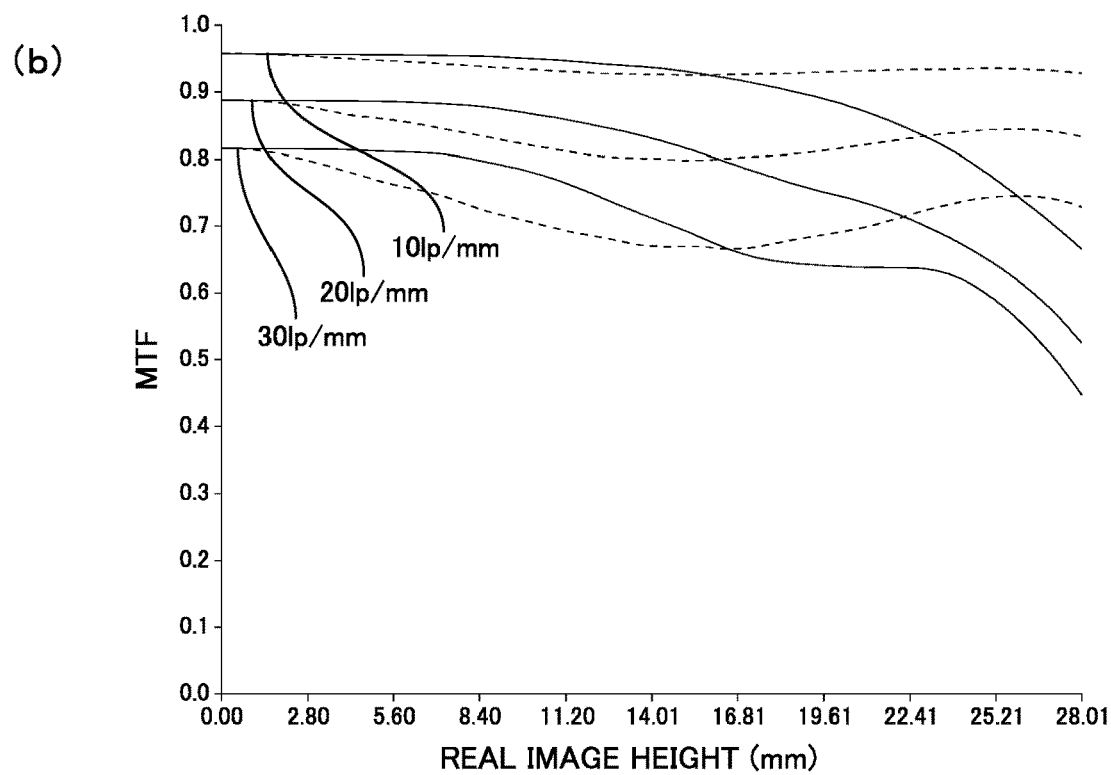
Figure 23:
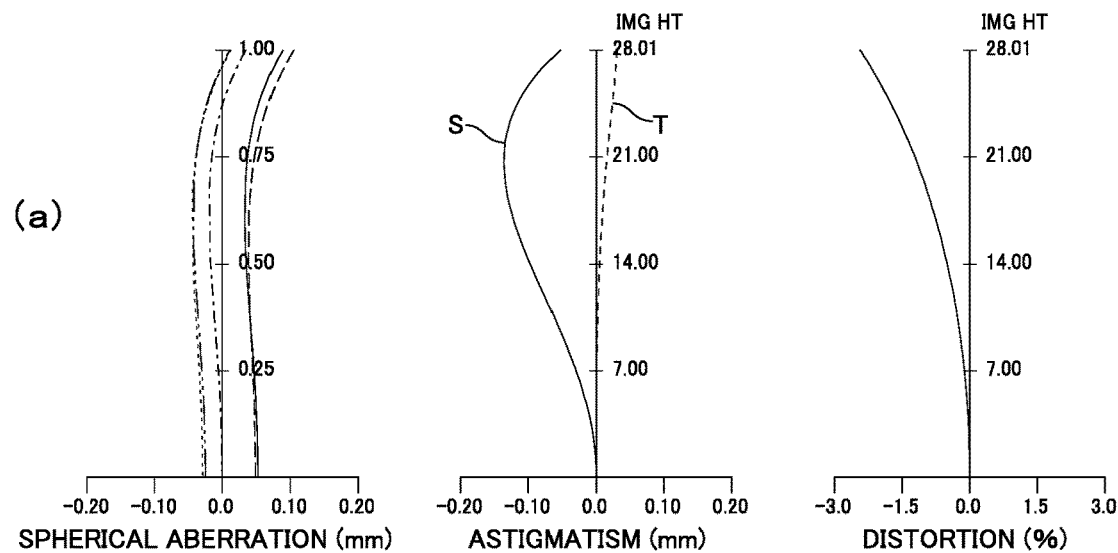
FIG. 23 is a diagram depicting various aberrations and the MTF of the lens system according to Example 4 when the focus is at an intermediate position.
Figure 23:
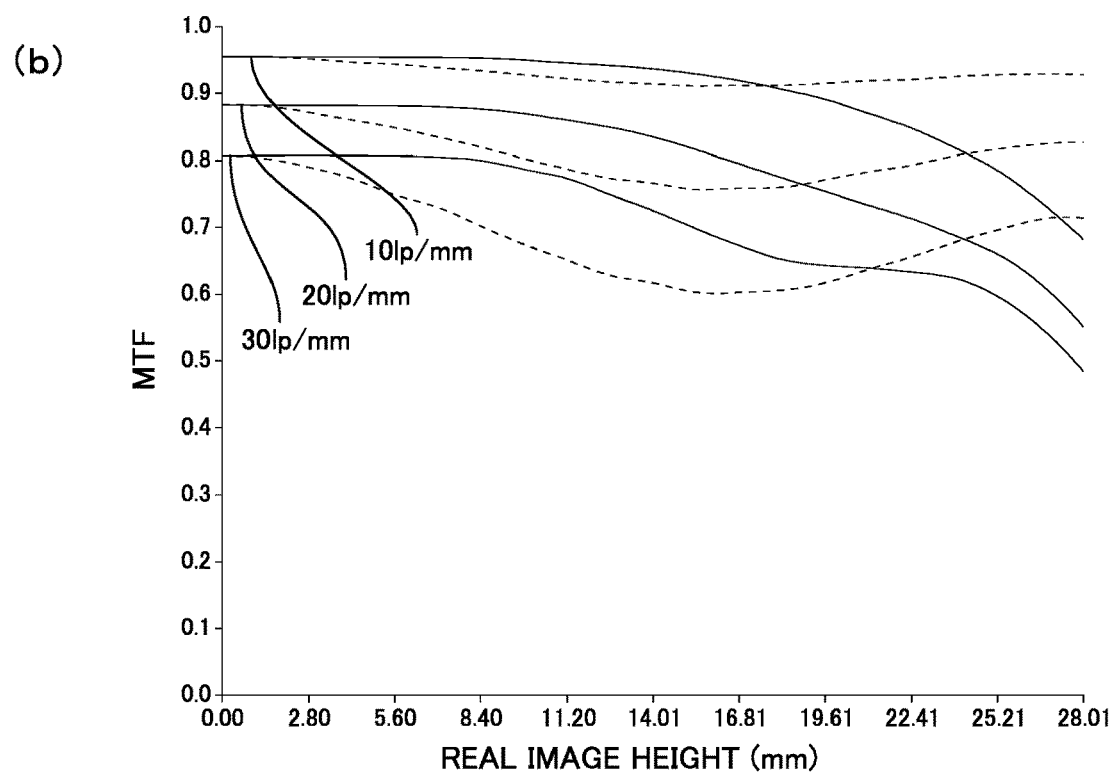
Figure 24:
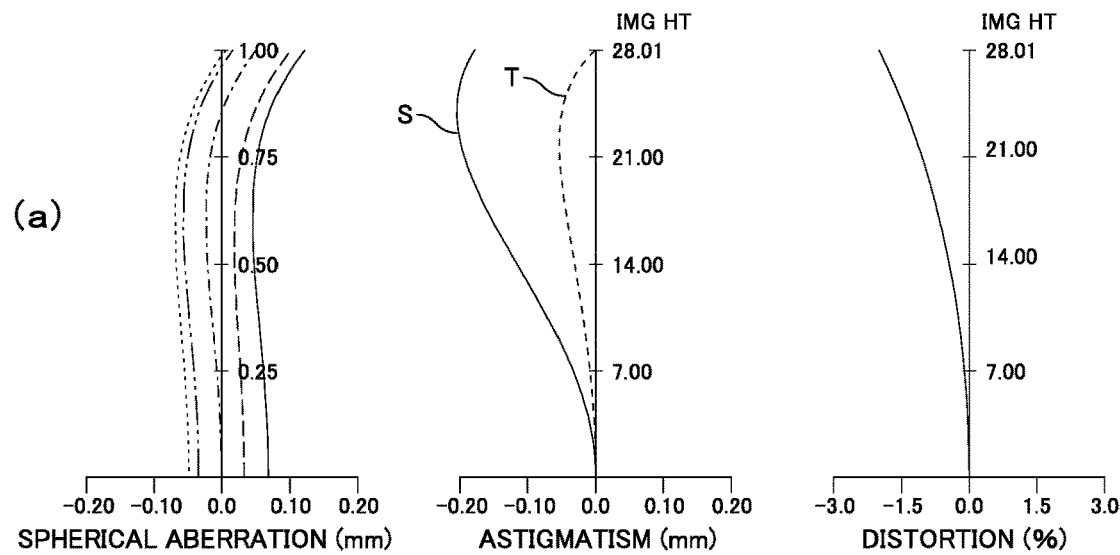
FIG. 24 is a diagram depicting various aberrations and the MTF of the lens system according to Example 4 when the focus is at a nearest distance.
Figure 24:
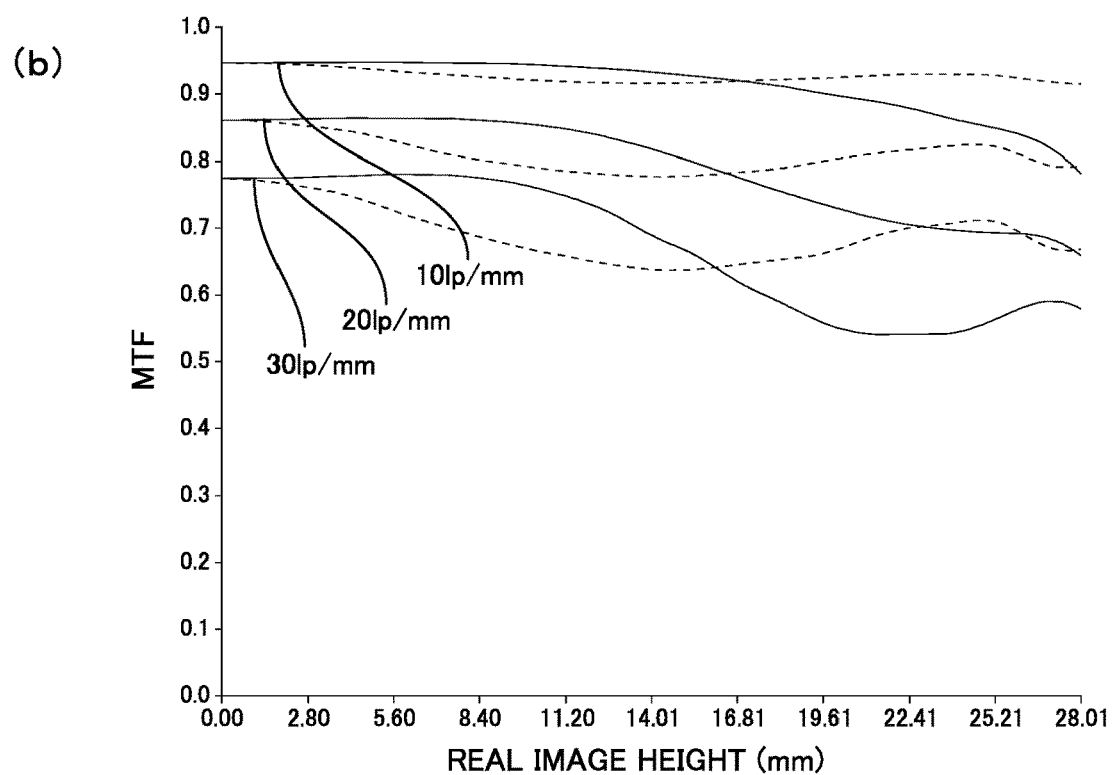

FIG. 20 depicts data on the respective lenses that construct the lens system 10. FIG. 21 depicts the values of the focal length f, the F number (F No.), the angle of view, and the variable interval d12 in the lens system 10 when the focal length of the lens system 10 is at infinity, at an intermediate position (2500 mm), and at the shortest distance (nearest distance, 555 mm). FIGS. 22 to 24 respectively depict various aberrations (FIGS. 22(a), 23(a), 24(a)) and the MTF (FIGS. 22(b), 23(b), 24(b)) when the focal distance of the lens system 10 is at infinity, at the intermediate position, and at the nearest distance.

The lens system 10 depicted in these drawings is composed of a total of 10 lenses. The first lens group G1 has a three-lens configuration and includes a positive meniscus lens L11 that is convex on the object side 11, a positive meniscus lens L13 that is convex on the object side 11, and a negative meniscus lens L14 that is convex on the object side 11. The lenses L13 and L14 construct a negative meniscus-type cemented lens B12 that is convex on the object side 11. The second lens group G2 has a four-lens configuration and includes a negative meniscus lens L21 that is concave on the object side 11, a positive meniscus lens L22 that is concave on the object side 11, a biconvex positive lens L23a, and a negative meniscus lens L23b that is concave on the object side 11. The lenses L21 and L22 construct a cemented lens B21 that is concave on the object side 11, and the lenses L23a and L23b construct a biconvex cemented lens B22.

The third lens group G3 includes a biconvex positive lens L31, a negative meniscus lens L32 that is concave on the object side 11, and a negative meniscus lens L33 that is concave on the object side 11. The biconvex cemented lens B31 is constructed by the lenses L31 and L32.

Various numerical values and values of the respective conditions for the lens system 10 depicted in FIG. 19 are as follows.
Focal length of first lens group G1 (f1): 122.56
Focal length of second lens group G2 (f2): 84.55
Focal length of third lens group G3 (f3): 244.88
Combined focal length of first and second lens groups (f12): 76.12
Focal length of cemented lens B31 (f31ab): 62.62
Focal length of the rear lens L33 of the third lens group G3 (f3GL): −81.25
Total length of lens system (WL): 68.7
Total length of third lens group G3 (G3L): 17.66
Total length of cemented lens B31 (B31L): 13.85
Condition (1) (f3/f12): 3.22
Condition (2) (B31L/G3L): 0.78
Condition (3) (nB31ab (max (nL31, nL32))): 1.92
Condition (4) (G3L/WL): 0.26
Condition (5) (|f31ab/f3GL|): 0.77
Condition (6) (|f31ab|+|f3GL|)/|f3|): 0.59
Condition (7) (nB31a (nL31)): 1.85
Condition (8) (nB31b/nB31a (nL32/nL31)): 1.04
Condition (9) (nB31b (nL32)): 1.92
Condition (10) (n3GL/nB31b (nL33/nL32)): 0.84
Condition (11) (nB11b (nL12)): NA
Condition (12) (vB11a/vB11b (vL11/vL12)): NA The lens system 10 depicted in FIG. 19 satisfies Conditions (1) to (7), (9), (10), and (13). Conditions (1a), (1c), (2a), and (7a) to (7b) are also satisfied. An anomalous dispersion lens is used as the lens L22 of the second lens group G2. In this lens system 10, there are five high refractive index lenses with a refractive index of 1.8 or higher, the lenses L11, L23a, L23b, L31, and L32, and since a relatively large number of high refractive index lenses are used, various aberrations are favorably corrected.

This lens system 10 has the performance of a medium-telephoto or normal-type interchangeable lens with a focal length of about 65 mm when focused at infinity, and makes it possible to provide an image pickup lens that is bright with an F number of 2.8 and has a large angle of view of 47.6°. Also, as depicted in FIGS. 22 to 24, it is possible to acquire images in which various aberrations have been favorably corrected across the entire focusing range from infinity to the near distance (short distance). In the MTF curves, no extreme drop in MTF was observed across the entire focusing range from infinity to the near distance, and there is no great separation between sagittal and tangential, which is favorable.

Example 5

Figure 25:
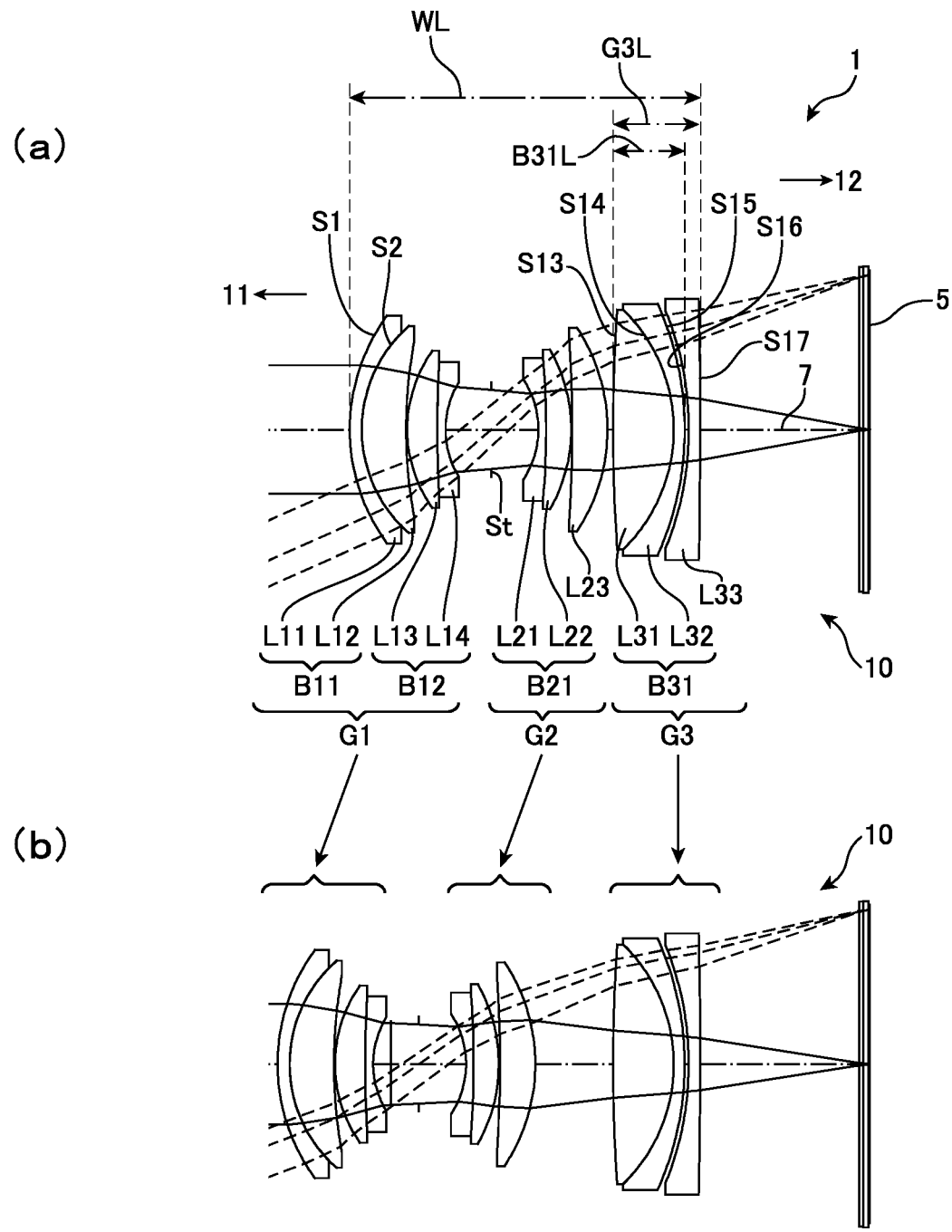
FIG. 25 depicts the configuration of a lens system according to Example 5, with FIG. 25(a) depicting the lens arrangement when the focus position is infinity and FIG. 25(b) depicting the lens arrangement when the focus position is a nearest (shortest) distance.

FIG. 25 depicts a different example of the lens system 10. FIG. 25(a) depicts the lens arrangement when the focus position is at infinity, and FIG. 25(b) depicts the lens arrangement when the focus position is the shortest distance (near distance, 540 mm).

This lens system 10 also has a three-group configuration with a positive-positive-positive arrangement of refractive powers and is composed, from the object side 11, of the first lens group G1 with overall positive refractive power and, on the other side of the stop St, the second lens group G2 with overall positive refractive power and the third lens group G3 with overall positive refractive power. The third lens group G3 is a fixed lens group that does not move, so that the distance from the image plane 5 does not change during focusing. When the focus position moves from infinity to the near distance during focusing, the first lens group G1 and the second lens group G2 disposed on opposite sides of the stop St integrally and monotonously move toward the object side 11.

Figure 28:
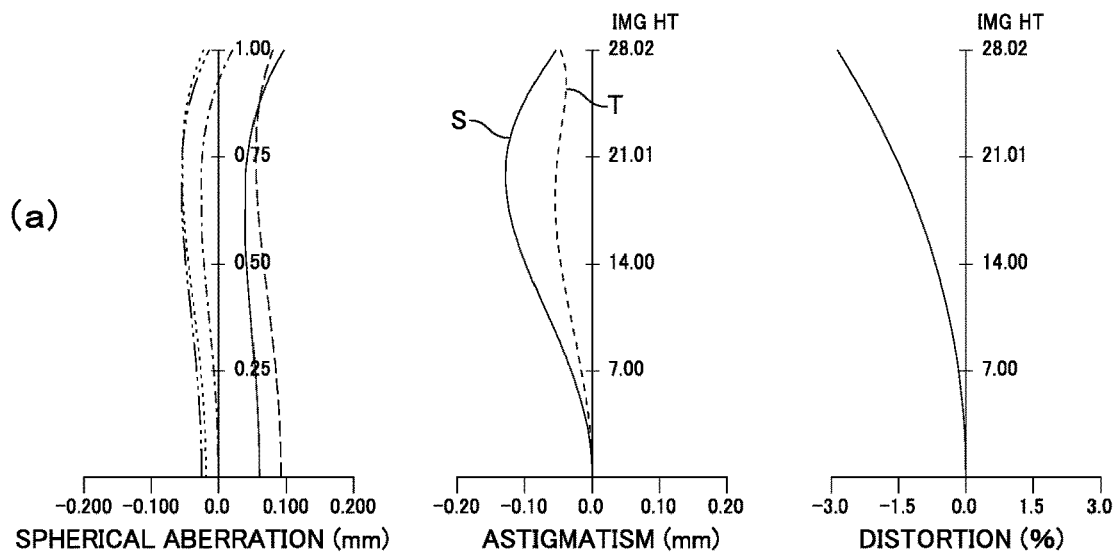
FIG. 28 is a diagram depicting various aberrations and the MTF of the lens system according to Example 5 when the focus is at infinity.
Figure 28:
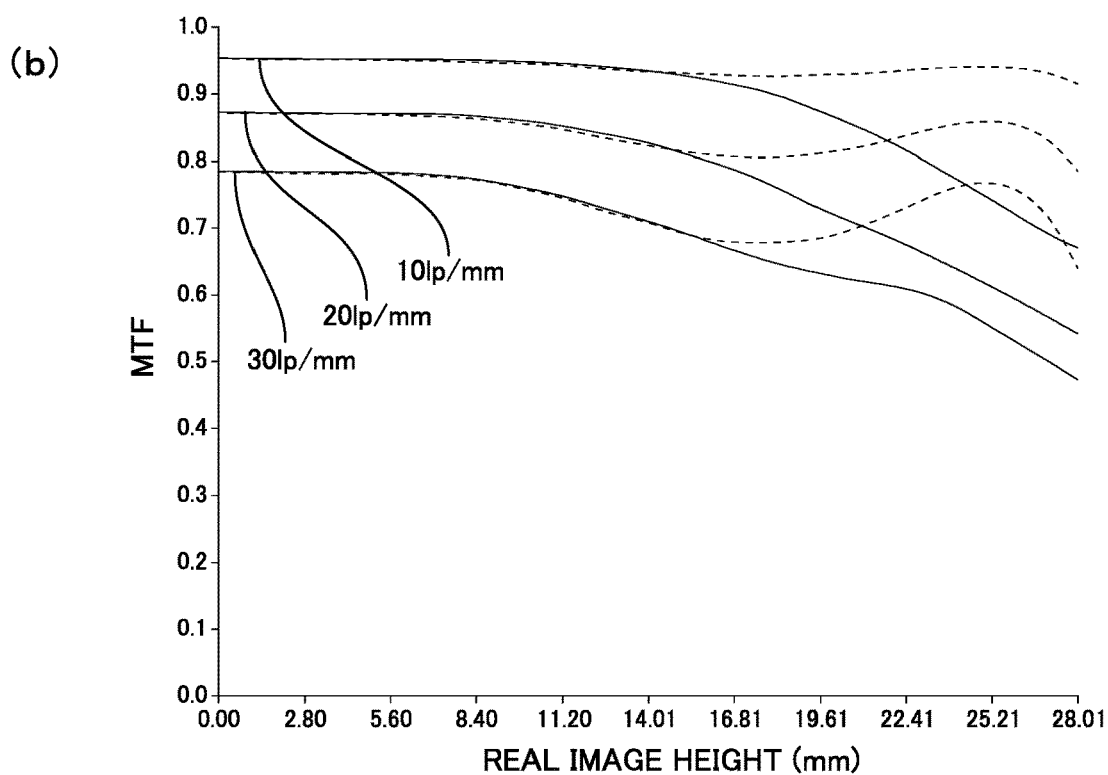
Figure 29:
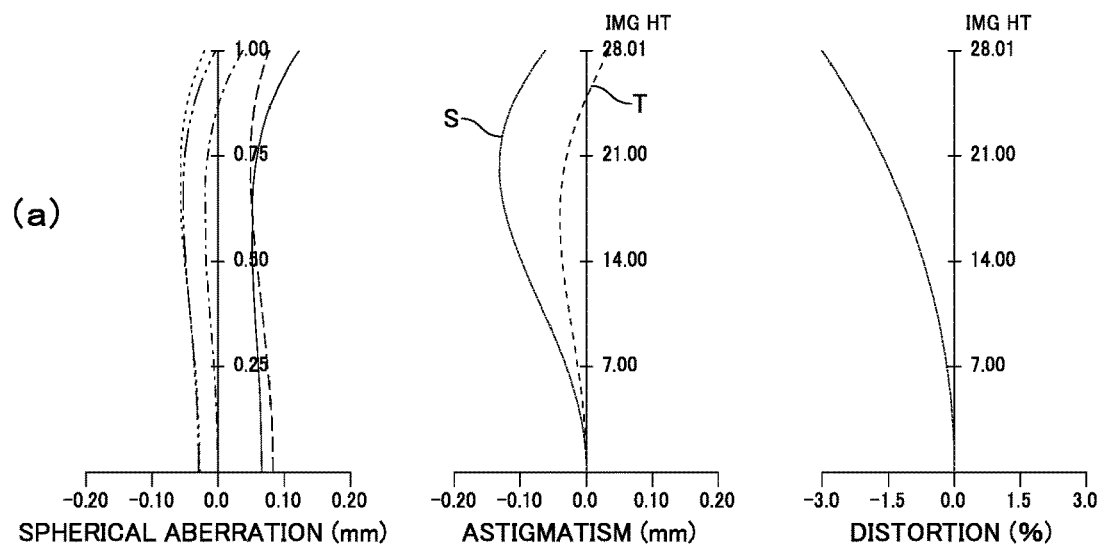
FIG. 29 is a diagram depicting various aberrations and the MTF of the lens system according to Example 5 when the focus is at an intermediate position.
Figure 29:
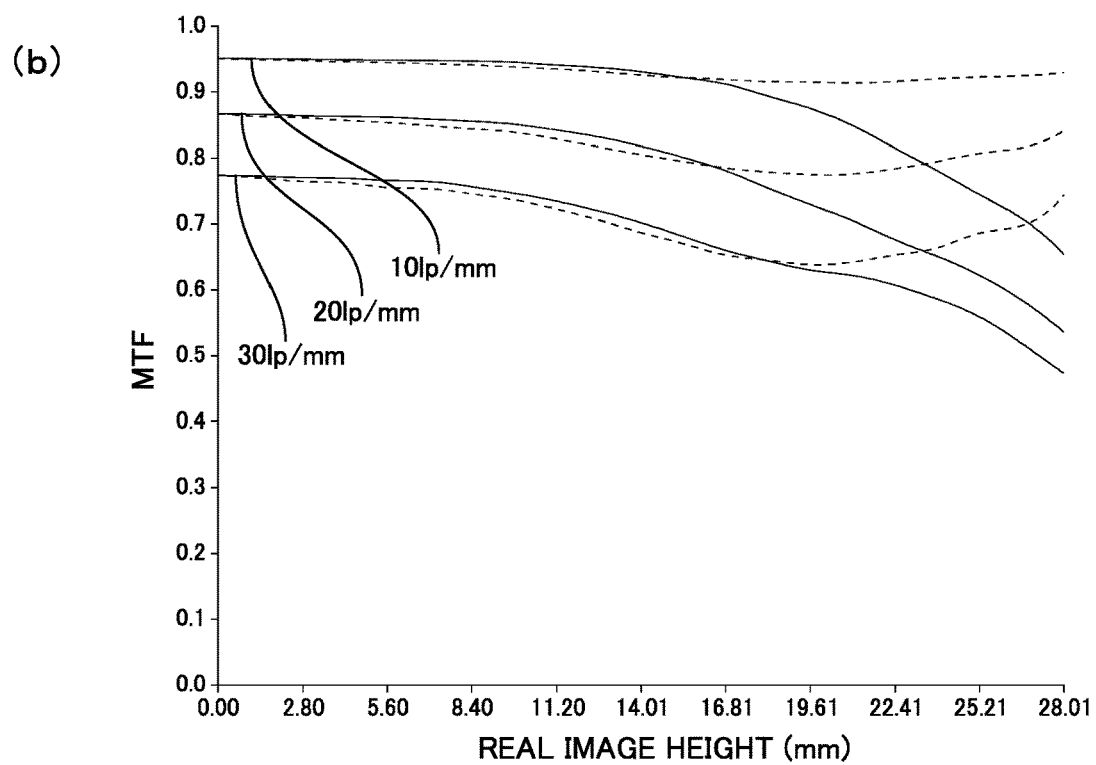
Figure 30:
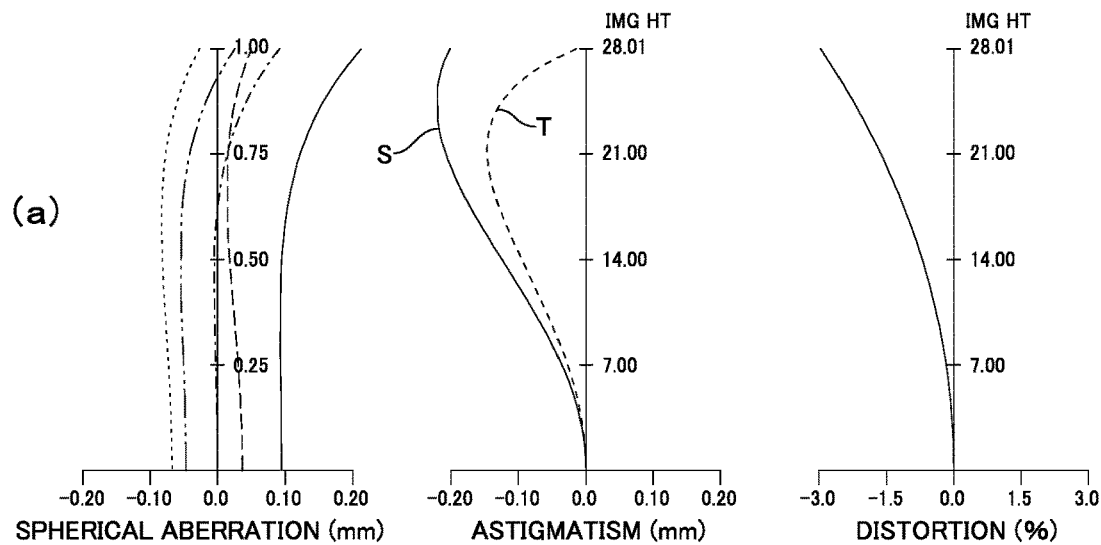
FIG. 30 is a diagram depicting various aberrations and the MTF of the lens system according to Example 5 when the focus is at a nearest distance.
Figure 30:
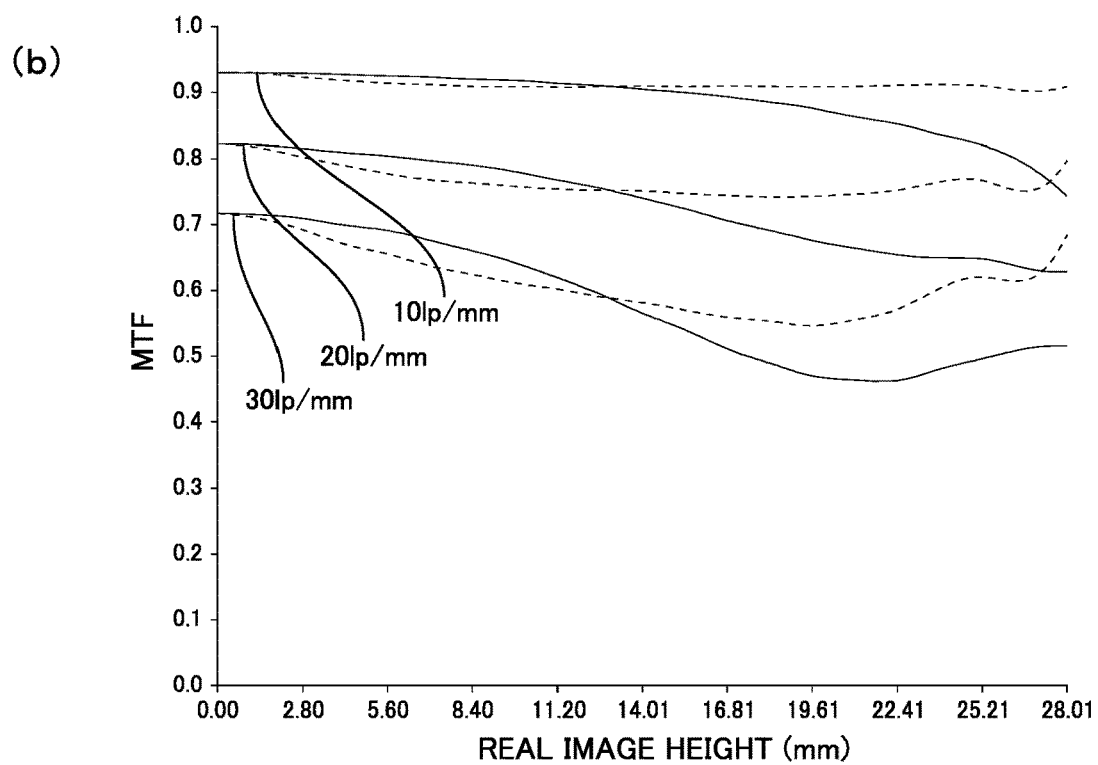

FIG. 26 depicts data on the respective lenses that construct the lens system 10. FIG. 27 depicts the values of the focal length f, the F number (F No.), the angle of view, and the variable distance d12 in the lens system 10 when the focal length of the lens system 10 is at infinity, at an intermediate position (2400 mm), and at the shortest distance (nearest distance, 540 mm). FIGS. 28 to 30 respectively depict various aberrations (FIGS. 28(a), 29(a), 30(a)) and the MTF (FIGS. 28(b), 29(b), 30(b)) when the focal distance of the lens system 10 is at infinity, at the intermediate position, and at the nearest distance.

The lens system 10 depicted in these drawings is composed of a total of 10 lenses (L11 to L14, L21 to L23, and L31 to L33). Aside from the lens L31 with positive refractive power that is closest to the object side 11 in the third lens group G3 being a biconvex positive lens and the cemented lens B31 also being a biconvex positive lens, the fundamental configuration of each group and each lens is the same as Example depicted in FIG. 1. Accordingly, this lens system 10 is also composed of a total of ten lenses, but in terms of optical elements, is composed of six lenses made up of the four cemented lenses B11, B12, B21, and B31 and the two lenses L23 and L33. By using many cemented lenses, the lens system has a simple configuration and is easy to assemble.

Various numerical values and values of the respective conditions for the lens system 10 depicted in FIG. 25 are as follows.

Focal length of first lens group G1 (f1): 136.84
Focal length of second lens group G2 (f2): 80.26
Focal length of third lens group G3 (f3): 186.81
Combined focal length of first and second lens groups (f12): 80.60
Focal length of cemented lens B31 (f31ab): 75.07
Focal length of the rear lens L33 of the third lens group G3(f3GL): −122.63
Total length of lens system (WL): 64.07
Total length of third lens group G3 (G3L): 15.97
Total length of cemented lens B31 (B31L): 13.10
Condition (1) (f3/f12): 2.32
Condition (2) (B31L/G3L): 0.82
Condition (3) (nB31ab (max (nL31,nL32))): 1.80
Condition (4) (G3L/WL): 0.25
Condition (5) (|f31ab/f3GL|): 0.61
Condition (6) (|f31ab|+|f3GL|)/|f3|): 1.06
Condition (7) (nB31a (nL31)): 1.70
Condition (8) (nB31b/nB31a (nL32/nL31)): 1.06
Condition (9) (nB31b (nL32)): 1.80
Condition (10) (n3GL/nB31b (nL33/nL32)): 0.83
Condition (11) (nB11b (nL12)): 1.83
Condition (12) (vB11a/vB11b (vL11/vL12)): 1.64

The lens system 10 depicted in FIG. 25 satisfies Conditions (1) to (7), (9) to (11), and (13). Condition (1c) is also satisfied. This lens system 10 does not use an anomalous dispersion lens and there are four high refractive index lenses with a refractive index of 1.8 or higher, the lenses L12, L14, L23, and L32. Since a relatively large number of high refractive index lenses are used, various aberrations are favorably corrected.

This lens system 10 has the performance of a medium-telephoto or normal-type interchangeable lens with a focal length of about 65 mm when focused at infinity, and makes it possible to provide an image pickup lens that is bright with an F number of 2.8 and has a large angle of view of 47.8°. Also, as depicted in FIGS. 28 to 30, it is possible to acquire images in which various aberrations have been favorably corrected across the entire focusing range from infinity to the near distance (short distance). In the MTF curves, no extreme drop in MTF was observed across the entire focusing range from infinity to the near distance, and there is no great separation between sagittal and tangential, which is favorable.

Example 6

Figure 31:
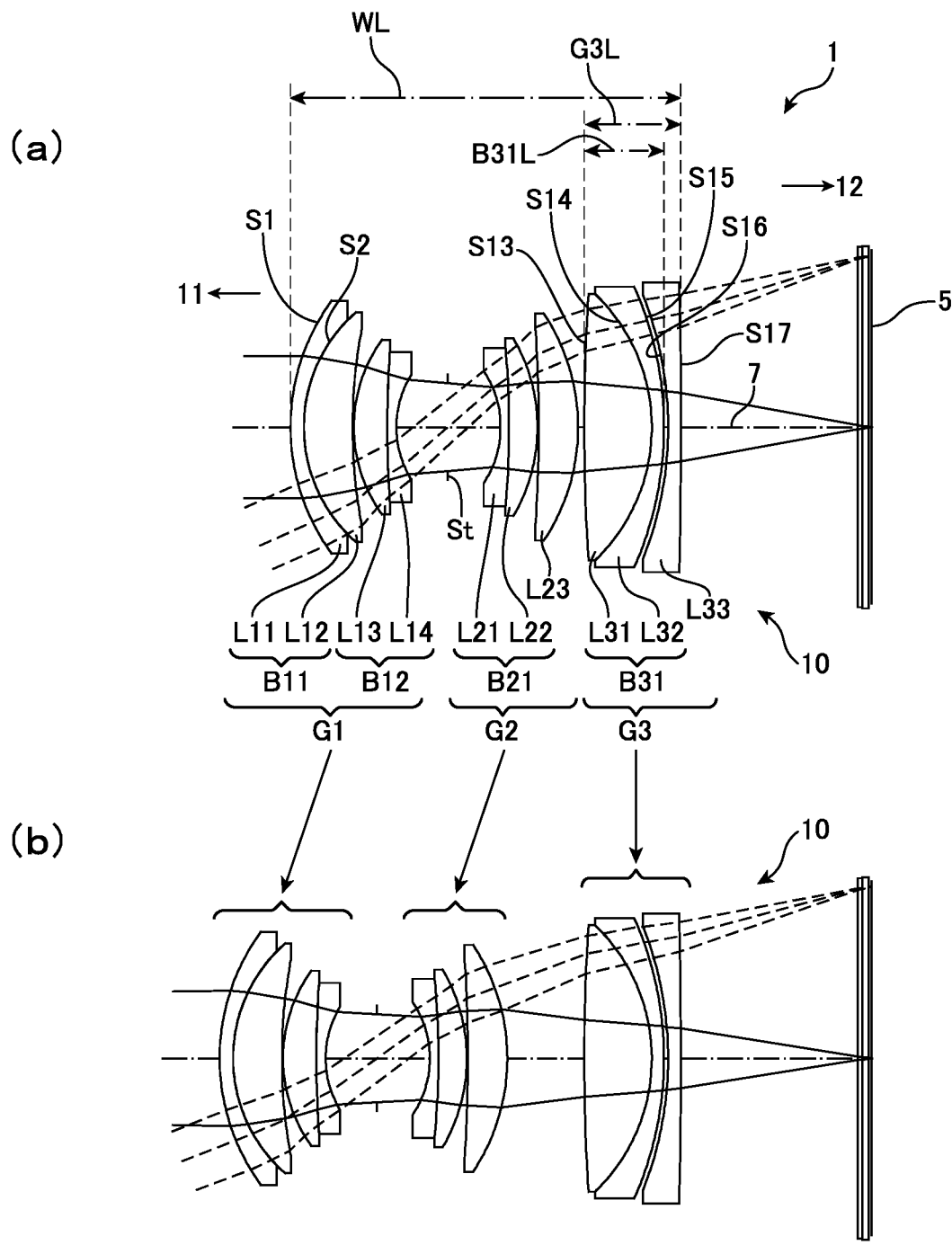
FIG. 31 depicts the configuration of a lens system according to Example 6, with FIG. 31(a) depicting the lens arrangement when the focus position is infinity and FIG. 31(b) depicting the lens arrangement when the focus position is a nearest (shortest) distance.

FIG. 31 depicts a different example of the lens system 10. FIG. 31(a) depicts the lens arrangement when the focus position is at infinity, and FIG. 31(b) depicts the lens arrangement when the focus position is the nearest distance (near distance, 600 mm).

This lens system 10 also has a three-group configuration with a positive-positive-positive arrangement of refractive powers and is composed, from the object side 11, of the first lens group G1 with overall positive refractive power and, on the other side of the stop St, the second lens group G2 with overall positive refractive power and the third lens group G3 with overall positive refractive power. The third lens group G3 is a fixed lens group that does not move, so that the distance from the image plane 5 does not change during focusing. When the focus position moves from infinity to the near distance during focusing, the first lens group G1 and the second lens group G2 disposed on opposite sides of the stop St integrally as a unit and monotonously move toward the object side 11.

Figure 34:
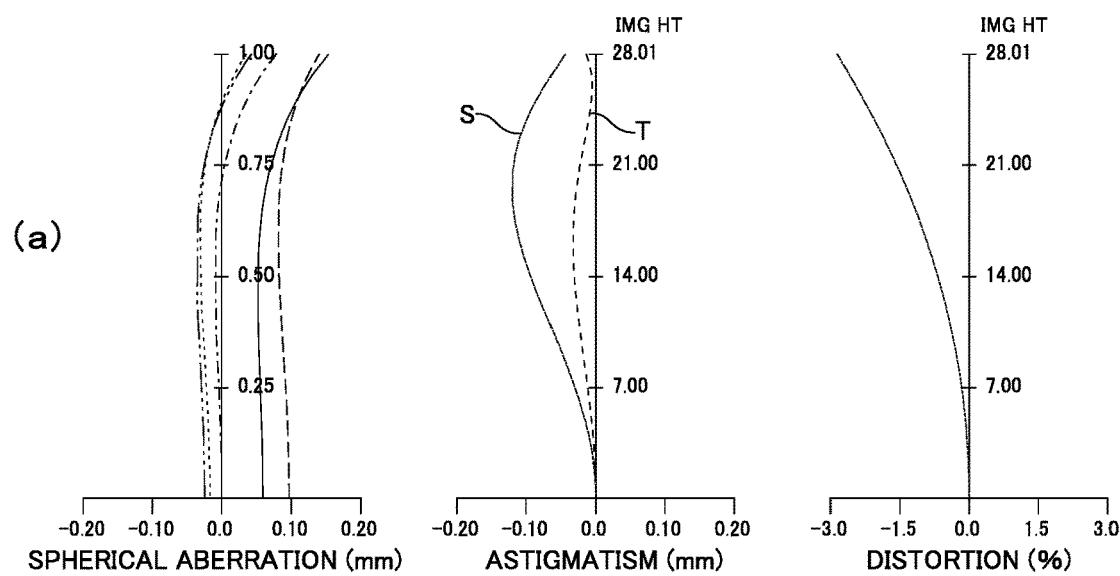
FIG. 34 is a diagram depicting various aberrations and the MTF of the lens system according to Example 6 when the focus is at infinity.
Figure 34:
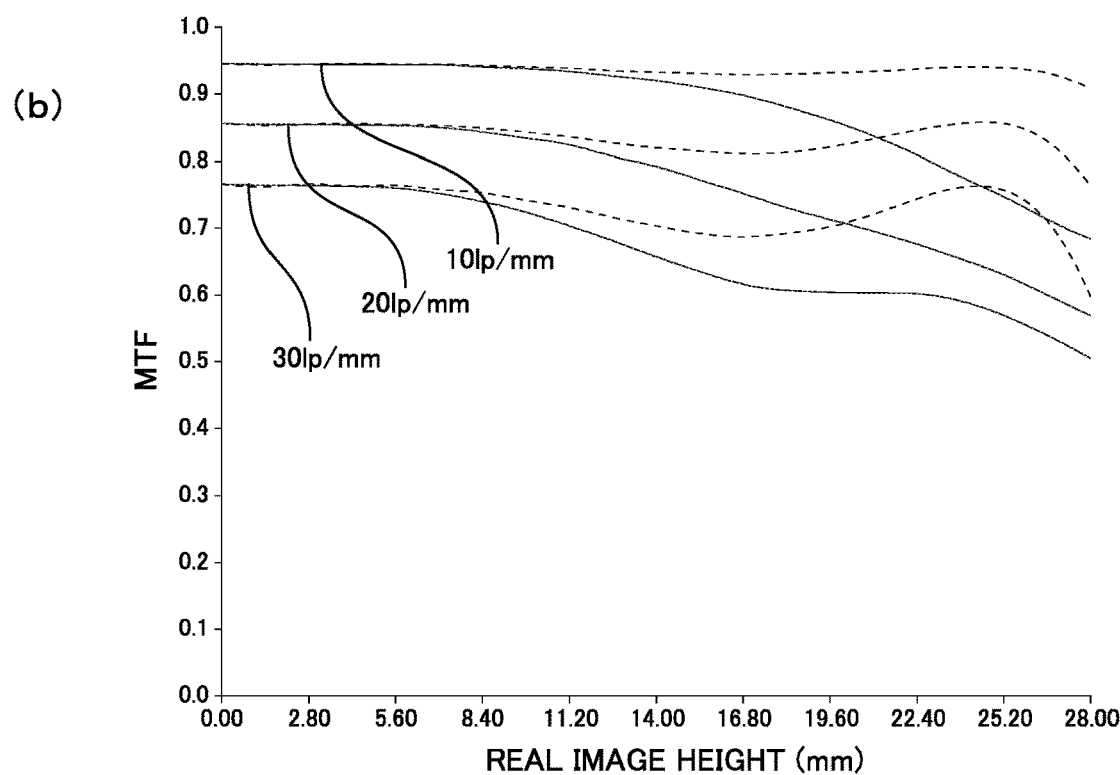
Figure 35:
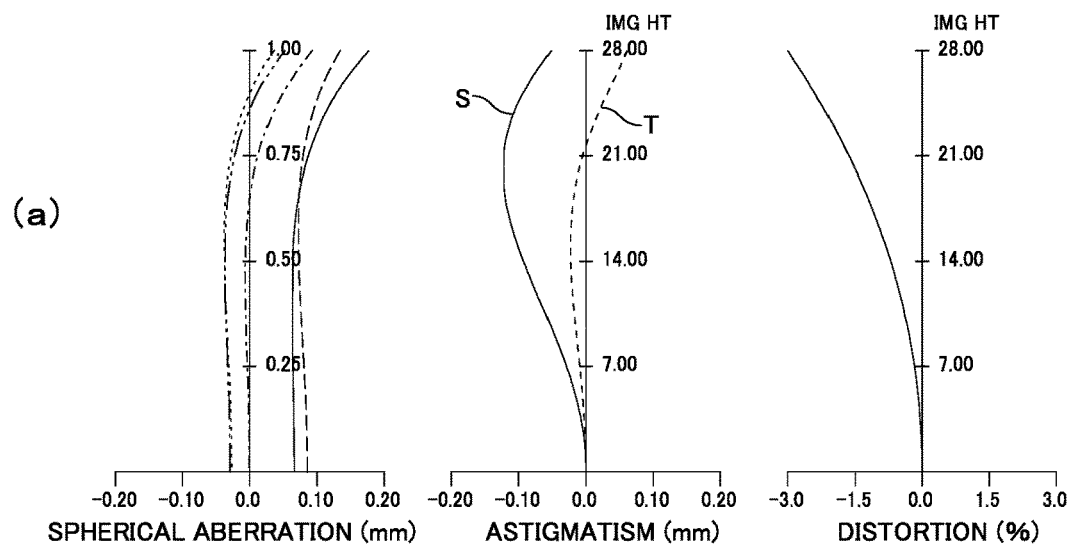
FIG. 35 is a diagram depicting various aberrations and the MTF of the lens system according to Example 6 when the focus is at an intermediate position.
Figure 35:
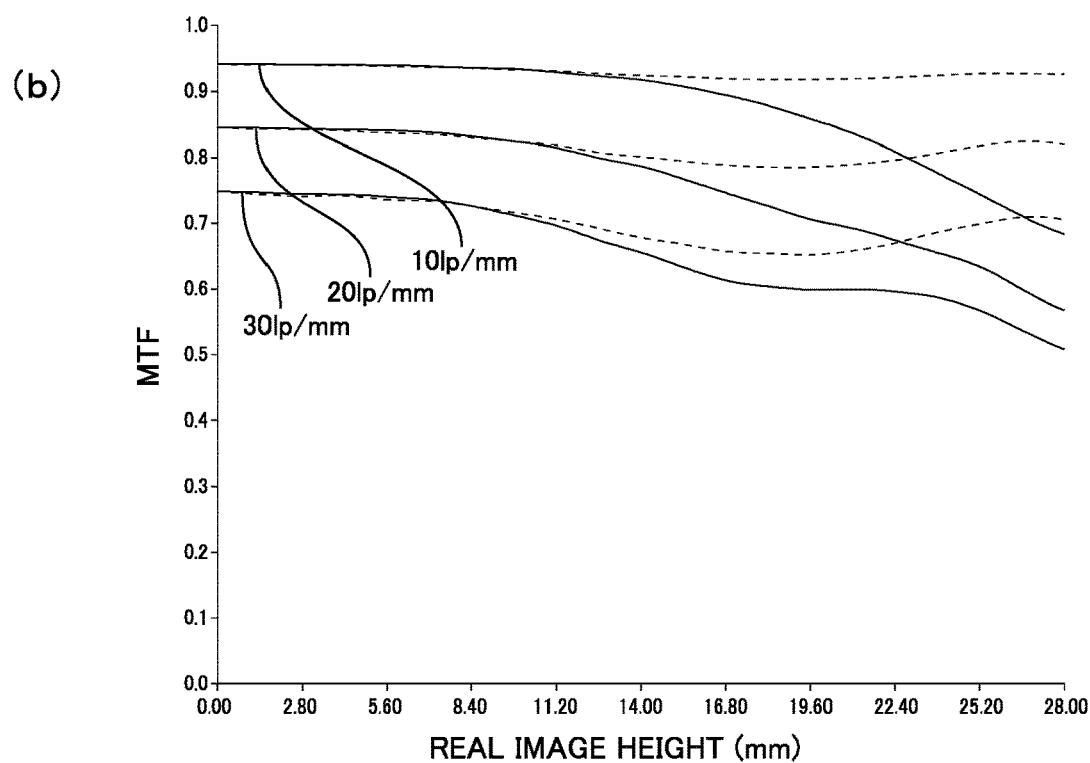
Figure 36:
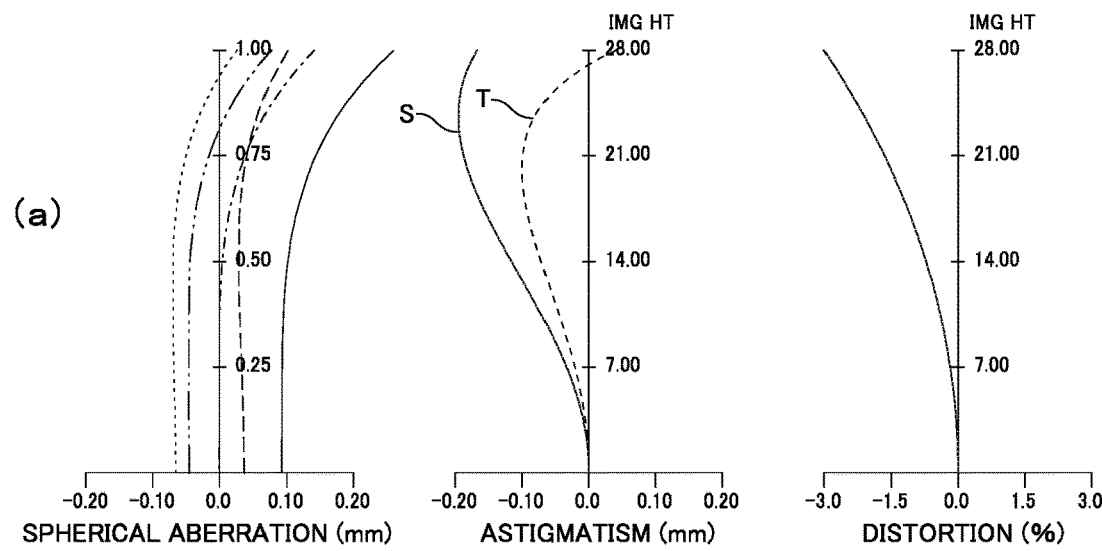
FIG. 36 is a diagram depicting various aberrations and the MTF of the lens system according to Example 6 when the focus is at a nearest distance.
Figure 36:
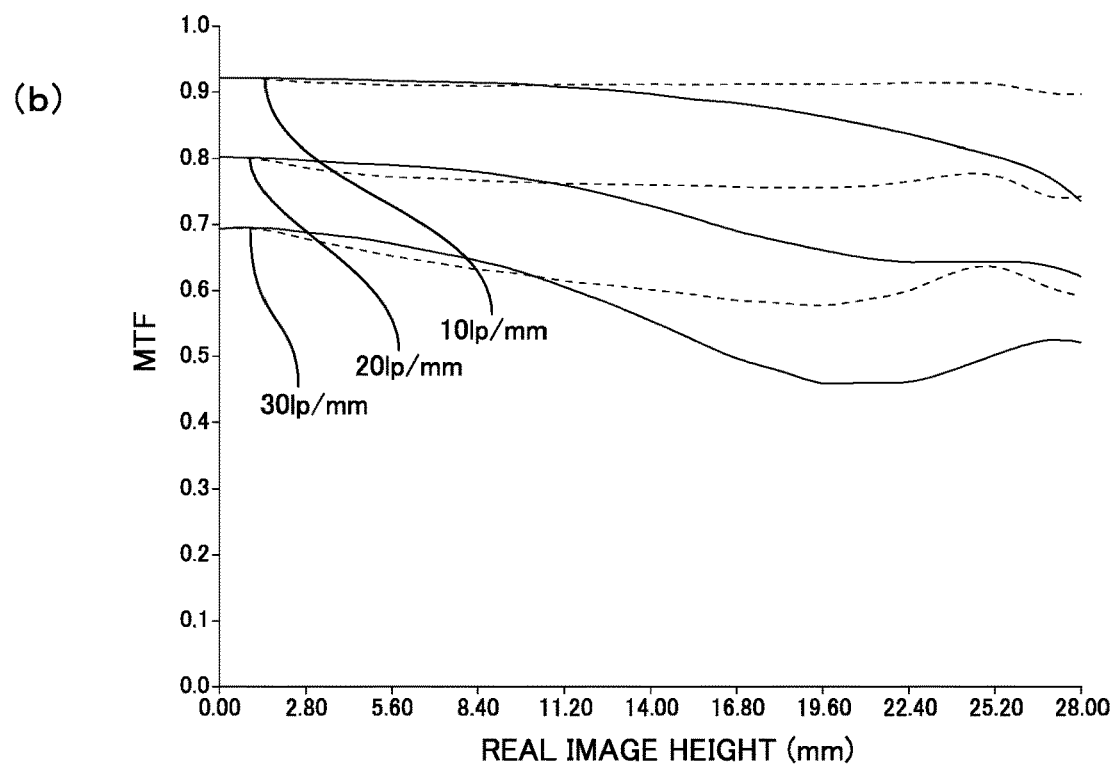

FIG. 32 depicts data on the respective lenses that construct the lens system 10. FIG. 33 depicts the values of the focal length f, the F number (F No.), the angle of view, and the variable interval d12 in the lens system 10 when the focal length of the lens system 10 is at infinity, at an intermediate position (2500 mm), and at the shortest distance (nearest distance, 600 mm). FIGS. 34 to 36 respectively depict various aberrations (FIGS. 34(a), 35(a), 36(a)) and the MTF (FIGS. 34(b), 35(b), 36(b)) when the focal distance of the lens system 10 is at infinity, at the intermediate position, and at the nearest distance.

The lens system 10 depicted in these drawings is composed of a total of 10 lenses (L11 to L14, L21 to L23, and L31 to L33). The fundamental configuration of each group and each lens is the same as the lens system 10 of Example 5, with many cemented lenses being used as optical elements.

Various numerical values and values of the respective conditions for the lens system 10 depicted in FIG. 31 are as follows.
Focal length of first lens group G1 (f1): 139.11
Focal length of second lens group G2 (f2): 77.96
Focal length of third lens group G3 (f3): 195.53
Combined focal length of first and second lens groups (f12): 79.78
Focal length of cemented lens B31 (f31ab): 77.75
Focal length of the rear lens L33 t of the third lens group G3 (f3GL): −126.46
Total length of lens system (WL): 64.10
Total length of third lens group G3 (G3L): 15.88
Total length of cemented lens B31 (B31L): 13.10
Condition (1) (f3/f12): 2.45
Condition (2) (B31L/G3L): 0.82
Condition (3) (nB31ab (max (nL31, nL32))): 1.80
Condition (4) (G3L/WL): 0.25
Condition (5) (|f31ab/f3GL|): 0.61
Condition (6) (|f31ab|+|f3GL|)/|f3|): 1.04
Condition (7) (nB31a (nL31)): 1.70
Condition (8) (nB31b/nB31a (nL32/nL31)): 1.06
Condition (9) (nB31b (nL32)): 1.80
Condition (10) (n3GL/nB31b (nL33/nL32)): 0.83
Condition (11) (nB11b (nL12)): 1.83
Condition (12) (vB11a/vB11b (vL11/vL12)): 1.64

The lens system 10 depicted in FIG. 31 satisfies Conditions (1) to (7), (9) to (11), and (13). Condition (1c) is also satisfied. This lens system 10 does not use an anomalous dispersion lens and there are four high refractive index lenses with a refractive index of 1.8 or higher, the lenses L12, L14, L23, and L32. Since a relatively large number of high refractive index lenses are used, various aberrations are favorably corrected.

This lens system 10 has the performance of a medium-telephoto or normal-type interchangeable lens with a focal length of about 65 mm when focused at infinity, which makes it possible to provide an image pickup lens that is bright with an F number of 2.8 and has a large angle of view of 47.8°. Also, as depicted in FIGS. 34 to 36, it is possible to acquire images in which various aberrations have been favorably corrected across the entire focusing range from infinity to the near distance (short distance). In the MTF curves, no extreme drop in MTF was observed across the entire focusing range from infinity to the near distance, and there is no great separation between sagittal and tangential, which is favorable.

Example 7

Figure 37:
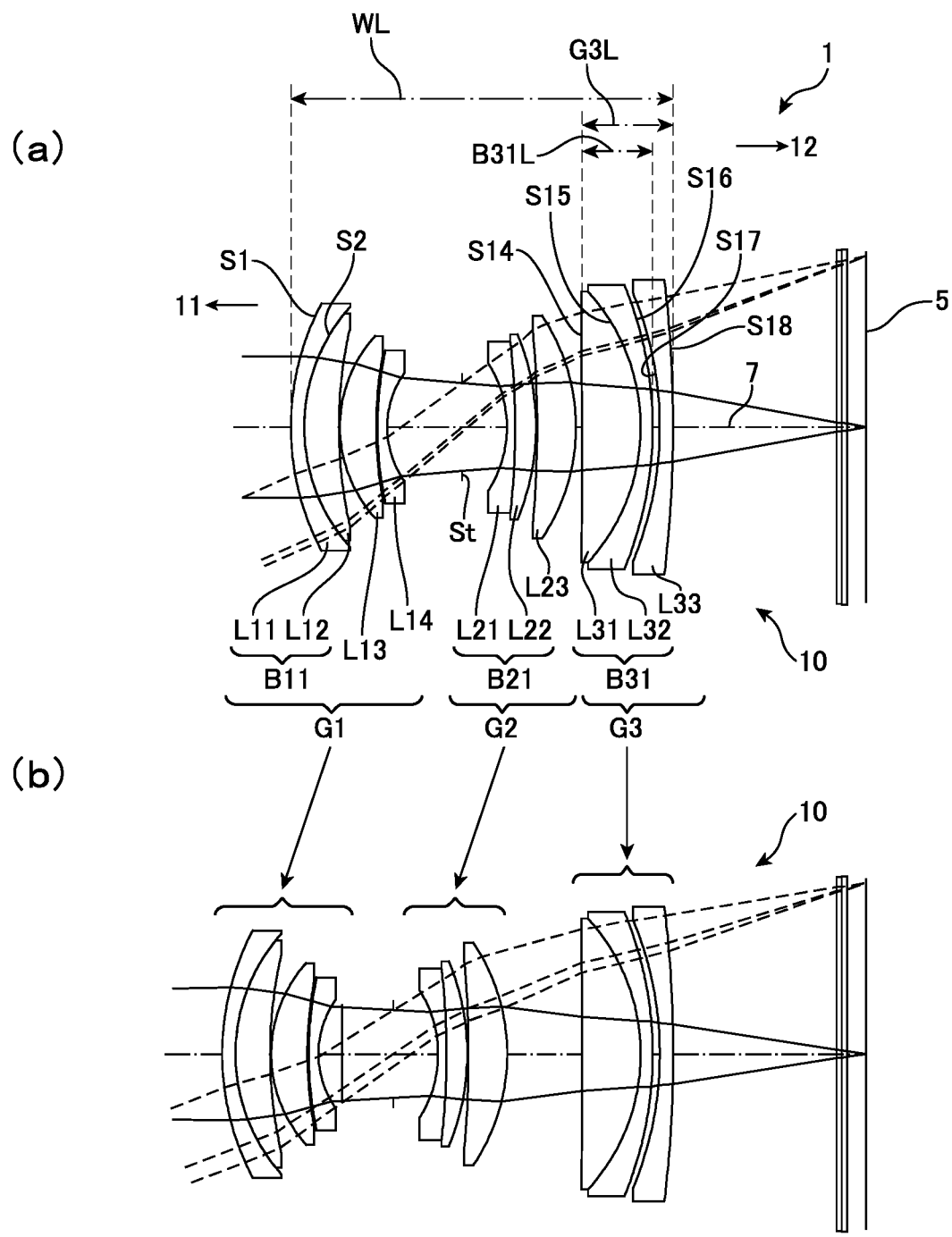
FIG. 37 depicts the configuration of a lens system according to Example 7, with FIG. 37(a) depicting the lens arrangement when the focus position is infinity and FIG. 37(b) depicting the lens arrangement when the focus position is a nearest (shortest) distance.

FIG. 37 depicts a different example of the lens system 10. FIG. 37(a) depicts the lens arrangement when the focus position is at infinity, and FIG. 37(b) depicts the lens arrangement when the focus position is the shortest distance (near distance, 590 mm).

This lens system 10 also has a three-group configuration with a positive-positive-positive arrangement of refractive powers and is composed, from the object side 11, of the first lens group G1 with overall positive refractive power and, on the other side of the stop St, the second lens group G2 with overall positive refractive power and the third lens group G3 with overall positive refractive power. The third lens group G3 is a fixed lens group that does not move, so that the distance from the image plane 5 does not change during focusing. When the focus position moves from infinity to the near distance during focusing, the first lens group G1 and the second lens group G2 disposed on opposite sides of the stop St integrally and monotonously move toward the object side 11.

Figure 40:
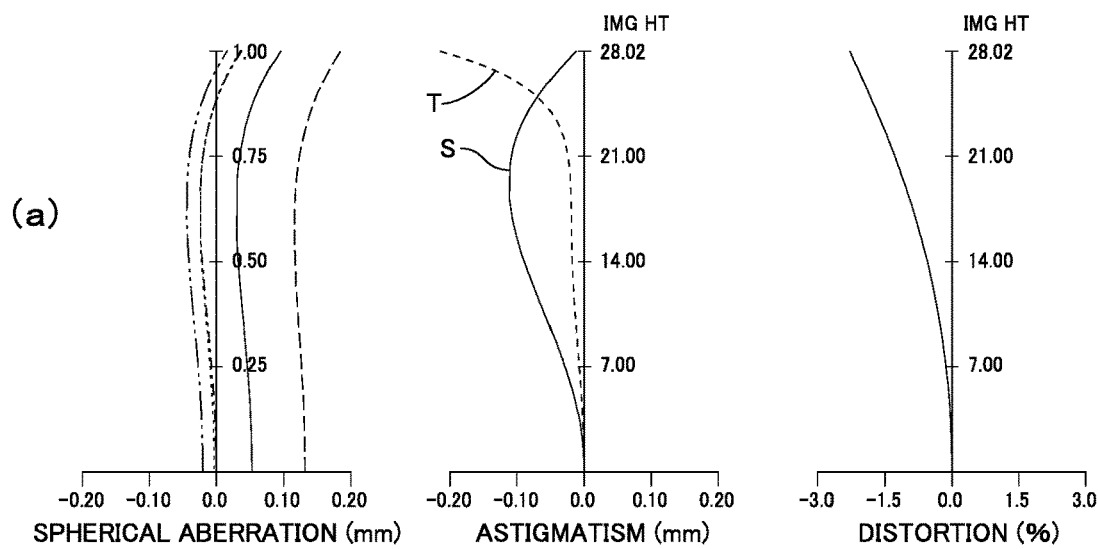
FIG. 40 is a diagram depicting various aberrations and the MTF of the lens system according to Example 7 when the focus is at infinity.
Figure 40:
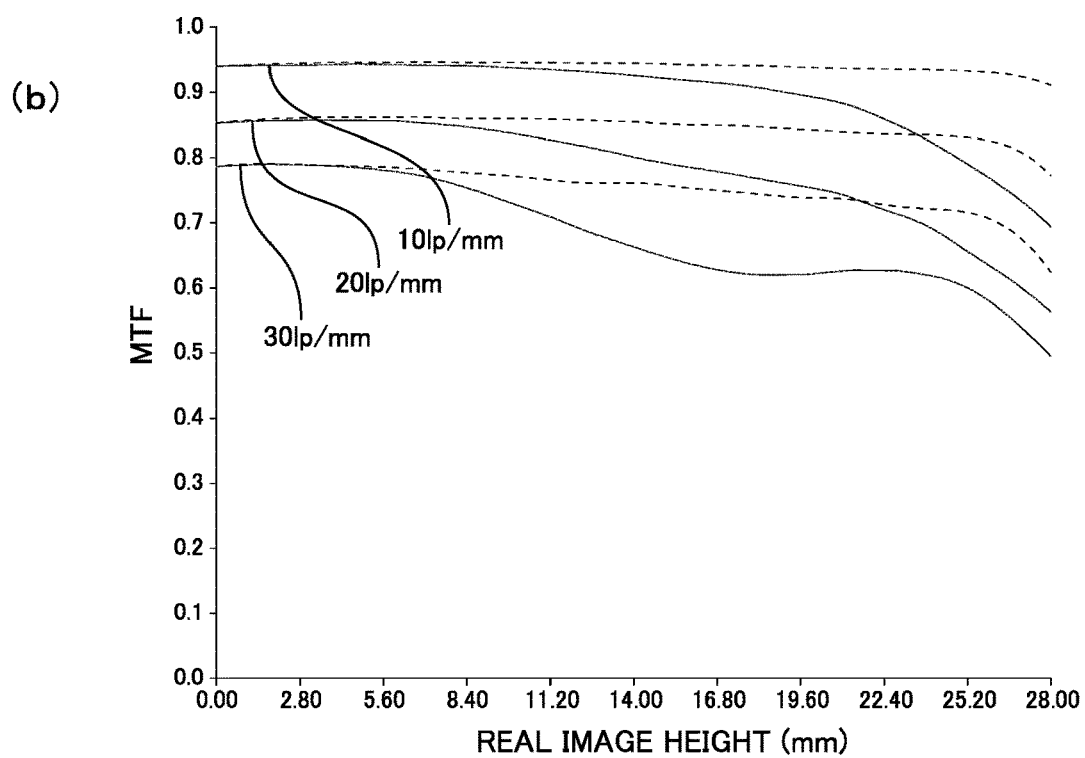
Figure 41:
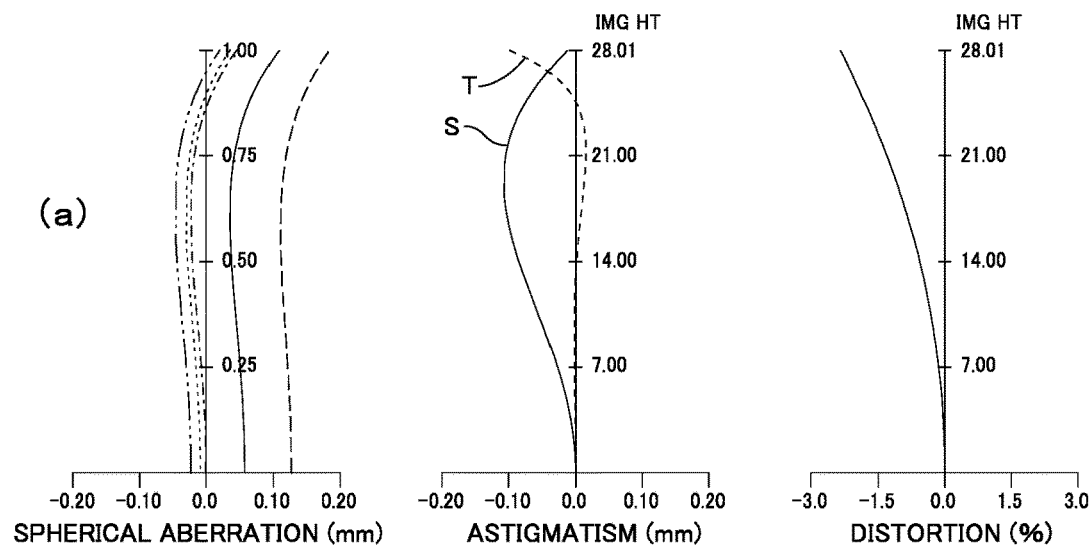
FIG. 41 is a diagram depicting various aberrations and the MTF of the lens system according to Example 7 when the focus is at an intermediate position.
Figure 41:
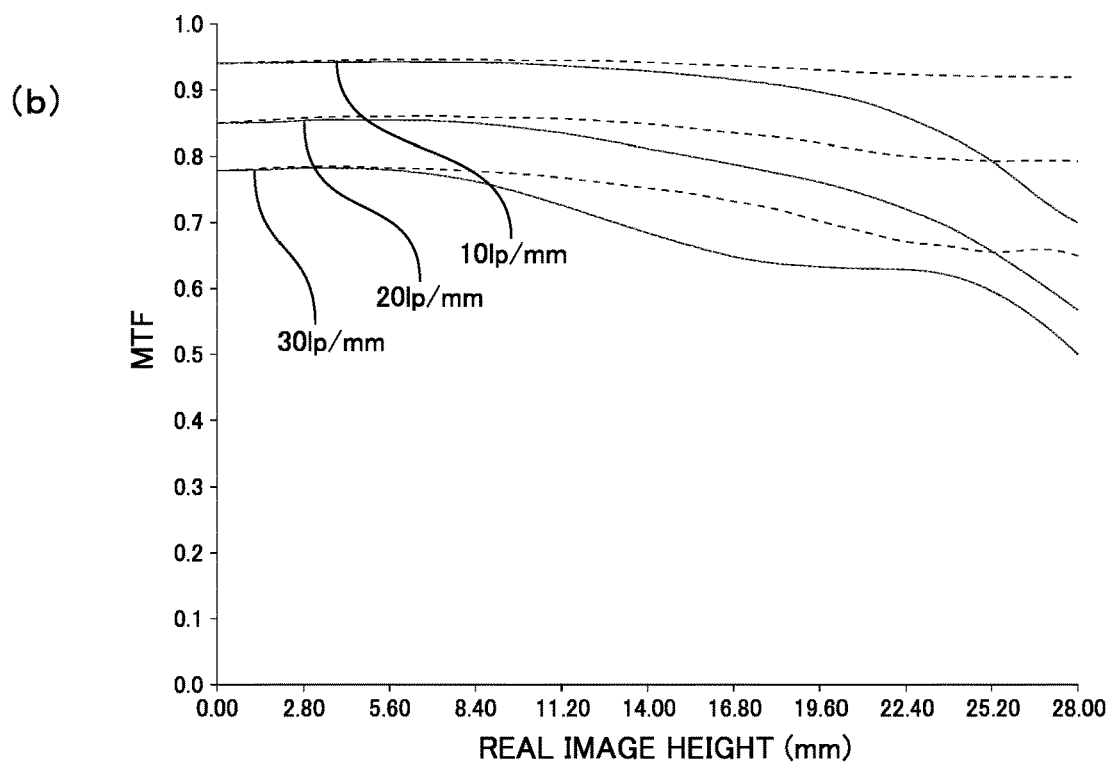
Figure 42:
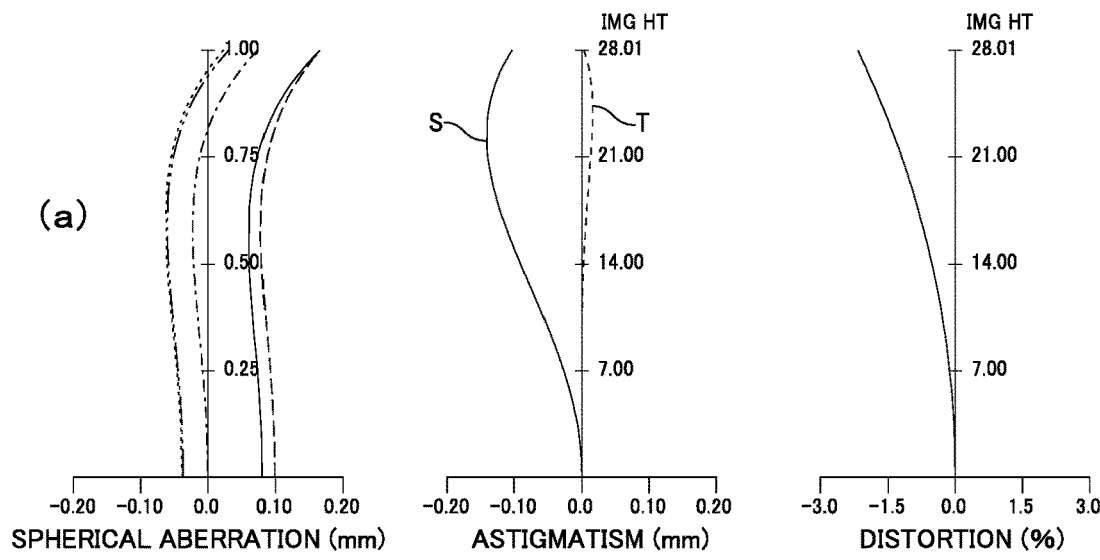
FIG. 42 is a diagram depicting various aberrations and the MTF of the lens system according to Example 7 when the focus is at a nearest distance.
Figure 42:
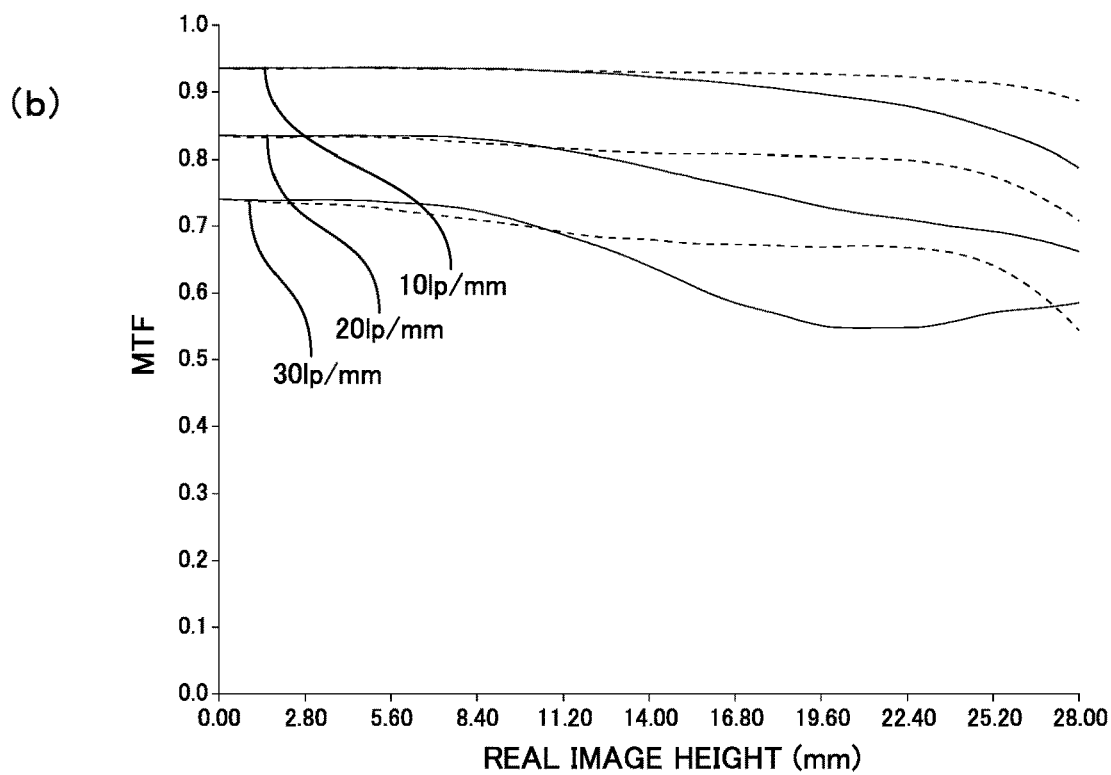

FIG. 38 depicts data on the respective lenses that construct the lens system 10. FIG. 39 depicts the values of the focal length f, the F number (F No.), the angle of view, and the variable interval d13 in the lens system 10 when the focal length of the lens system 10 is at infinity, at an intermediate position (3000 mm), and at the shortest distance (nearest distance, 590 mm). FIGS. 40 to 42 respectively depict various aberrations (FIGS. 40(a), 41(a), 42(a)) and the MTF (FIGS. 40(b), 41(b), 42(b)) when the focal distance of the lens system 10 is at infinity, at the intermediate position, and at the nearest distance.

The lens system 10 depicted in these drawings is composed of a total of 10 lenses (L11 to L14, L21 to L23, and L31 to L33). Aside from the lenses L13 and L14 of the first lens group G1 being separately provided and not constructing a cemented lens, the basic configuration of each group and each lens are the same as the lens system 10 of Example 1. In terms of optical elements, the lens system 10 is composed of seven elements including the three cemented lenses B11, B21 and B31, and the lenses L13, L14, L23, and L33. Note that in the lens system 10 of this example, the surfaces S13, S14, S15, S16 and S17 described earlier respectively correspond to the surfaces S14, S15, S16, S17, and S18.

Various numerical values and values of the respective conditions for the lens system 10 depicted in FIG. 37 are as follows.
Focal length of first lens group G1 (f1): 133.84
Focal length of second lens group G2 (f2): 83.22
Focal length of third lens group G3 (f3): 194.91
Combined focal length of first and second lens groups (f12): 78.33
Focal length of cemented lens B31 (f31ab): 88.56
Focal length of the rear lens L33 of the third lens group G3 (f3GL): −162.41
Total length of lens system (WL): 63.10
Total length of third lens group G3 (G3L): 15.04
Total length of cemented lens B31 (B31L): 11.67
Condition (1) (f3/f12): 2.49
Condition (2) (B31L/G3L): 0.78
Condition (3) (nB31ab (max (nL31, nL32))): 2.00
Condition (4) (G3L/WL): 0.24
Condition (5) (|f31ab/f3GL|): 0.55
Condition (6) (|f31ab|+|f3GL|)/|f3|): 1.29
Condition (7) (nB31a (nL31)): 1.83
Condition (8) (nB31b/nB31a (nL32/nL31)): 1.09
Condition (9) (nB31b (nL32)): 2.00
Condition (10) (n3GL/nB31b (nL33/nL32)): 0.74
Condition (11) (nB11b (nL12)): 1.88
Condition (12) (vB11a/vB11b (vL11/vL12)): 1.75

The lens system 10 depicted in FIG. 37 satisfies Conditions (1) to (7), (9) to (11), and (13). Conditions (1c), (2a), (7a), and (7b) are also satisfied. This lens system 10 does not use an anomalous dispersion lens and there are four high refractive index lenses with a refractive index of 1.8 or higher, the lenses L12, L14, L23, and L32. Since a relatively large number of high refractive index lenses are used, various aberrations are favorably corrected.

This lens system 10 has the performance of a medium-telephoto or normal-type interchangeable lens with a focal length of about 65 mm when focused at infinity, and makes it possible to provide an image pickup lens that is bright with an F number of 2.8 and has a large angle of view of 47.6°. Also, as depicted in FIGS. 40 to 42, it is possible to acquire images in which various aberrations have been favorably corrected across the entire focusing range from infinity to the near distance (short distance). In the MTF curves, no extreme drop in MTF was observed across the entire focusing range from infinity to the near distance, and there is no great separation between sagittal and tangential, which is favorable.

Example 8

Figure 43:
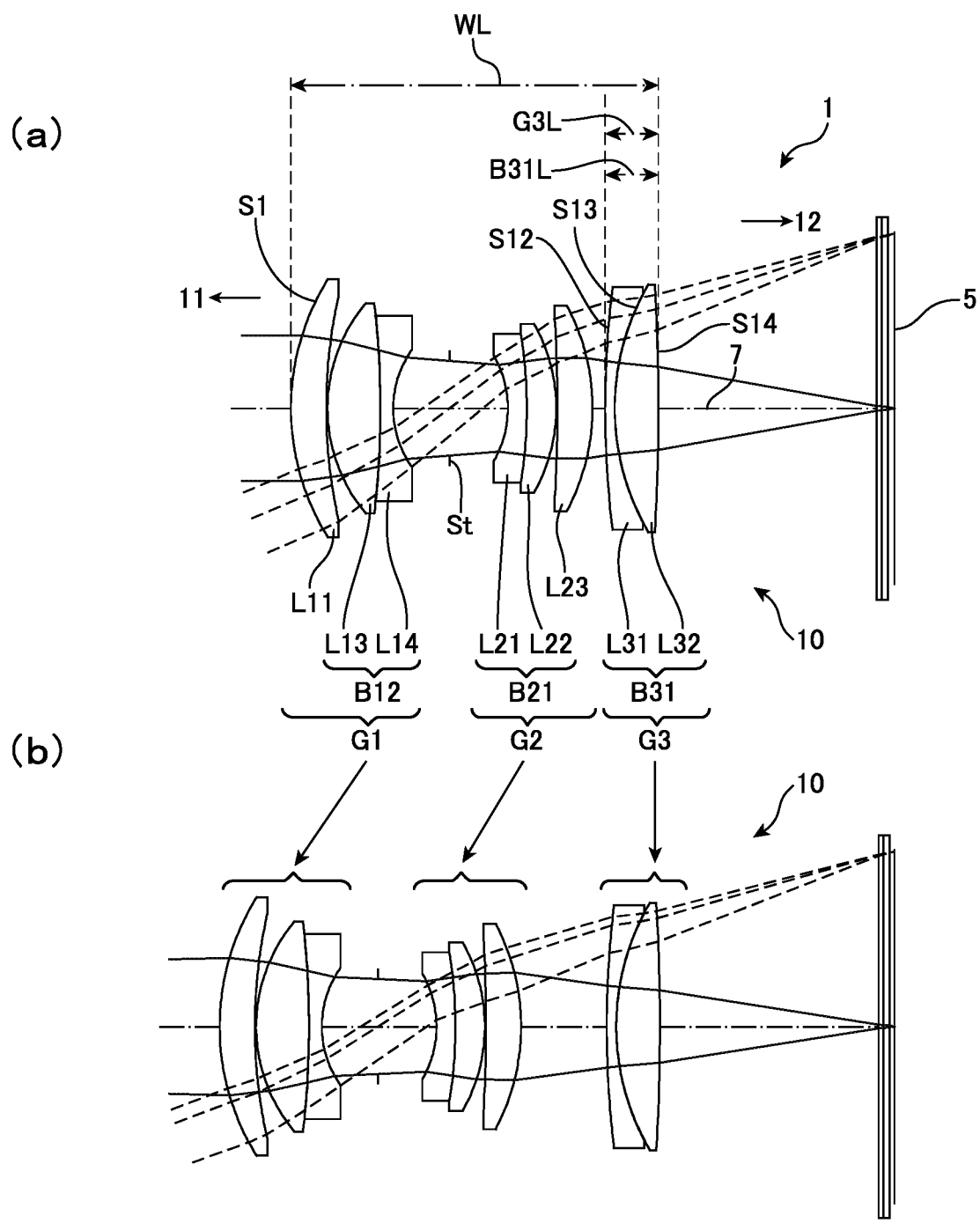
FIG. 43 depicts the configuration of a lens system according to Example 8, with FIG. 43(a) depicting the lens arrangement when the focus position is infinity and FIG. 43(b) depicting the lens arrangement when the focus position is a nearest (shortest) distance.

FIG. 43 depicts a different example of the lens system 10. FIG. 43(a) depicts the lens arrangement when the focus position is at infinity, and FIG. 43(b) depicts the lens arrangement when the focus position is the shortest distance (near distance, 500 mm).

This lens system 10 also has a three-group configuration with a positive-positive-positive arrangement of refractive powers and is composed, from the object side 11, of the first lens group G1 with overall positive refractive power and, on the other side of the stop St, the second lens group G2 with overall positive refractive power and the third lens group G3 with overall positive refractive power. The third lens group G3 is a fixed lens group that does not move, so that the distance from the image plane 5 does not change during focusing. When the focus position moves from infinity to the near distance during focusing, the first lens group G1 and the second lens group G2 disposed on opposite sides of the stop St monotonously move toward the object side 11 as a unit.

Figure 46:
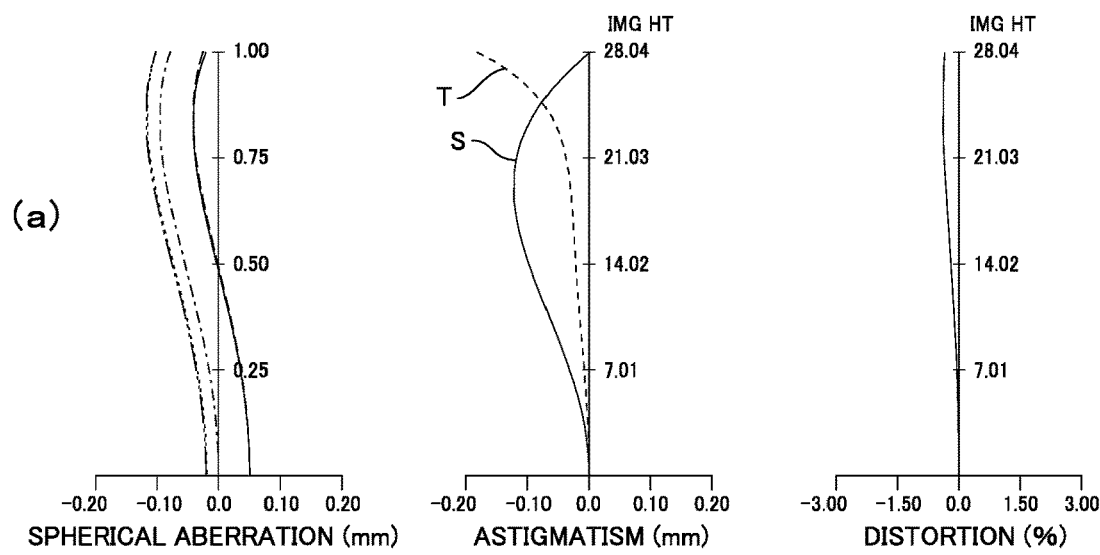
FIG. 46 is a diagram depicting various aberrations and the MTF of the lens system according to Example 8 when the focus is at infinity.
Figure 46:
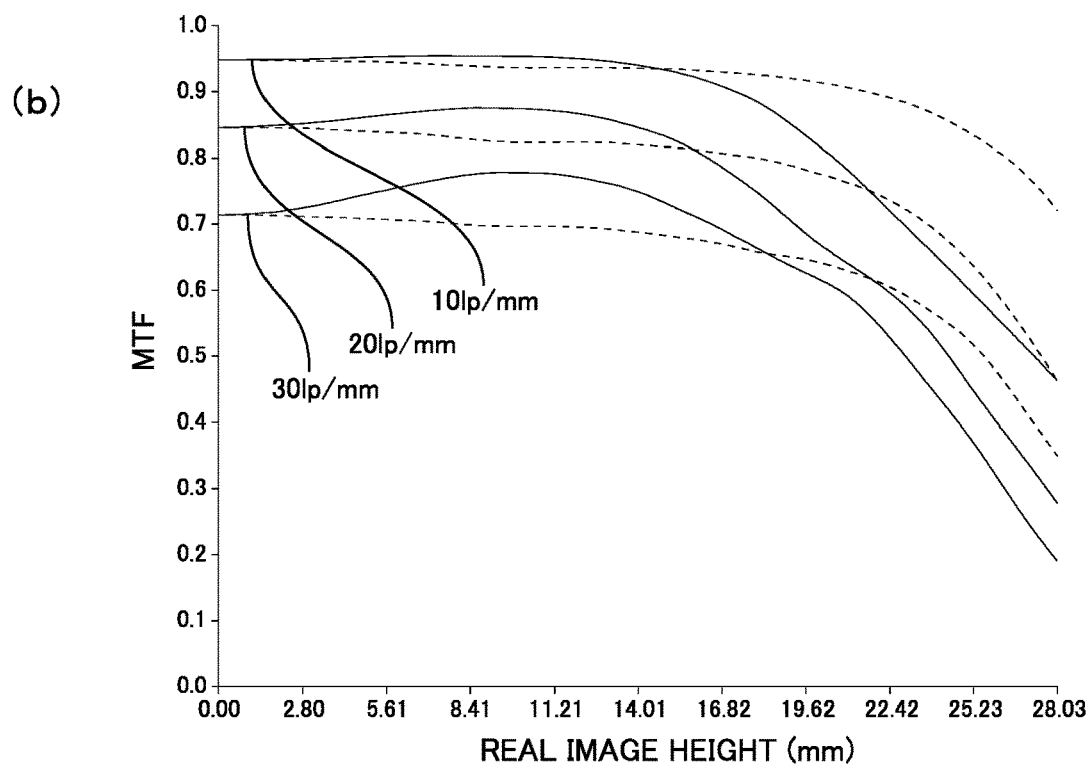
Figure 47:
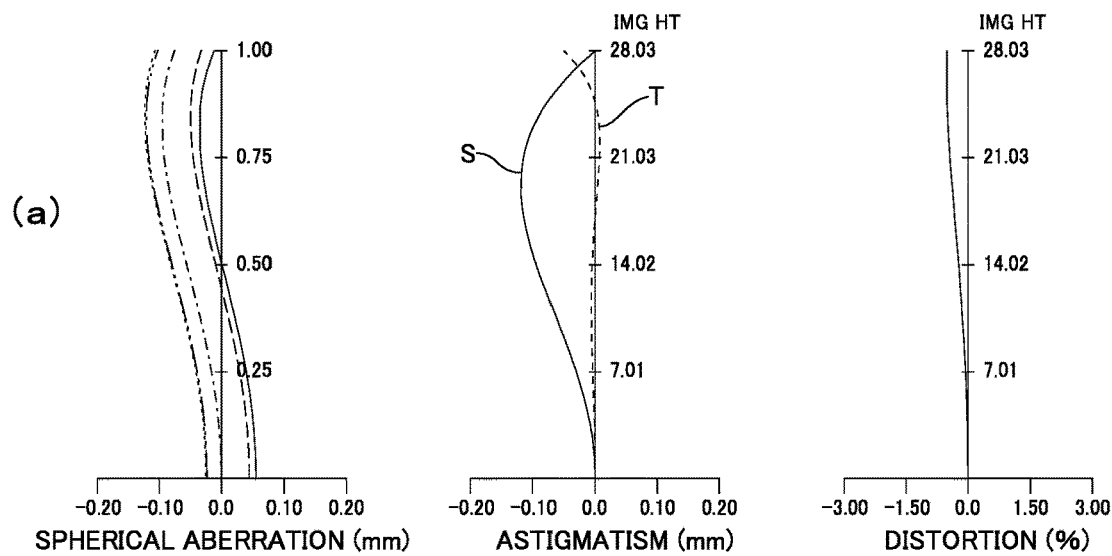
FIG. 47 is a diagram depicting various aberrations and the MTF of the lens system according to Example 8 when the focus is at an intermediate position.
Figure 47:
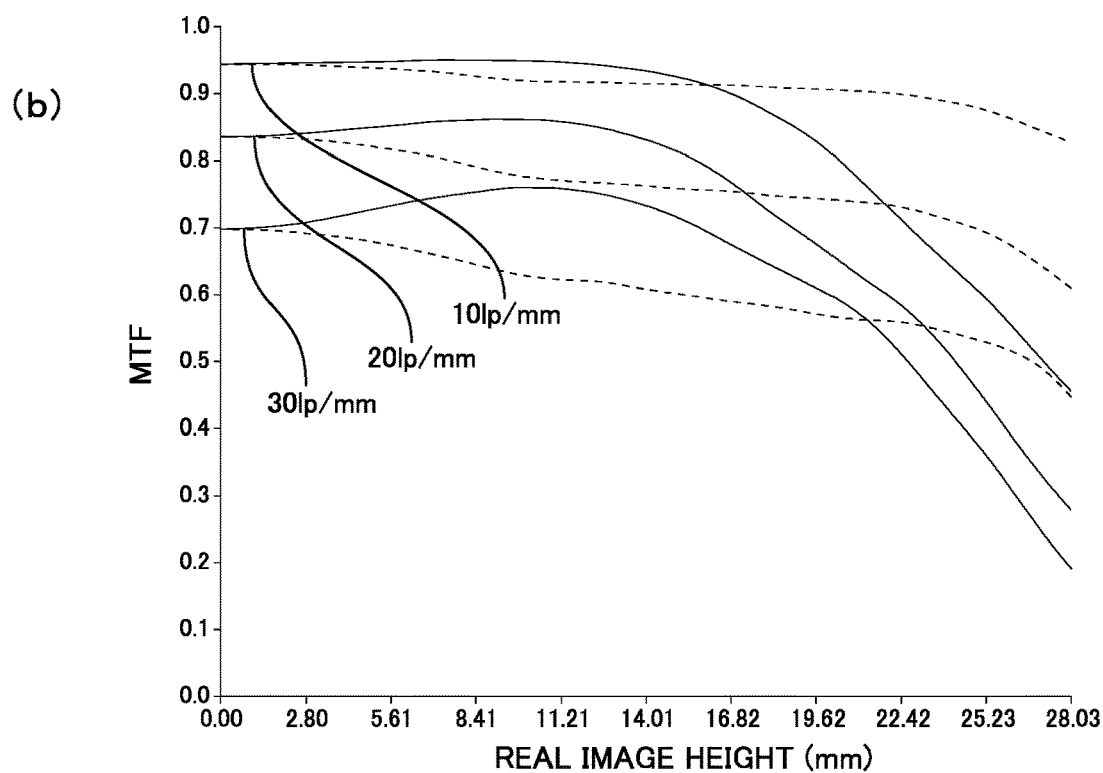
Figure 48:
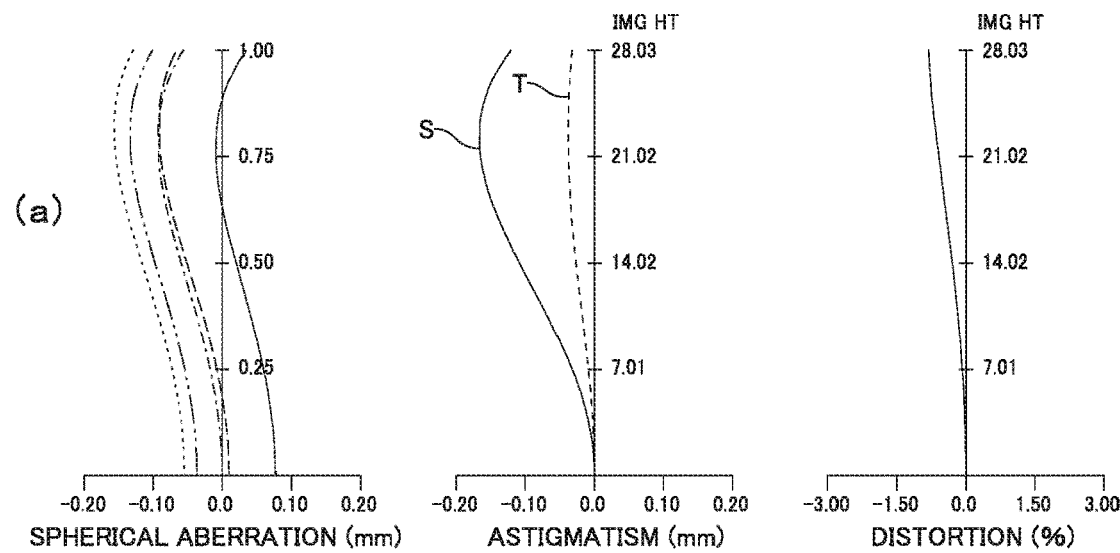
FIG. 48 is a diagram depicting various aberrations and the MTF of the lens system according to Example 8 when the focus is at a nearest distance.
Figure 48:
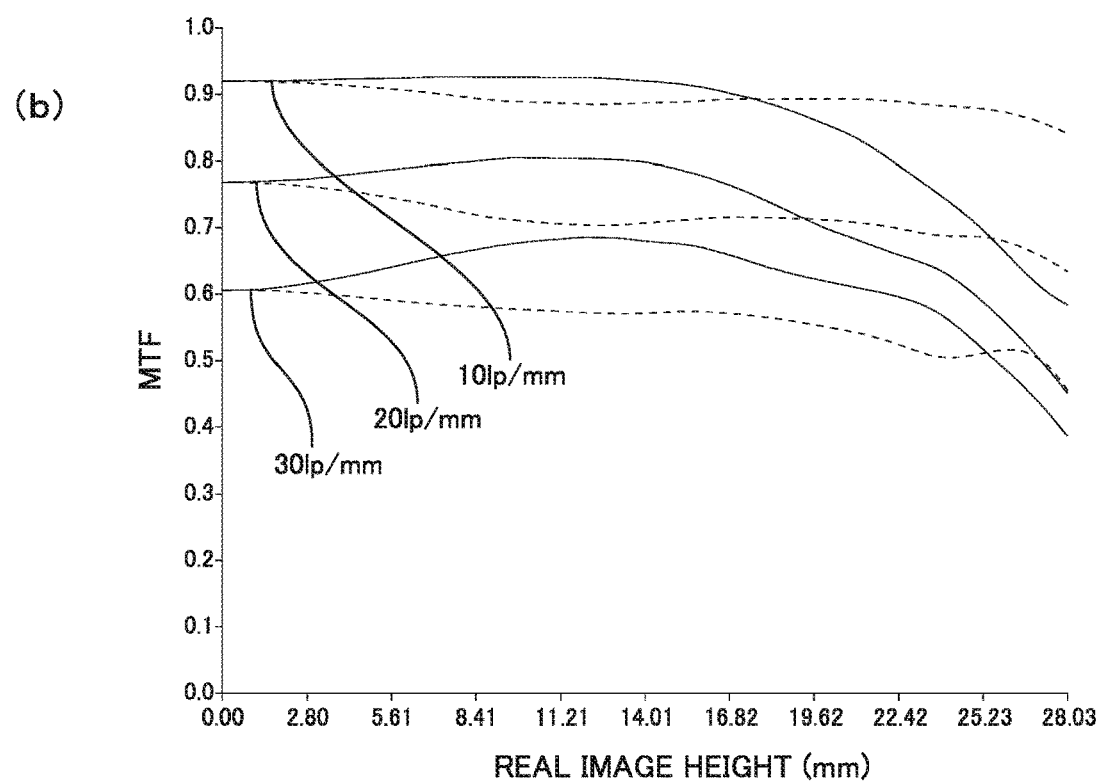

FIG. 44 depicts data on the respective lenses that construct the lens system 10. FIG. 45 depicts the values of the focal length f, the F number (F No.), the angle of view, and the variable distance d11 in the lens system 10 when the focal length of the lens system 10 is at infinity, at an intermediate position (2400 mm), and at the shortest distance (nearest distance, 500 mm). FIGS. 46 to 48 respectively depict various aberrations (FIGS. 46(a), 47(a), 48(a)) and the MTF (FIGS. 46(b), 47(b), 48(b)) when the focal distance of the lens system 10 is at infinity, at the intermediate position, and at the nearest distance.

The lens system 10 depicted in these drawings is composed of a total of eight lenses. The first lens group G1 has a three-lens configuration and includes the positive meniscus lens L11 that is convex on the object side 11, the biconvex positive lens L13, and the biconcave negative lens L14. The lenses L13 and L14 construct a negative meniscus-type cemented lens B12 that is convex on the object side 11. The second lens group G2 has a three-lens configuration, and includes the negative meniscus lens L21 that is concave on the object side 11, the positive meniscus lens L22 that is concave on the object side 11, and the positive meniscus lens L23 that is concave on the object side 11. The lenses L21 and L22 construct the cemented lens B21 that is concave on the object side 11.

The third lens group G3 includes the negative meniscus lens L31 that is convex on the object side 11 and the biconvex positive lens L32, with the lenses L31 and L32 constructing the biconvex cemented lens B31. The lens system 10 is composed of five optical elements including the three cemented lenses B12, B21, and B31 and the lenses L11 and L23, making it a simple configuration. Note that in the lens system 10 according to this example, the surfaces S13, S14, and S15 described earlier respectively correspond to the surfaces S12, S13, and S14, and the surface S14 corresponds to the final surface S17 on the image plane side 12.

Various numerical values and values of the respective conditions for the lens system 10 depicted in FIG. 43 are as follows.

Focal length of first lens group G1 (f1): 142.14
Focal length of second lens group G2 (f2): 68.24
Focal length of third lens group G3 (f3): 396.85
Combined focal length of first and second lens groups (f12): 72.19
Focal length of cemented lens B31 (f31ab): 396.85
Focal length of the rear lens L33 of the third lens group G3 (f3GL): NA
Total length of lens system (WL): 57.86
Total length of third lens group G3 (G3L): 8.38
Total length of cemented lens B31 (B31L): 8.38
Condition (1) (f3/f12): 5.50
Condition (2) (B31L/G3L): 1.00
Condition (3) (nB31ab (max (nL31, nL32))): 1.74
Condition (4) (G3L/WL): 0.14
Condition (5) (|f31ab/f3GL|): NA
Condition (6) ((|f31ab|+|f3GL|)/|f3|): NA
Condition (7) (nB31a (nL31)): 1.74
Condition (8) (nB31b/nB31a (nL32/nL31)): 0.92
Condition (9) (nB31b (nL32)): 1.60
Condition (10) (n3GL/nB31b (nL33/nL32)): NA
Condition (11) (nB11b (nL12)): NA
Condition (12) (vB11a/vB11b (vL11/vL12)): NA The lens system 10 depicted in FIG. 43 satisfies Conditions (1), (2), (4), (7) to (9), and (13). Condition (1c) is also satisfied. This lens system 10 uses an anomalous dispersion lens as the lens L32. On the other hand, no high refractive index lenses with a refractive index of 1.8 or higher are used.

This lens system 10 has the performance of a medium-telephoto or normal-type (standard-type) interchangeable lens with a focal length of about 65 mm when focused at infinity, and makes it possible to provide an image pickup lens that is bright with an F number of 2.8 and has a large angle of view of 46.8°. Also, as depicted in FIGS. 46 to 48, it is possible to acquire images in which various aberrations have been favorably corrected across the entire focusing range from infinity to the near distance (short distance). In the MTF curves, no extreme drop in MTF was observed across the entire focusing range from infinity to the near distance aside from the region where the image height is large, and there is little separation between sagittal and tangential, which is favorable.

The invention claimed is:
1. A lens system for image pickup comprising, in order from an object side:
   a first lens group with positive refractive power that moves during focusing;
   a second lens group with positive refractive power that is disposed on an opposite side of a stop to the first lens group and moves during focusing; and
   a third lens group with positive refractive power that is fixed and is disposed closest to an image plane side, wherein the first lens group includes, in order from the object side, a first cemented lens composed of a lens with negative refractive power and a lens with positive refractive power and a second cemented lens composed of a lens with positive refractive power and a lens with negative refractive power, wherein the second lens group includes, in order from the object side, a third cemented lens composed of a lens with negative refractive power and a lens with positive refractive power, and a rear lens with positive refractive power, wherein the third lens group includes a fourth cemented lens composed, in order from the object side, of a lens with positive refractive power and a lens with negative refractive power, and a combined focal length f3 of the third lens group and a combined focal length f12 of the first lens group and the second lens group, a refractive index nB11b of the lens with positive refractive power in the first cemented lens, and a refractive index nB31a of the lens with positive refractive power in the fourth cemented lens satisfy the following conditions:

$2 \le f3/f12 \le 200;$ $1.75 \le nB11b \le 2.0;$ $1.75 \le nB31a \le 2.0.$

2. The lens system according to claim 1, wherein a refractive index nB31ab of at least one lens out of the lens with positive refractive power and the lens with negative refractive power in the fourth cemented lens, a distance G3L along an optical axis from a surface closest to the object side to a surface closest to the image plane side in the third lens group, and a distance B31L along the optical axis of the fourth cemented lens satisfy following conditions:

$0.6 \le B31L/G3L \le 1;$ $1.8 \le nB31ab \le 2.0.$

3. The lens system according to claim 2, wherein the refractive index nB31a of the lens with positive refractive power in the fourth cemented lens and the distance B31L of fourth the cemented lens satisfy following conditions:

$0.65 \le B31L/G3L \le 0.80;$ $1.8 \le nB31a \le 2.0.$

4. The lens system according to claim 1,
wherein a refractive index nB31 b of the lens with negative refractive power in the fourth cemented lens satisfies a following condition:

$1.60 \le nB31b < 1.87.$

5. The lens system according to claim 1,
wherein a refractive index nB31a of the lens with positive refractive power in the fourth cemented lens satisfies a following condition:

$1.85 \le nB31a \le 2.0.$

6. The lens system according to claim 1, wherein the third lens group includes, from the object side, the fourth cemented lens, and a rear lens with negative refractive power that is concave on the object side.

7. The lens system according to claim 6,
wherein a combined focal length f3 1ab of the lens with positive refractive power and the lens with negative refractive power in the fourth cemented lens and a focal length f3GL of the rear lens satisfy a following condition:

$0.5 \le |f31ab/f3GL| \le 1.1.$

8. The lens system according to claim 6,
wherein a combined focal length f3ab of the lens with positive refractive power and the lens with negative refractive power in the fourth cemented lens, a focal length f3GL of the rear lens, and a combined focal length f3 of the third lens group satisfy a following condition:

$0 < (|f31ab|+|f3GL|)/|f3| \le 1.3.$

9. The lens system according to claim 6,
wherein a refractive index nB31 b of the lens with negative refractive power in the fourth cemented lens and a refractive index n3GL of the rear lens satisfy a following condition:

$0.5 < n3GL/nB31b < 1.$

10. The lens system according to claim 1,
wherein a refractive index nB31a of the lens with positive refractive power in the fourth cemented lens, a refractive index nB31b of the lens with negative refractive power in the fourth cemented lens, an Abbe number vB11a of the lens with negative refractive power in the first cemented lens, and an Abbe number vB11b of the lens with positive refractive power in the first cemented lens satisfy following conditions:

$0.5 < nB31b/nB31a < 1$ $0.5 < vB11a/vB11b < 1.$

11. The lens system according to claim 1,
wherein the lens with positive refractive power in the third cemented lens is made of anomalous low dispersion glass.

12. The lens system according to claim 1, wherein the rear lens with positive refractive power that is located on the rear side of the third cemented lens is made of anomalous low dispersion glass.

13. The lens system according to claim 1,
wherein a combined focal length f3 of the third lens group and a combined focal length f12 of the first lens group and the second lens group satisfy a following condition:

$2 \le f3/f12 \le 10.$

14. The lens system according to claim 1,
wherein the second lens group includes at least one lens made of anomalous low dispersion glass.

15. The lens system according to claim 1,
wherein the second lens group includes at least two lenses made of anomalous low dispersion glass.

16. The lens system according to claim 1,
wherein the first lens group, the stop, and the second lens group move integrally during focusing.

17. An image pickup apparatus comprising:
the lens system according to-claim 1; and
an image pickup element disposed on an image plane side of the lens system.

18. A lens system for image pickup comprising, in order from an object side:
a first lens group with positive refractive power that moves during focusing;
a second lens group with positive refractive power that is disposed on an opposite side of a stop to the first lens group and moves during focusing; and a third lens group with positive refractive power that is fixed and is disposed closest to an image plane side, wherein the third lens group includes a cemented lens composed, in order from the object side, of a lens with positive refractive power and a lens with negative refractive power, wherein a combined focal length f3 of the third lens group and a combined focal length f12 of the first lens group and the second lens group satisfy a following condition:

$$100 \leq f3/f12 \leq 170.$$

19. The lens system according to claim 18, wherein the first lens group, the stop, and the second lens group move integrally during focusing.

20. An image pickup apparatus comprising:

the lens system according to claim 18; and an image pickup element disposed on an image plane side of the lens system.

\* \* \* \* \*